(12) United States Patent
Noda et al.

(10) Patent No.: US 8,527,434 B2
(45) Date of Patent: Sep. 3, 2013

(54) INFORMATION PROCESSING DEVICE, INFORMATION PROCESSING METHOD, AND PROGRAM

(75) Inventors: Kuniaki Noda, Tokyo (JP); Kohtaro Sabe, Tokyo (JP); Yukiko Yoshiike, Tokyo (JP); Kenta Kawamoto, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 12/791,275

(22) Filed: Jun. 1, 2010

(65) Prior Publication Data
US 2010/0318479 A1 Dec. 16, 2010

(30) Foreign Application Priority Data
Jun. 11, 2009 (JP) ................. P2009-140064

(51) Int. Cl.
*G06N 5/00* (2006.01)
(52) U.S. Cl.
USPC ............................. 706/12; 706/45
(58) Field of Classification Search
USPC ...................................... 706/12, 45
See application file for complete search history.

(56) References Cited

U.S. PATENT DOCUMENTS
2013/0066816 A1* 3/2013 Shimomura et al. ............ 706/12

FOREIGN PATENT DOCUMENTS
| JP | 6-161551 | 6/1994 |
| JP | 2006-268812 | 10/2006 |
| JP | 2007-317165 | 12/2007 |
| JP | 2008-186326 | 8/2008 |

OTHER PUBLICATIONS

Yu, et al, A hidden semi-Markov model with missing data and multiple observation sequences for mobility tracking, Signal Processing 83, 2003, pp. 235-250.*

Juang, et al, The Segmental K-Means Algorithm for Estimating Parameters of Hidden Markov Models, IEEE Transactions on Acoustics, Speech, and Signal Processing, vol. 38, No. 9, Sep. 1990, pp. 1639-1641.*

Notification of Reasons for Refusal with English language translation issued by Japanese Patent Office on Jun. 13, 2013, in Japanese application No. 2009-140064.

Masanori Okura, et al. "Hidden Markov Model in Information Processing of Human Beings under POMDP Problem Execution", Technical Research Report the Institute of Electronics. Information and Communication Engineers, NC2006-9 to 21, Neuro-Commuting, Japan, Institute of Electronics, Information and Communication Engineers, Jun. 8, 2006, vol. 106, No. 101, pp. 1-6.

* cited by examiner

*Primary Examiner* — Wilbert L Starks
(74) *Attorney, Agent, or Firm* — Finnegan Henderson Farabow Garrett & Dunner LLP

(57) ABSTRACT

An information processing device includes: a learning section configured to learn a state transition probability model defined by state transition probability for each action of a state making a state transition due to an action performed by an agent capable of performing action and observation probability of a predetermined observed value being observed from the state, using an action performed by the agent and an observed value observed in the agent when the agent has performed the action.

20 Claims, 54 Drawing Sheets

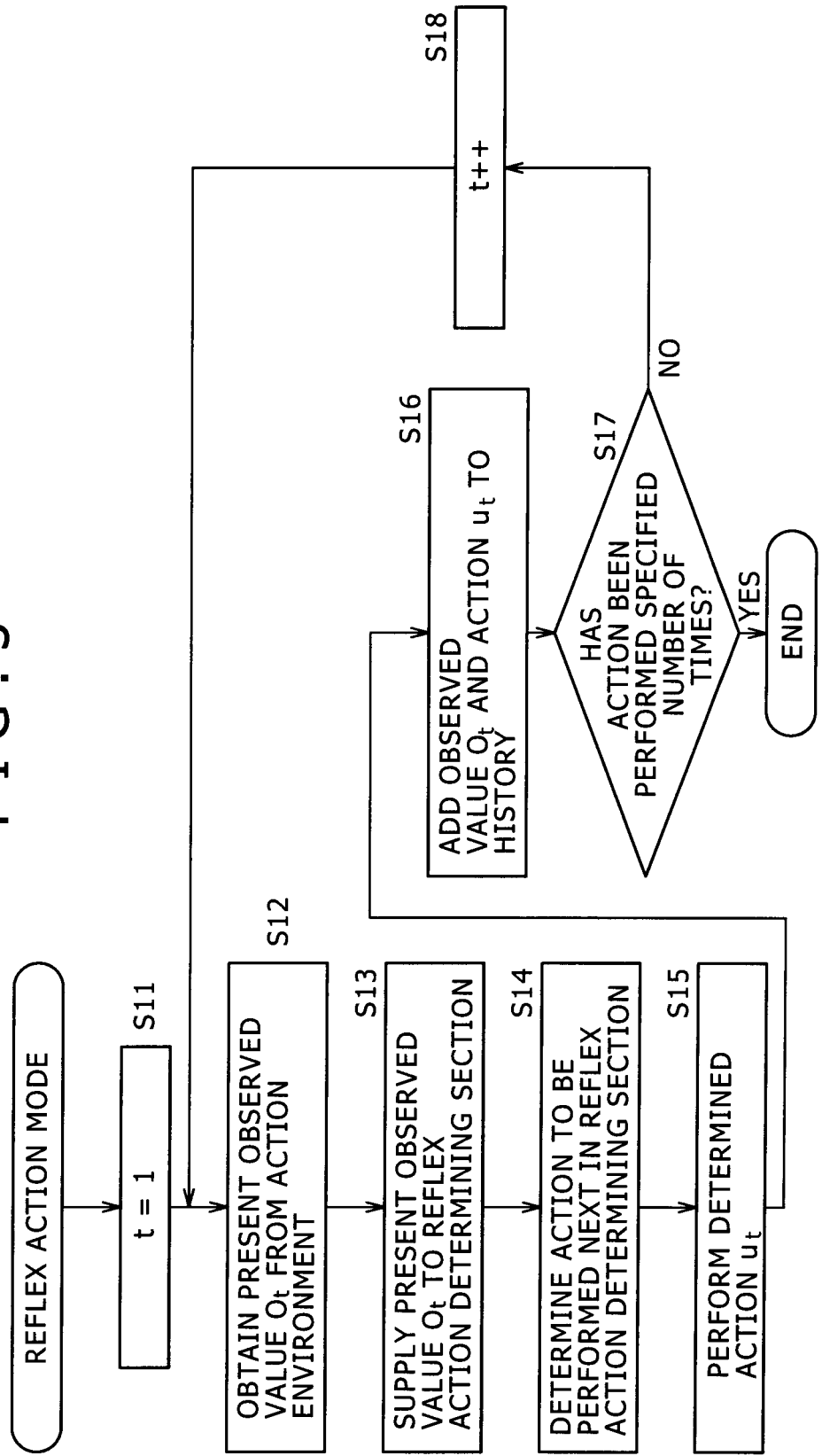

STATE TRANSITION PROBABILITY A

EXISTING HMM

EXTENDED HMM

STORED STRUCTURE OF EXTENDED HMM

ACTION PLAN BEFORE INHIBITOR UPDATE (t = 1)

ACTION PLAN AFTER INHIBITOR UPDATE (t = 3)

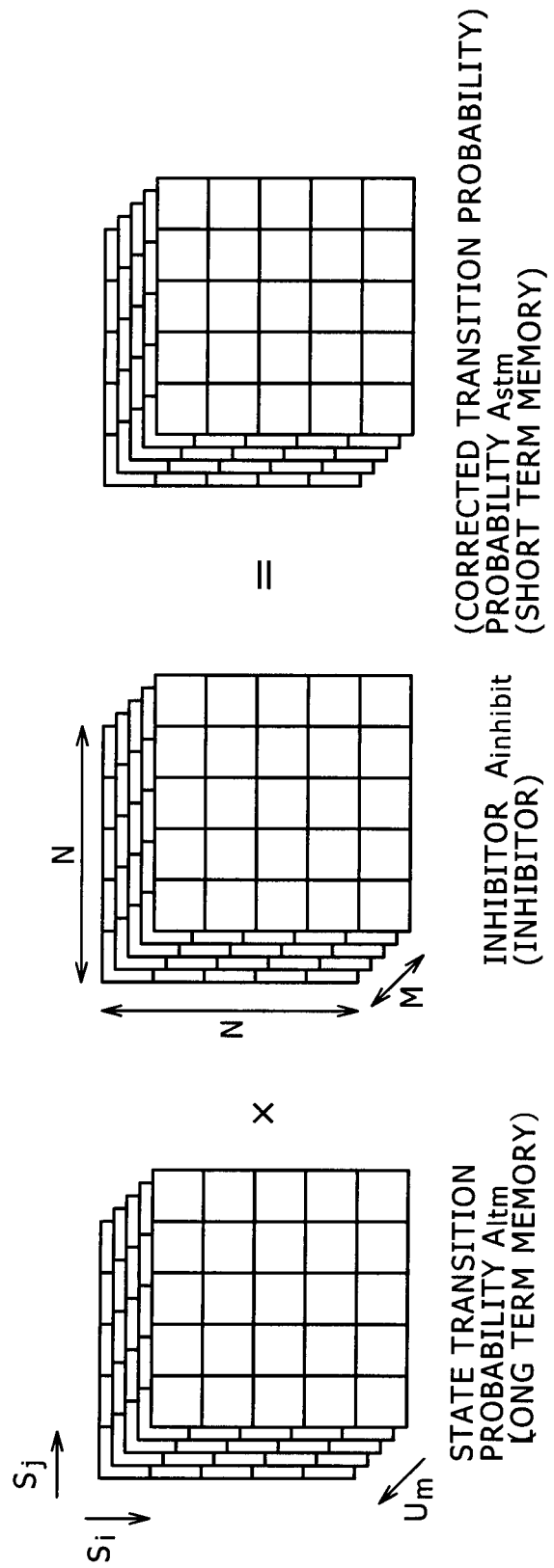

FIG.14A

OBSERVATION
PROBABILITY B

STATE $S_i$

| | $O_1$ | $O_2$ | $O_3$ |
|---|---|---|---|
| $S_1$ | 0.1 | 0.2 | 0.7 |
| $S_2$ | 0.1 | 0.8 | 0.1 |
| $S_3$ | 0.2 | 0.0 | 0.8 |
| $S_4$ | 0.1 | 0.7 | 0.2 |
| $S_5$ | 0.9 | 0.1 | 0.0 |

OBSERVED
VALUE $O_k$

FIG.14B

STATE $S_i$ $O_1 = \{S_5\}$
$O_2 = \{S_2, S_4\}$
$O_3 = \{S_1, S_3\}$

OBSERVED
VALUE $O_k$

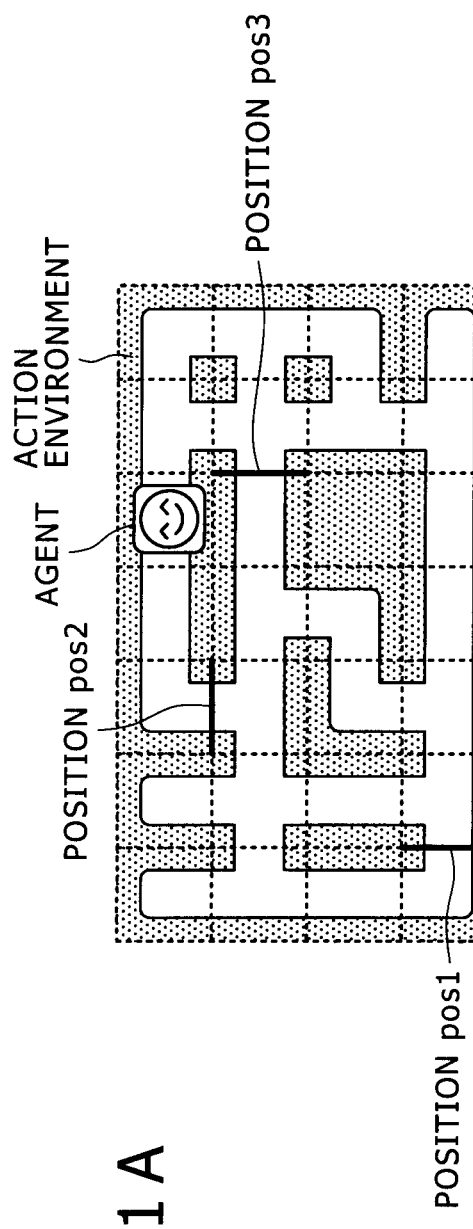
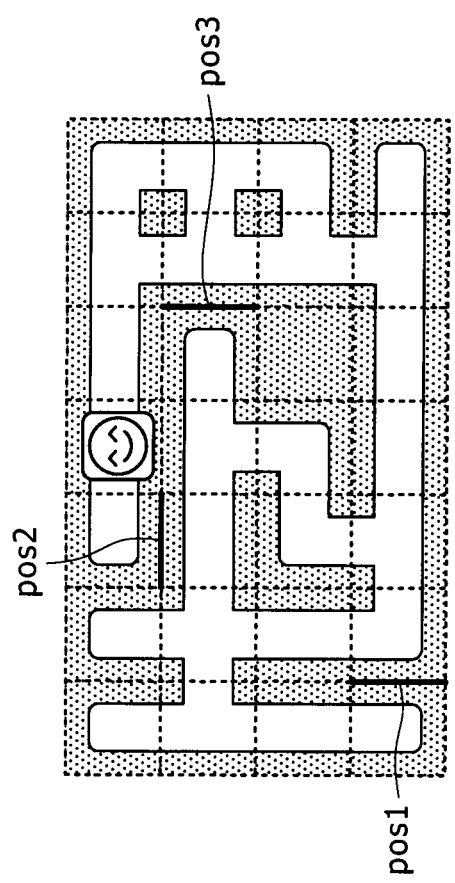
FIG.21A
FIG.21B

FIG.27
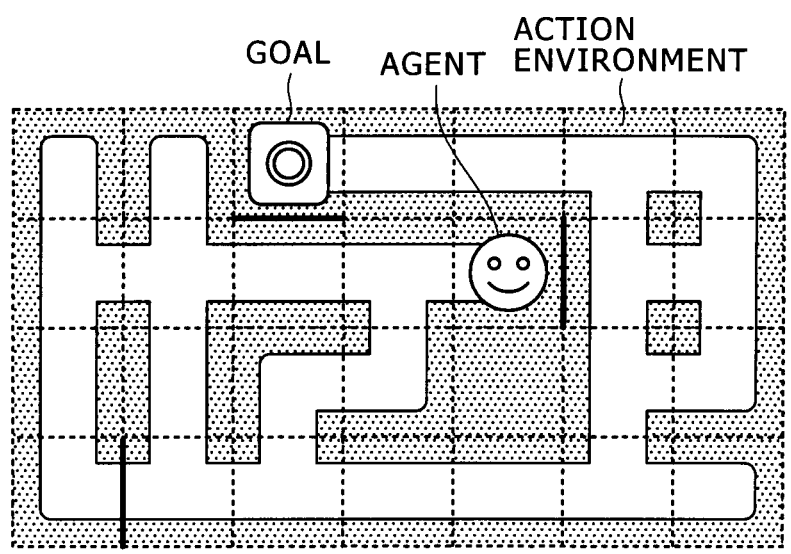
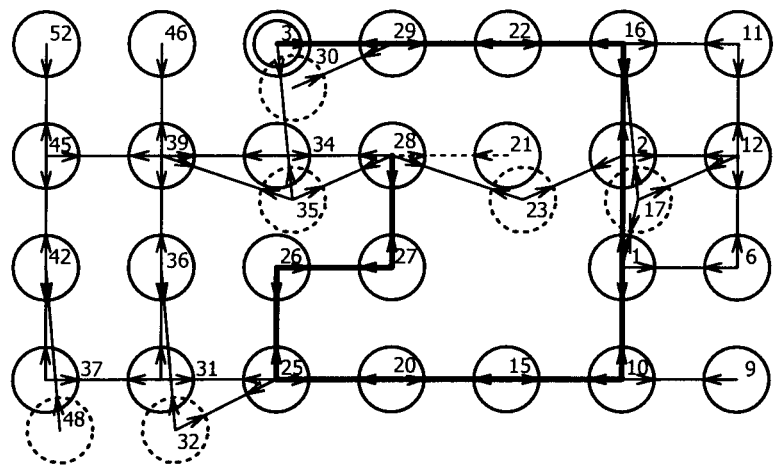

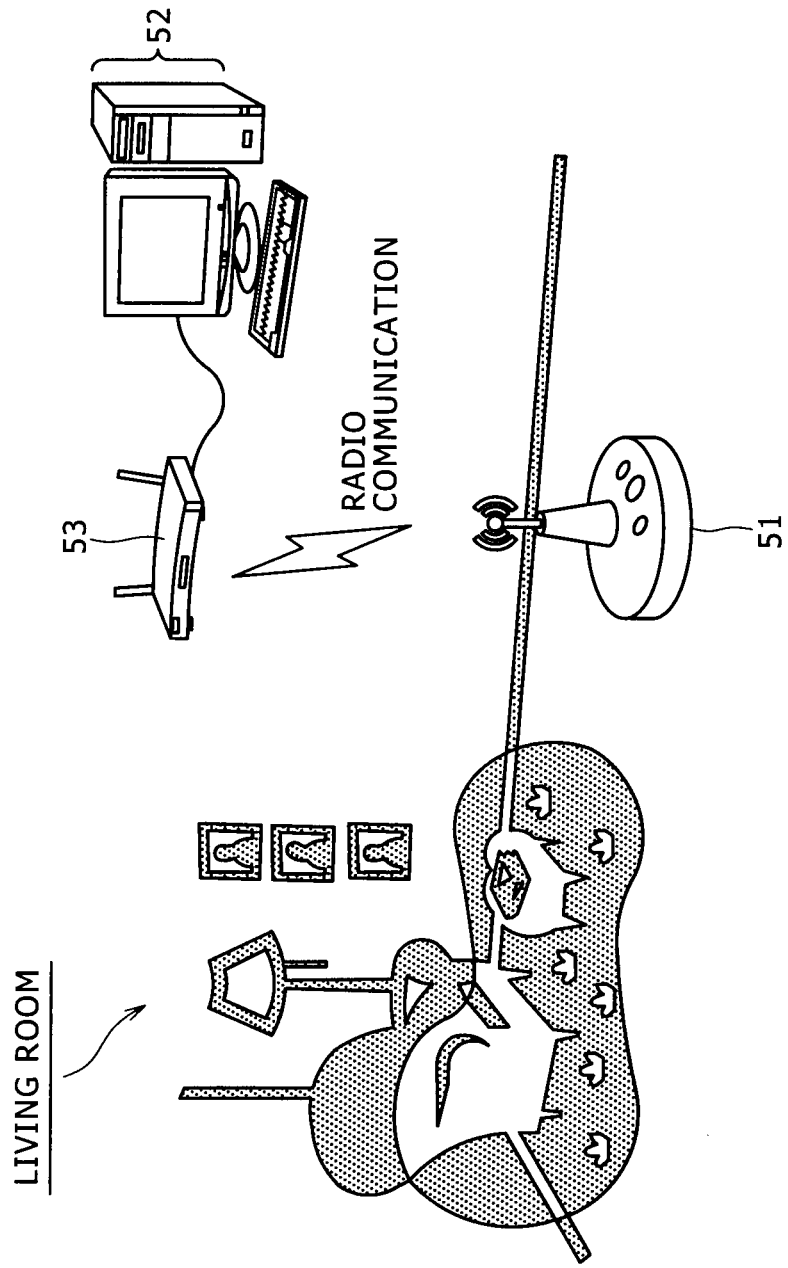

FORWARD MERGE

BACKWARD MERGE

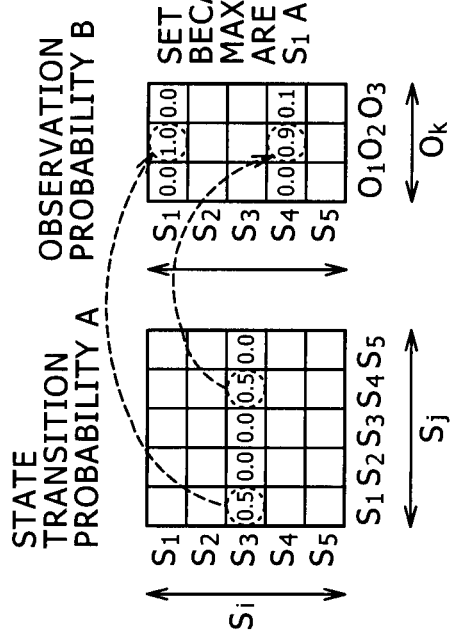
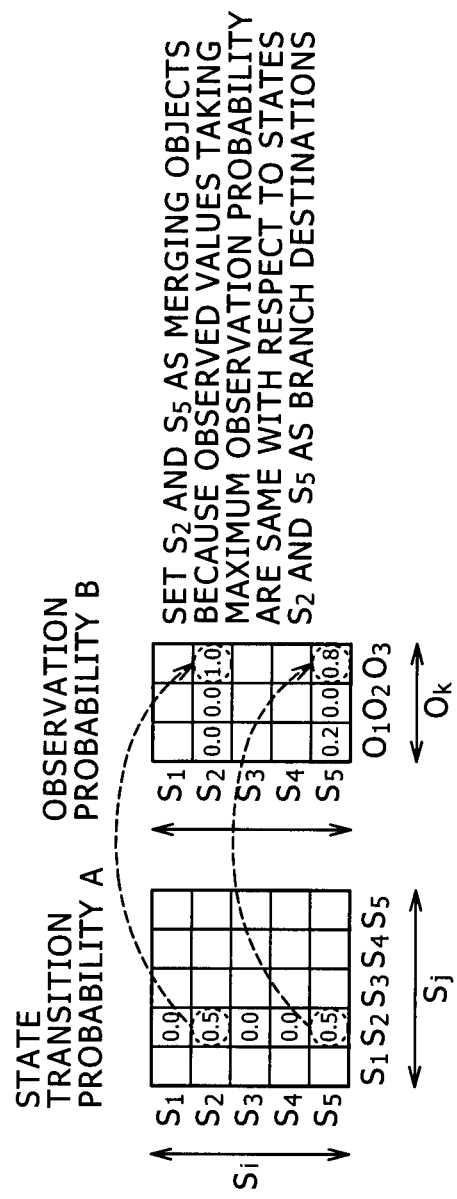
FIG. 35A
FIG. 35B

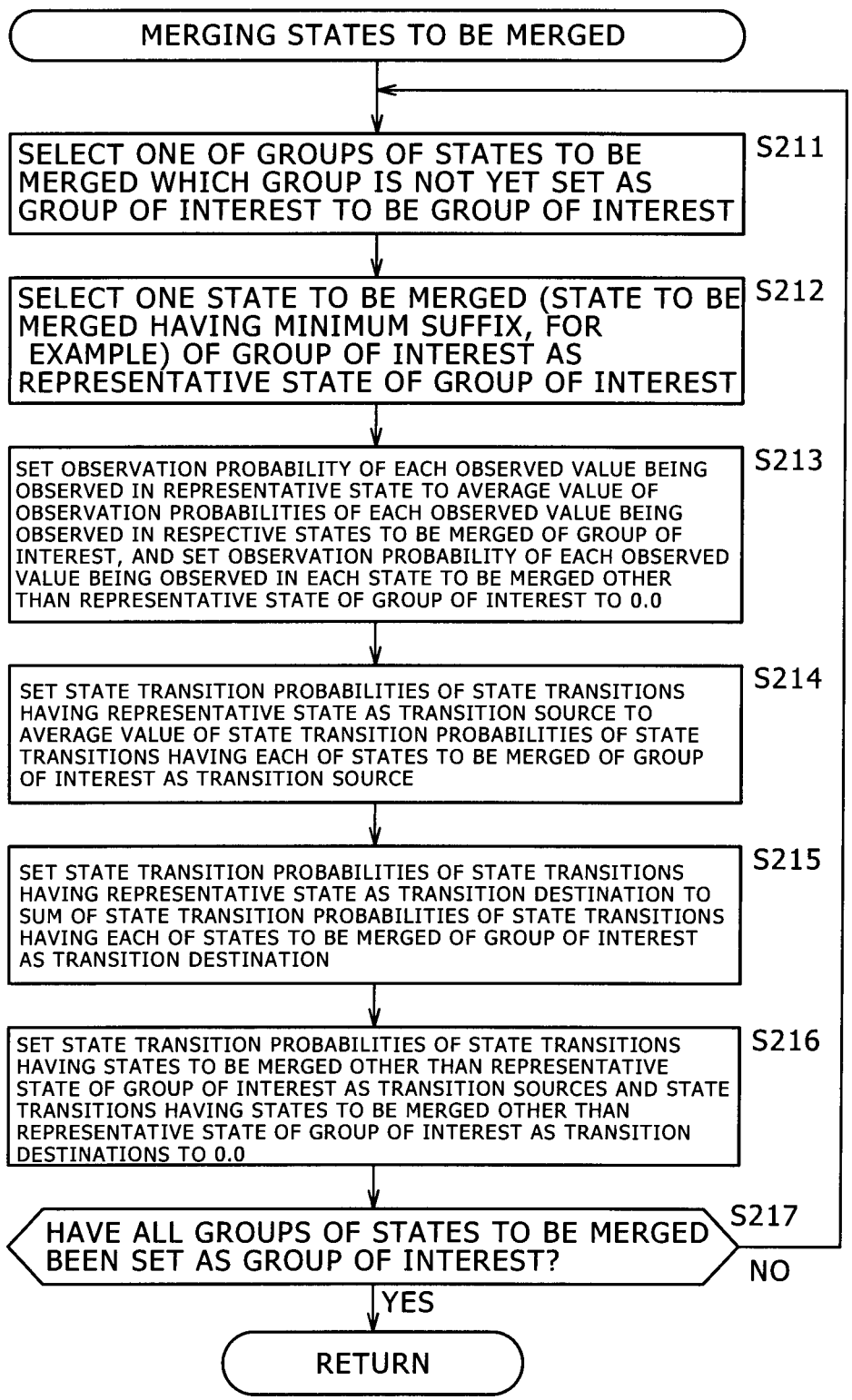

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program, and particularly to an information processing device, an information processing method, and a program that enable the determination of an appropriate action of an agent capable of autonomously performing various actions (autonomous agent), for example.

2. Description of the Related Art

As a state predicting and action determining method, there is for example a method of applying a partially observed Markov decision process and automatically constructing a static partially observed Markov decision process from learning data (see, for example, Japanese Patent Laid-Open No. 2008-186326, which is hereinafter referred to as Patent Document 1).

In addition, as an operation planning method for an autonomous mobile robot or a pendulum, there is a method of making an action plan discretized in a Markov state model, and further inputting a planned goal to a controller and deriving an output to be given to a controlling object to thereby perform desired control (see, for example, Japanese Patent Laid-Open Nos. 2007-317165 and 2006-268812, which are respectively referred to as Patent Documents 2 and 3).

SUMMARY OF THE INVENTION

While various methods have been proposed as methods for determining an appropriate action for an agent capable of performing various actions autonomously, there is a request to propose further new methods.

The present invention has been made in view of such a situation. It is desirable to be able to determine an appropriate action for an agent, that is, determine an appropriate action as an action to be performed by an agent.

An information processing device and a program according to a first embodiment of the present invention are an information processing device and a program for making a computer function as the information processing device, the information processing device including a learning section configured to learn a state transition probability model defined by state transition probability for each action of a state making a state transition due to an action performed by an agent capable of performing action and observation probability of a predetermined observed value being observed from the state, using an action performed by the agent and an observed value observed in the agent when the agent has performed the action.

An information processing method according to the first embodiment of the present invention is an information processing method of an information processing device, the method including a step of learning a state transition probability model defined by state transition probability for each action of a state making a state transition due to an action performed by an agent capable of performing action and observation probability of a predetermined observed value being observed from the state, using an action performed by the agent and an observed value observed in the agent when the agent has performed the action.

In the first embodiment as described above, a state transition probability model defined by state transition probability for each action of a state making a state transition due to an action performed by an agent capable of performing action and observation probability of a predetermined observed value being observed from the state is learned using an action performed by the agent and an observed value observed in the agent when the agent has performed the action.

An information processing device or a program according to a second embodiment of the present invention is an information processing device or a program for making a computer function as the information processing device. The information processing device includes: a state recognizing section configured to recognize present conditions of an agent capable of performing action using an action performed by the agent and an observed value observed in the agent when the agent has performed the action on the basis of a state transition probability model obtained by learning the state transition probability model defined by state transition probability for each action of a state making a state transition due to an action performed by the agent and observation probability of a predetermined observed value being observed from the state, using an action performed by the agent and an observed value observed in the agent when the agent has performed the action, and obtaining a present state as a state of the state transition probability model, the state of the state transition probability model corresponding to the present conditions; a goal determining section configured to determine one of states of the state transition probability model as a goal state set as a goal; and an action determining section configured to calculate an action plan as an action series that maximizes likelihood of state transition from the present state to the goal state on the basis of the state transition probability model, and determine an action to be performed next by the agent according to the action plan.

An information processing method according to the second embodiment of the present invention is an information processing method of an information processing device. The information processing method includes the steps of: recognizing present conditions of an agent capable of performing action using an action performed by the agent and an observed value observed in the agent when the agent has performed the action on the basis of a state transition probability model obtained by learning the state transition probability model defined by state transition probability for each action of a state making a state transition due to an action performed by the agent and observation probability of a predetermined observed value being observed from the state, using an action performed by the agent and an observed value observed in the agent when the agent has performed the action, and obtaining a present state as a state of the state transition probability model, the state of the state transition probability model corresponding to the present conditions; determining one of states of the state transition probability model as a goal state set as a goal; and calculating an action plan as an action series that maximizes likelihood of state transition from the present state to the goal state on the basis of the state transition probability model, and determining an action to be performed next by the agent according to the action plan.

In the second embodiment as described above, present conditions of an agent capable of performing action are recognized using an action performed by the agent and an observed value observed in the agent when the agent has performed the action on the basis of a state transition probability model obtained by learning the state transition probability model defined by state transition probability for each action of a state making a state transition due to an action performed by the agent and observation probability of a predetermined observed value being observed from the state, using an action performed by the agent and an observed value observed in the agent when the agent has performed the action, and a present state as a state of the state transition probability model, the state of the state transition probability model corresponding to the present conditions, is obtained. In addition, one of states of the state transition probability model is determined as a goal state set as a goal. Then, an action plan as an action series that maximizes likelihood of state transition from the present state to the goal state is calculated on the basis of the state transition probability model, and an action to be performed next by the agent is determined according to the action plan.

Incidentally, the information processing device may be an independent device, or may be an internal block forming one device.

The program can be provided by being transmitted via a transmission medium, or in a state of being recorded on a recording medium.

According to the first and second embodiments of the present invention, an appropriate action can be determined as an action to be performed by the agent.

BRIEF DESCRIPTION OF THE DRAWINGS

FIG. 5 is a flowchart of assistance in explaining a process in a reflex action mode;

FIG. 11 is a diagram of assistance in explaining the correction of state transition probability of the extended HMM using an inhibitor, which correction is made by the action determining section;

FIGS. 14A and 14B are diagrams of assistance in explaining a process of the open end detecting section listing states $S_i$ in which an observed value $O_k$ is observed with a probability equal to or higher than a threshold value;

FIGS. 21A and 21B are diagrams showing an action environment employed in a simulation;

FIG. 27 is a diagram showing a result of the simulation.

FIG. 30 is a diagram showing general outlines of a cleaning robot to which the agent is applied;

FIGS. 35A and 35B are diagrams of assistance in explaining a method of detecting merging object states;

FIG. 42 is a flowchart of assistance in explaining a process of merging states;

DETAILED DESCRIPTION OF THE PREFERRED EMBODIMENTS

[Environment in which Agent Performs Action]

Figure 1:
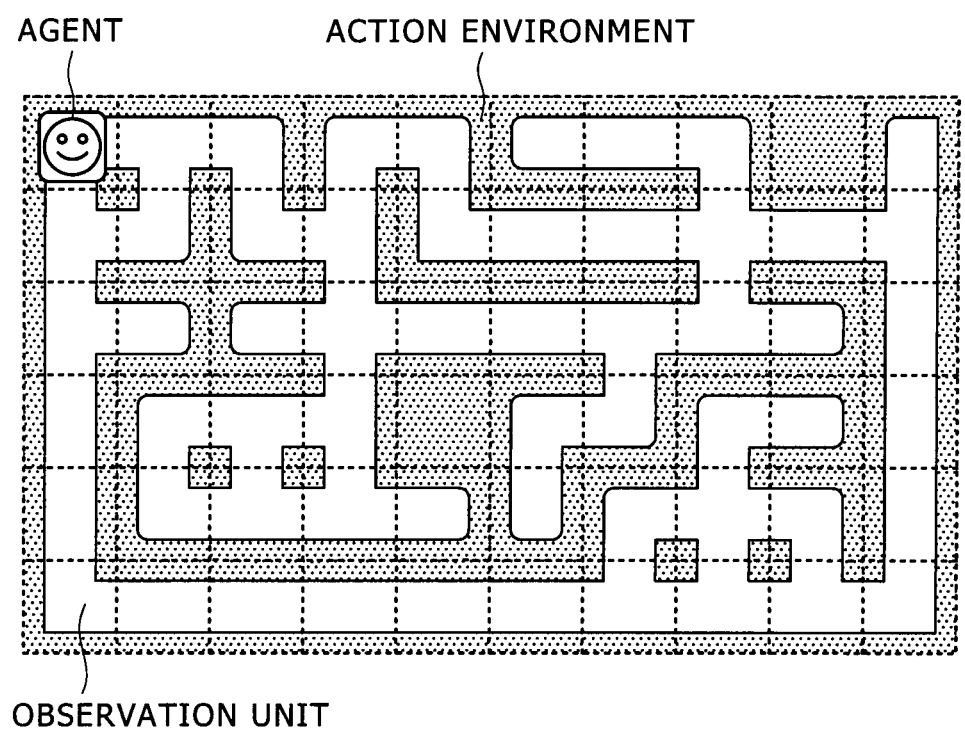
FIG. 1 is a diagram showing an action environment.

FIG. 1 is a diagram showing an example of an action environment in which an agent to which an information processing device according to the present invention is applied performs action.

The agent is a device such for example as a robot (which may be a robot acting in a real world or may be a virtual robot acting in a virtual world) capable of autonomously performing action such as movement and the like (capable of action).

The agent is capable of changing the conditions of the agent itself by performing action, and observing externally observable information and recognizing the conditions using an observed value as a result of the observation.

In addition, the agent constructs a model of the action environment (environment model) in which the agent performs action, in order to recognize conditions and determine (select) an action to be performed in each condition.

The agent performs efficient modeling (constructs an environment model) of not only an action environment having a fixed structure but also an action environment having a structure not fixed but changing probabilistically.

The action environment in FIG. 1 is a labyrinth in a two-dimensional plane, and the structure of the action environment changes probabilistically. In the action environment of FIG. 1, the agent can move in hollow parts in the figure as a passage.

Figure 2:
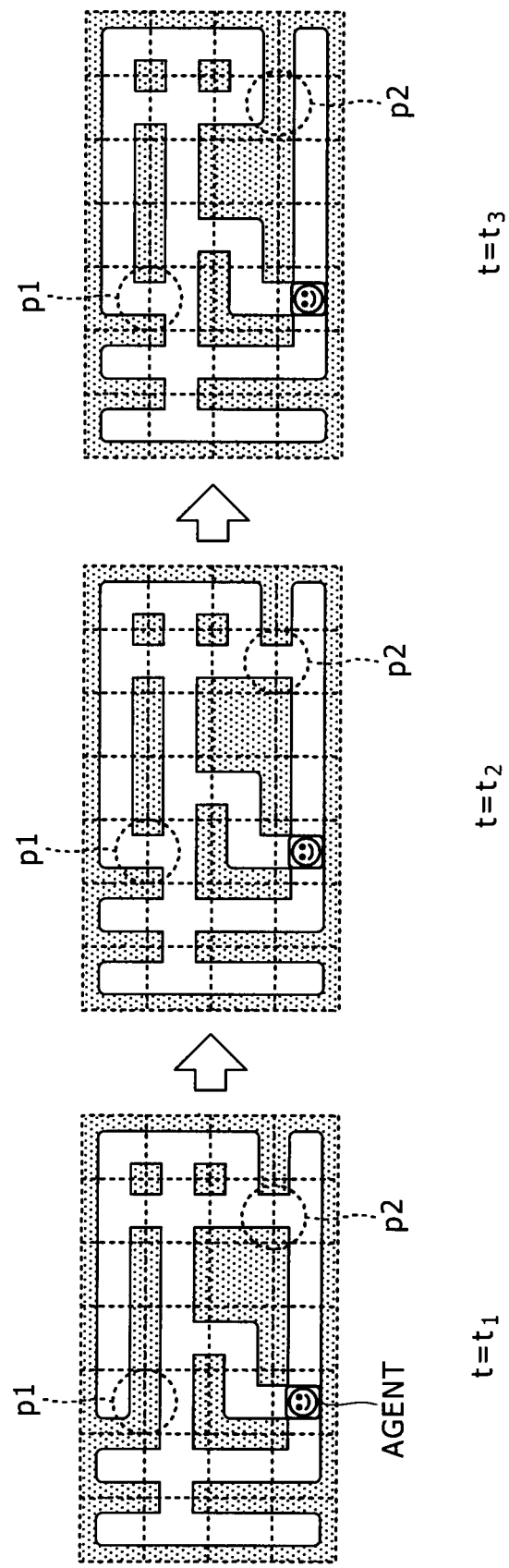
FIG. 2 is a diagram showing states in which the structure of the action environment is changed.

FIG. 2 is a diagram showing states in which the structure of the action environment is changed.

In the action environment of FIG. 2, at time $t=t_1$, a position p1 is a wall, and a position p2 is a passage. Thus, at time $t=t_1$, the action environment has a structure in which the agent cannot pass through the position p1 but can pass through the position p2.

Thereafter, at time $t=t_2(>t_1)$, the position p1 is changed from the wall to a passage, and the action environment consequently has a structure in which the agent can pass through both of the positions p1 and p2.

Further, at a subsequent time $t=t_3$, the position p2 is changed from the passage to a wall, and the action environment consequently has a structure in which the agent can pass through the position p1 but cannot pass through the position p2.

[Actions Performed by Agent and Observed Values Observed by Agent]

Figures 3A, 3B:
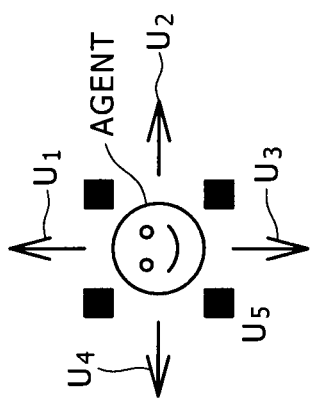
FIGS. 3A and 3B are diagrams showing actions performed by the agent and observed values observed by the agent.

FIGS. 3A and 3B show an example of actions performed by the agent and observed values observed by the agent in the action environment.

The agent sets areas divided in the form of squares by dotted lines in FIG. 1 in the action environment as shown in the figure as units in which to observe observed values (observation units). The agent performs actions of moving in the observation units.

FIG. 3A shows kinds of action performed by the agent.

In FIG. 3A, the agent can perform five actions $U_1$ to $U_5$ in total, the action $U_1$ being moving in an upward direction in the figure by an observation unit, the action $U_2$ being moving in a right direction in the figure by an observation unit, the action $U_3$ being moving in a downward direction in the figure by an observation unit, the action $U_4$ being moving in a left direction in the figure by an observation unit, and the action $U_5$ being not moving (doing nothing).

FIG. 3B schematically shows kinds of observed values observed by the agent in observation units.

The agent in the present embodiment observes one of 15 kinds of observed values (symbols) $O_1$ to $O_{15}$ in observation units.

The observed value $O_1$ is observed in an observation unit having a wall at the top, bottom, and left and having a passage at the right. The observed value $O_2$ is observed in an observation unit having a wall at the top, left, and right and having a passage at the bottom.

The observed value $O_3$ is observed in an observation unit having a wall at the top and left and having a passage at the bottom and right. The observed value $O_4$ is observed in an observation unit having a wall at the top, bottom, and right and having a passage at the left.

The observed value $O_5$ is observed in an observation unit having a wall at the top and bottom and having a passage at the left and right. The observed value $O_6$ is observed in an observation unit having a wall at the top and right and having a passage at the bottom and left.

The observed value $O_7$ is observed in an observation unit having a wall at the top and having a passage at the bottom, left, and right. The observed value $O_8$ is observed in an observation unit having a wall at the bottom, left, and right and having a passage at the top.

The observed value $O_9$ is observed in an observation unit having a wall at the bottom and left and having a passage at the top and right. The observed value $O_{10}$ is observed in an observation unit having a wall at the left and right and having a passage at the top and bottom.

The observed value $O_{11}$ is observed in an observation unit having a wall at the left and having a passage at the top, bottom, and right. The observed value $O_{12}$ is observed in an observation unit having a wall at the bottom and right and having a passage at the top and left.

The observed value $O_{13}$ is observed in an observation unit having a wall at the bottom and having a passage at the top, left, and right. The observed value $O_{14}$ is observed in an observation unit having a wall at the right and having a passage at the top, bottom, and left.

The observed value $O_{15}$ is observed in an observation unit having a passage at all of the top, bottom, left, and right.

Incidentally, an action $U_m(m=1, 2, \ldots, M$ (M is a total number of actions (kinds of actions))) and an observed value $O_k(k=1, 2, \ldots, K$ (K is a total number of observed values)) are each a discrete value.

[Example of Configuration of Agent]

Figure 4:
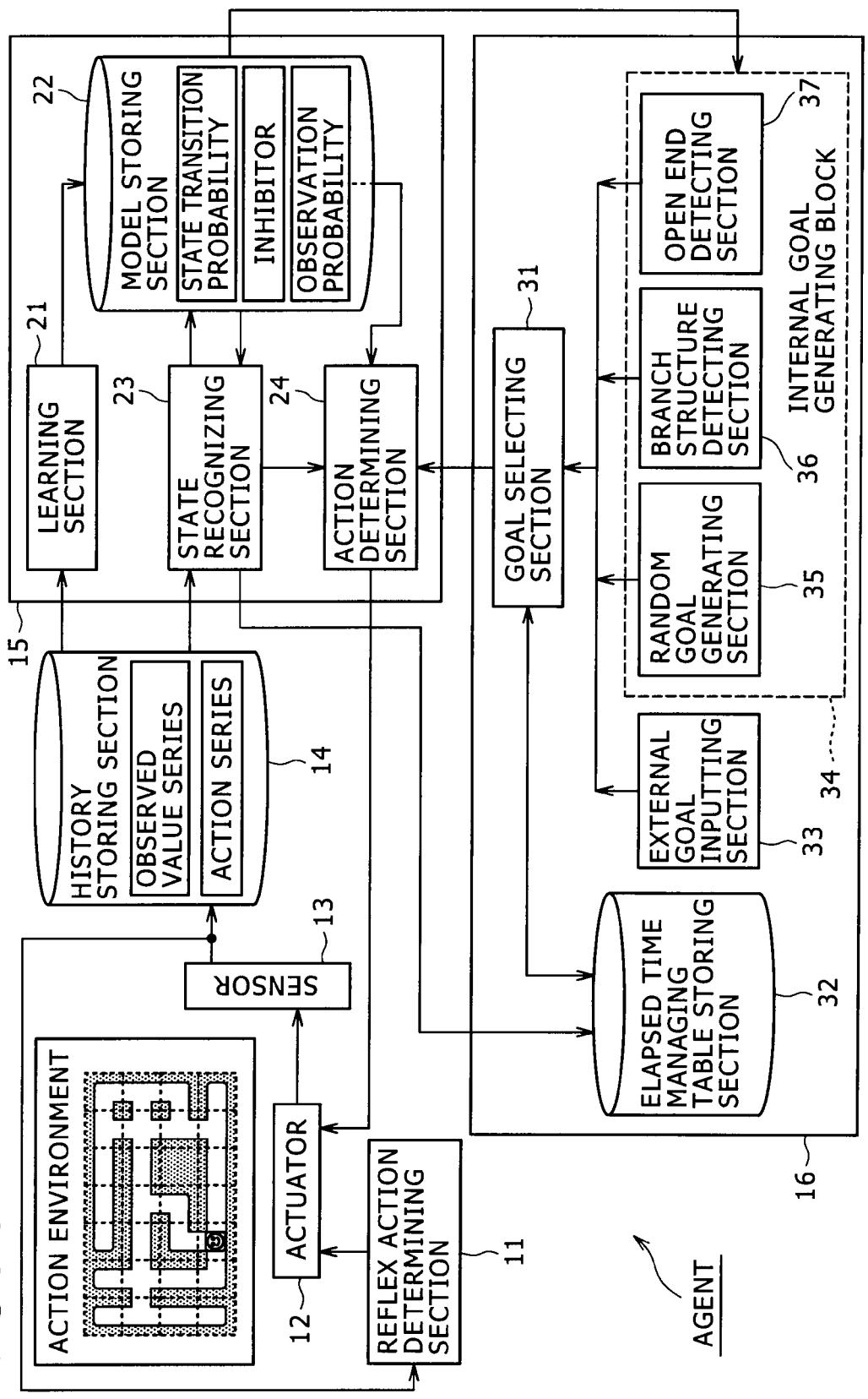
FIG. 4 is a block diagram showing an example of configuration of an embodiment of an agent to which an information processing device according to the present invention is applied.

FIG. 4 is a block diagram showing an example of configuration of an embodiment of the agent to which the information processing device according to the present invention is applied.

The agent obtains an environment model resulting from modeling the action environment by learning.

In addition, the agent recognizes present conditions of the agent itself using a series of observed values (observed value series).

Further, the agent makes a plan of actions to be performed to move from the present conditions to a certain goal (action plan), and determines an action to be performed next according to the action plan.

Incidentally, the learning, recognition of conditions, and making of the action plan (determination of actions) that are performed by the agent can be applied to not only a problem (task) of the agent moving to the top, bottom, left, or right in observation units but also a problem that is generally taken up as a problem of reinforcement learning and which is capable of formulation in the framework of a Markov decision process (MDP).

In FIG. 4, the agent moves in observation units by performing an action $U_m$ shown in FIG. 3A in the action environment, and obtains an observed value $O_k$ observed in an observation unit after the movement.

Then, the agent learns the action environment (structure of the action environment (environment model resulting from modeling the action environment)) and determines an action to be performed next using an action series, which is a series of actions $U_m$ (symbols representing the actions $U_m$) performed up to now, and an observed value series, which is a series of observed values $O_k$ (symbols representing the observed values $O_k$) observed up to now.

There are two modes in which the agent performs action, that is, a reflex action mode (reflex act mode) and a recognition action mode (recognition act mode).

In the reflex action mode, a rule for determining an action to be performed next from the observed value series and the action series obtained in the past is designed as an innate rule.

In this case, as the innate rule, a rule for determining an action so as not to hit a wall (allowing to-and-fro movement in a passage) or a rule for determining an action so as not to hit a wall and so as not to retrace a taken path until coming to a dead end, for example, can be employed.

According to the innate rule, the agent repeats determining an action to be performed next for an observed value observed in the agent and observing an observed value in an observation unit after performing the action.

The agent thereby obtains an action series and an observed value series when the agent has moved in the action environment. The action series and the observed value series thus obtained in the reflex action mode are used to learn the action environment. That is, the reflex action mode is used mainly to obtain the action series and the observed value series serving as learning data used in learning the action environment.

In the recognition action mode, the agent determines a goal, recognizes present conditions, and determines an action plan for achieving the goal from the present conditions. The agent then determines an action to be performed next according to the action plan.

Incidentally, switching between the reflex action mode and the recognition action mode can be performed according to an operation by a user, for example.

In FIG. 4, the agent includes a reflex action determining section 11, an actuator 12, a sensor 13, a history storing section 14, an action controlling section 15, and a goal determining section 16.

The reflex action determining section 11 is supplied with an observed value observed in the action environment and output by the sensor 13.

The reflex action determining section 11 in the reflex action mode determines an action to be performed next for the observed value supplied from the sensor 13 according to the innate rule, and controls the actuator 12.

The actuator 12 is for example a motor for making the agent walk when the agent is a robot walking in a real world. The actuator 12 performs driving under control of the reflex action determining section 11 or an action determining section 24 to be described later. With the actuator performing driving, the agent performs an action determined by the reflex action determining section 11 or the action determining section 24 in the action environment.

The sensor 13 senses externally observable information, and outputs an observed value as a result of the sensing.

That is, the sensor 13 observes an observation unit in which the agent is located in the action environment, and outputs a symbol representing the observation unit as an observed value.

Incidentally, the sensor 13 in FIG. 4 also observes the actuator 12, and thereby also outputs an action performed by the agent (symbol representing the action).

The observed value output by the sensor 13 is supplied to the reflex action determining section 11 and the history storing section 14. In addition, the action output by the sensor 13 is supplied to the history storing section 14.

The history storing section 14 sequentially stores the observed value and the action output by the sensor 13. The history storing section 14 thereby stores a series of observed values (observed value series) and a series of actions (action series).

Incidentally, while a symbol representing an observation unit in which the agent is located is employed as an externally observable observed value in this case, a set of a symbol representing an observation unit in which the agent is located and a symbol representing an action performed by the agent can be employed as the observed value.

The action controlling section 15 learns a state transition probability model as an environment model for making the structure of the action environment stored (obtained), using the observed value series and the action series stored in the history storing section 14.

In addition, the action controlling section 15 calculates an action plan on the basis of the state transition probability model after learning. Further, the action controlling section 15 determines an action to be performed next by the agent according to the action plan, and controls the actuator 12 according to the action, thereby making the agent perform the action.

Specifically, the action controlling section 15 includes a learning section 21, a model storing section 22, a state recognizing section 23, and an action determining section 24.

The learning section 21 learns the state transition probability model stored in the model storing section 22 using the action series and the observed value series stored in the history storing section 14.

In this case, the state transition probability model learned by the learning section 21 is a state transition probability model defined by state transition probability for each action that a state makes a state transition due to an action performed by the agent and observation probability that a predetermined observed value is observed from a state.

There is for example an HMM (Hidden Markov Model) as the state transition probability model. However, the state transition probability of an ordinary HMM is not present for each action. Accordingly, in the present embodiment, the state transition probability of the HMM (Hidden Markov Model) is extended to state transition probability for each action performed by the agent. The HMM having state transition probability thus extended (which HMM will be referred to also as an extended HMM) is employed as an object for learning by the learning section 21.

The model storing section 22 stores the extended HMM (state transition probability, observation probability and the like as model parameters defining the extended HMM). In addition, the model storing section 22 stores an inhibitor to be described later.

The state recognizing section 23 in the recognition action mode recognizes the present conditions of the agent on the basis of the extended HMM stored in the model storing section 22 using the action series and the observed value series stored in the history storing section 14, and obtains (recognizes) a present state as a state of the extended HMM which state corresponds to the present conditions.

The state recognizing section 23 then supplies the present state to the action determining section 24.

In addition, the state recognizing section 23 updates the inhibitor stored in the model storing section 22 and updates an elapsed time managing table stored in an elapsed time managing table storing section 23 to be described later according to the present state and the like.

The action determining section 24 functions as a planner for planning actions to be performed by the agent in the recognition action mode.

Specifically, the action determining section 24 is supplied with the present state from the state recognizing section 23, and is also supplied with one of states of the extended HMM stored in the model storing section 22 as a goal state as a goal from the goal determining section 16.

The action determining section 24 calculates (determines) an action plan as a series of actions that maximizes the likelihood of state transition from the present state from the state recognizing section 23 to the goal state from the goal determining section 16 on the basis of the extended HMM stored in the model storing section 22.

Further, the action determining section 24 determines an action to be performed next by the agent according to the action plan, and controls the actuator 12 according to the determined action.

The goal determining section 16 in the recognition action mode determines the goal state, and then supplies the goal state to the action determining section 24.

Specifically, the goal determining section 16 includes a goal selecting section 31, an elapsed time managing table storing section 32, an external goal inputting section 33, and an internal goal generating block 34.

The goal selecting section 31 is supplied with an external goal as a goal state from the external goal inputting section 33 and an internal goal as a goal state from the internal goal generating block 34.

The goal selecting section 31 selects the state as the external goal from the external goal inputting section 33 or the state as the internal goal from the internal goal generating block 34, determines the selected state as a goal state, and then supplies the goal state to the action determining section 24.

The elapsed time managing table storing section 32 stores an elapsed time managing table. For each state of the extended HMM stored in the model storing section 22, an elapsed time elapsed since the state became a present state and the like are registered in the elapsed time managing table.

The external goal inputting section 33 sets a state externally supplied from the outside (of the agent) as an external goal, which is a goal state, and then supplies the external goal to the goal selecting section 31.

That is, the external goal inputting section 33 is for example operated by a user when the user externally specifies a state as a goal state. The external goal inputting section 33 sets the state specified by the operation of the user as an external goal, which is a goal state, and then supplies the external goal to the goal selecting section 31.

The internal goal generating block 34 generates an internal goal as a goal state inside (of the agent), and then supplies the internal goal to the goal selecting section 31.

Specifically, the internal goal generating block 34 includes a random goal generating section 35, a branch structure detecting section 36, and an open end detecting section 37.

The random goal generating section 35 randomly selects one state from the states of the extended HMM stored in the model storing section 22 as a random goal, sets the random goal as an internal goal, which is a goal state, and then supplies the internal goal to the goal selecting section 31.

The branch structure detecting section 36 detects a state of branch structure, which state can make a state transition to different states when a same action is performed, on the basis of the state transition probability of the extended HMM stored in the model storing section 22, sets the state of branch structure as an internal goal, which is a goal state, and then supplies the internal goal to the goal selecting section 31.

Incidentally, when the branch structure detecting section 36 detects a plurality of states as states of branch structure from the extended HMM, the goal selecting section 31 refers to the elapsed time managing table in the elapsed time managing table storing section 32, and selects a state of branch structure whose elapsed time is a maximum among the plurality of states of branch structure as a goal state.

The open end detecting section 37 detects an open end, which has a state transition yet to be made among state transitions that can be made with a state in which a predetermined observed value is observed as a transition source in the extended HMM stored in the model storing section 22 and which is another state in which the same observed value as the predetermined observed value is observed. Then, the open end detecting section 37 sets the open end as an internal goal, which is a goal state, and supplies the internal goal to the goal selecting section 31.

[Process in Reflex Action Mode]

FIG. 5 is a flowchart of assistance in explaining a process in the reflex action mode which process is performed by the agent of FIG. 4.

In step S11, the reflex action determining section 11 sets a variable t for counting time to 1, for example, as an initial value. The process then proceeds to step S12.

In step S12, the sensor 13 obtains a present observed value (observed value at time t) $o_t$ from the action environment, and outputs the observed value $o_t$. The process then proceeds to step S13.

The observed value $o_t$ at time t in the present embodiment is one of the 15 observed value $O_1$ to $O_{15}$ shown in FIG. 3B.

In step S13, the agent supplies the observed value $o_t$ output by the sensor 13 to the reflex action determining section 11. The process then proceeds to step S14.

In step S14, the reflex action determining section 11 determines an action $u_t$ to be performed at time t for the observed value $o_t$ from the sensor 13 according to the innate rule, and controls the actuator 12 according to the action $u_t$. The process then proceeds to step S15.

The action $u_t$ at time t in the present embodiment is one of the five actions $U_1$ to $U_5$ shown in FIG. 3A.

The action $u_t$ determined in step S14 will hereinafter be referred to also as the determined action $u_t$.

In step S15, the actuator 12 performs driving under control of the reflex action determining section 11. The agent thereby performs the determined action $u_t$.

At this time, the sensor 13 observes the actuator 12, and outputs the action $u_t$ performed by the agent (symbol representing the action $u_t$).

The process then proceeds from step S15 to step S16, where the history storing section 14 stores the observed value $o_t$ and the action $u_t$ output by the sensor 13 in a form of being added to a series of observed values and actions already stored as a history of observed values and actions. The process then proceeds to step S17.

In step S17, the reflex action determining section 11 determines whether the agent has performed action a number of times which number is specified (set) in advance as a number of actions to be performed in the reflex action mode.

When it is determined in step S17 that the agent has not yet performed action the number of times which number is specified in advance, the process proceeds to step S18, where the reflex action determining section 11 increments time t by one. The process then returns from step S18 to step S12 to thereafter repeat a similar process.

When it is determined in step S17 that the agent has performed action the number of times which number is specified in advance, that is, when time t is equal to the number of times which number is specified in advance, the process in the reflex action mode is ended.

According to the process in the reflex action mode, a series of observed values $o_t$ (observed value series) and a series of actions $u_t$ performed by the agent when the observed values $o_t$ are observed (action series) (a series of actions $u_t$ and a series of values $o_{t+1}$ observed in the agent when the actions $u_t$ have been performed) are stored in the history storing section 14.

Then, the learning section 21 in the agent learns an extended HMM using the observed value series and the action series stored in the history storing section 14 as learning data.

In the extended HMM, the state transition probability of an ordinary (existing) HMM is extended to state transition probability for each action performed by the agent.

Figure 6A:
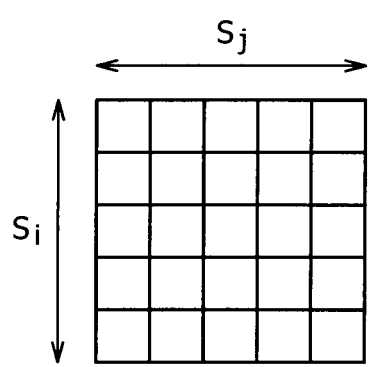
FIGS. 6A and 6B are diagrams of assistance in explaining the state transition probability of an extended HMM.
Figure 6B:
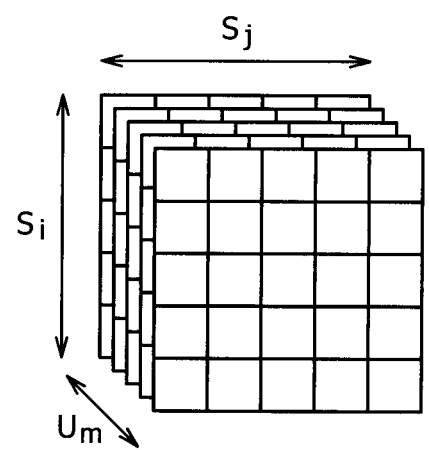

FIGS. 6A and 6B are diagrams of assistance in explaining the state transition probability of the extended HMM.

FIG. 6A shows the state transition probability of an ordinary HMM.

Now suppose that an ergodic HMM in which a state transition from a certain state to an arbitrary state is possible is employed as HMMs including the extended HMM. Also suppose that the number of states of an HMM is N.

In this case, the ordinary HMM has the state transition probabilities $a_{ij}$ of N×N state transitions from each of N states $S_i$ to each of N states $S_j$ as a model parameter.

All the state transition probabilities of the ordinary HMM can be represented by a two-dimensional table in which the state transition probability $a_{ij}$ of a state transition from a state $S_i$ to a state $S_j$ is disposed in an ith row from the top and a jth column from the left.

The table of state transition probabilities of an HMM will hereinafter be described also as state transition probability A.

FIG. 6B shows the state transition probability A of the extended HMM.

The extended HMM has state transition probabilities for each action $U_m$ performed by the agent.

The state transition probability of a state transition from a state $S_i$ to a state $S_j$ with respect to a certain action $U_m$ will hereinafter be described also as state transition probability $a_{ij}(U_m)$.

The state transition probability $a_{ij}(U_m)$ represents a probability of a state transition occurring from a state $S_i$ to a state $S_j$ when the agent performs an action $U_m$.

All the state transition probabilities of the extended HMM can be represented by a three-dimensional table in which the state transition probability $a_{ij}(U_m)$ of a state transition from a state $S_i$ to a state $S_j$ with respect to an action $U_m$ is disposed in an ith row from the top, a jth column from the left, and an mth plane in a direction of depth from the front side.

Hereinafter, in the three-dimensional table of the state transition probability A, an axis in a vertical direction will be referred to as an i-axis, an axis in a horizontal direction will be referred to as a j-axis, and an axis in the direction of depth will be referred to as an m-axis or an action axis.

In addition, a plane composed of state transition probabilities $a_{ij}(U_m)$ which plane is obtained by cutting the three-dimensional table of the state transition probability A with a plane perpendicular to the action axis at a position m on the action axis will be referred to also as a state transition probability plane with respect to an action $U_m$.

Further, a plane composed of state transition probabilities $a_{Ij}(U_m)$ which plane is obtained by cutting the three-dimensional table of the state transition probability A with a plane perpendicular to the i-axis at a position I on the i-axis will be referred to also as an action plane with respect to a state $S_I$.

The state transition probabilities $a_{Ij}(U_m)$ forming the action plane with respect to the state $S_I$ represent a probability of each action $U_m$ being performed when a state transition occurs with the state $S_I$ as a transition source.

Incidentally, as with the ordinary HMM, the extended HMM has not only the state transition probability $a_{ij}(U_m)$ for each action but also initial state probability $\pi_i$ of being in a state $S_i$ at an initial time t=1 and observation probability $b_i(O_k)$ of an observed value $O_k$ being observed in the state $S_i$ as model parameters.

[Learning Extended HMM]

Figure 7:
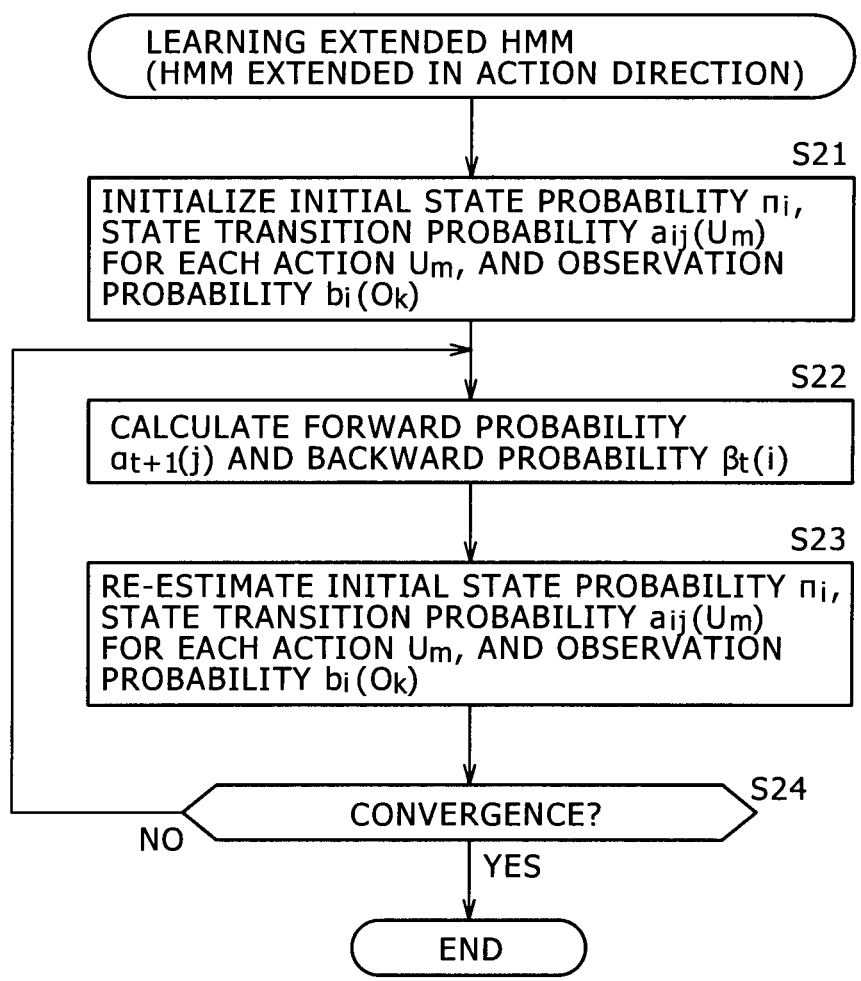
FIG. 7 is a flowchart of assistance in explaining a process of learning the extended HMM.

FIG. 7 is a flowchart of assistance in explaining a process of learning the extended HMM which process is performed by the learning section 21 in FIG. 4 using the observed value series and the action series as learning data stored in the history storing section 14.

In step S21, the learning section 21 initializes the extended HMM.

Specifically, the learning section 21 initializes the initial state probability $\pi_i$, the state transition probability $a_{ij}(U_m)$ (for each action), and the observation probability $b_i(O_k)$ as model parameters of the extended HMM stored in the model storing section 22.

Incidentally, supposing that the number (total number) of states of the extended HMM is N, the initial state probability $\pi_i$ is initialized to 1/N, for example. Supposing in this case that the action environment, which is a labyrinth in a two-dimensional plane, is composed of a×b observation units, that is, a horizontal observation units and b vertical observation units, the number of (a+Δ)×(b+Δ) states, where Δ is an integer as a margin, can be employed as the number N of states of the extended HMM.

In addition, the state transition probability $a_{ij}(U_m)$ and the observation probability $b_i(O_k)$ are initialized to a random value that can be assumed as a probability value, for example.

In this case, the state transition probability $a_{ij}(U_m)$ is initialized such that a sum total of state transition probabilities $a_{ij}(U_m)$ of each row in a state transition probability plane with respect to each action $U_m$ ($a_{i,1}(U_m)+a_{i,2}(U_m)+ \ldots +a_{i,N}(U_m)$) is 1.0.

Similarly, the observation probability $b_i(O_k)$ is initialized such that a sum total of observation probabilities of observed values $O_1, O_2, \ldots, O_K$ being observed from each state $S_i$ ($b_i(O_1)+b_i(O_2)+ \ldots +b_i(O_K)$) is 1.0.

Incidentally, when so-called incremental learning is performed, the initial state probability $\pi_i$, the state transition probability $a_{ij}(U_m)$, and the observation probability $b_i(O_k)$ of the extended HMM stored in the model storing section 22 are used as initial values as they are. That is, the initialization in step S21 is not performed.

After step S21, the process proceeds to step S22. From step S22 on down, the learning of the extended HMM is performed which estimates the initial state probability $\pi_i$, the state transition probability $a_{ij}(U_m)$ for each action, and the observation probability $b_i(O_k)$ according to a Baum-Welch re-estimation method (method obtained by extending the Baum-Welch re-estimation method with respect to action) using the action series and the observed value series as learning data stored in the history storing section 14.

Specifically, in step S22, the learning section 21 calculates forward probability $\alpha_{t+1}(j)$ and backward probability $\beta_t(i)$.

In the extended HMM, when an action $u_t$ is performed at time t, a state transition occurs from a present state $S_i$ to a state $S_j$, and an observed value $o_{t+1}$ is observed in the state $S_j$ after the state transition at next time t+1.

In such an extended HMM, the forward probability $\alpha_{t+1}(j)$ is probability $P(o_1, o_2, \ldots, o_{t+1}, u_1, u_2, \ldots u_t, s_{t+1}=j|\Lambda)$ of the action series $u_1, u_2, \ldots, u_t$ of the learning data being observed, the observed value series $o_1, o_2, \ldots, o_{t+1}$ being observed, and the agent being in the state $S_j$ at time t+1 in a model $\Lambda$, which is the present extended HMM (extended HMM defined by the initial state probability $\pi_i$, the state transition probability $a_{ij}(U_m)$, and the observation probability $b_i(O_k)$ actually stored in the model storing section 22). The forward probability $\alpha_{t+1}(j)$ is expressed by equation (1).

$$\alpha_{t+1}(j) = P(o_1, o_2, \ldots, o_{t+1}, u_1, u_2, \ldots, u_t, s_{t+1} = j | \Lambda) \quad (1)$$
$$= \sum_{i=1}^{N} \alpha_t(i) a_{ij}(u_t) b_j(o_{t+1})$$

Incidentally, a state $s_t$ represents a state at time t, and is one of states $S_1$ to $S_N$ when the number of states of the extended HMM is N. In addition, an equation $s_{t+1}=j$ denotes that a state $s_{t+1}$ at time t+1 is a state $S_j$.

The forward probability $\alpha_{t+1}(j)$ of equation (1) represents a probability of the agent being in a state $S_j$ at time t+1 and observing an observed value $o_{t+1}$ after a state transition is effected by performing (observing) an action $u_t$ when the agent observes the action series $u_1, u_2, \ldots, u_{t-1}$ and the observed value series $o_1, o_2, \ldots, o_t$ of the learning data and is in a state $s_t$ at time t.

Incidentally, the initial value $\alpha_1(j)$ of the forward probability $\alpha_{t+1}(j)$ is expressed by equation (2).

$$\alpha_1(j) = \pi_j b_j(o_1) \quad (2)$$

The initial value $\alpha_1(j)$ of equation (2) represents a probability of being in the state $S_j$ at first (time t=0) and observing an observed value $o_1$.

In addition, in the extended HMM, the backward probability $\beta_t(i)$ is probability $P(o_{t+1}, o_{t+2}, \ldots, o_T, u_{t+1}, u_{t+2}, \ldots, u_{T-1}, s_t=i|\Lambda)$ of the agent being in a state $S_i$ at time t, and thereafter observing the action series $u_{t+1}, u_{t+2}, \ldots, u_{T-1}$ of the learning data and observing the observed value series $o_{t+1}, o_{t+2}, \ldots, o_T$ in the model $\Lambda$, which is the present extended HMM. The backward probability $\beta_t(i)$ is expressed by equation (3).

$$\beta_t(i) = P(o_{t+1}, o_{t+2}, \ldots, o_T, u_{t+1}, u_{t+2}, \ldots, u_{T-1}, s_t = j | \Lambda) \quad (3)$$
$$= \sum_{i=1}^{N} a_{ij}(u_{t+1}) b_j(o_{t+1}) \beta_{t+1}(j)$$

Incidentally, T denotes the number of observed values of the observed value series of the learning data.

The backward probability $\beta_t(i)$ of equation (3) represents a probability of a state $s_t$ at time t being the state $S_i$ when a state $s_{t+1}$ at time t+1 is a state $S_j$ and an observed value $o_{t+1}$ is observed after a state transition is effected by performing (observing) an action $u_t$ in the state $S_i$ at time t in a case where the agent is in the state $S_j$ at time t+1, and thereafter observing the action series $u_{t+1}, u_{t+2}, \ldots, u_{T-1}$ of the learning data and observing the observed value series $o_{t+2}, O_{t+3}, \ldots, o_T$.

Incidentally, the initial value $\beta_T(i)$ of the backward probability $\beta_t(i)$ is expressed by equation (4).

$$\beta_T(i)=1 \quad (4)$$

The initial value $\beta_T(i)$ of equation (4) indicates that a probability of being in the state $S_i$ at the end (time t=T) is 1.0, that is, that the agent is always in the state $S_i$ at the end.

The extended HMM is different from the ordinary HMM in that the extended HMM uses the state transition probability $a_{ij}(u_t)$ for each action as state transition probability of a state transition from a certain state $S_i$ to a certain state $S_j$, as shown in equation (1) and equation (3).

After the forward probability $\alpha_{t+1}(j)$ and the backward probability $\beta_t(i)$ are calculated in step S22, the process proceeds to step S23, where the learning section 21 re-estimates the initial state probability $\pi_i$, the state transition probability $a_{ij}(U_m)$ for each action $U_m$, and the observation probability $b_i(O_k)$ as model parameters $\Lambda$ of the extended HMM using the forward probability $\alpha_{t+1}$ and the backward probability $\beta_t(i)$.

In this case, the re-estimation of the model parameters are performed as follows by extending the Baum-Welch re-estimation method as state transition probability is extended to the state transition probability $a_{ij}(U_m)$ for each action $U_m$.

A probability $\xi_{t+1}(i, j, U_m)$ of a state transition being made to a state $S_j$ at time t+1 by performing an action $U_m$ in a state $S_i$ at time t in a case where an action series $U=u_1, u_2, \ldots, u_{T-1}$ and an observed value series $O=o_1, o_2, o_T$ are observed in the model $\Lambda$ as the present extended HMM is expressed by equation (5) using forward probability $\alpha_t(i)$ and backward probability $\beta_{t+1}(j)$.

$$\xi_{t+1}(i, j, U_m) = P(s_t = i, s_{t+1} = j, u_t = U_m | O, U, \Lambda) \quad (5)$$
$$= \frac{\alpha_t(i) a_{ij}(U_m) b_j(o_{t+1}) \beta_{t+1}(j)}{P(O, U | \Lambda)} \quad (1 \leq t \leq T - 1)$$

Further, a probability $\gamma_t(i, U_m)$ of action $u_t=U_m$ being performed in the state $S_i$ at time t can be calculated as a probability obtained by marginalizing the probability $\xi_{t+1}(i, j, U_m)$ with respect to the state $S_j$ at time t+1. The probability $\gamma_t(i, U_m)$ is expressed by equation (6).

$$\gamma_t(i, U_m) = P(s_t = i, u_t = U_m \mid O, U, \Lambda) \qquad (6)$$

$$= \sum_{j=1}^{N} \xi_{t+1}(i, j, U_m) \; (1 \le t \le T-1)$$

The learning section 21 re-estimates the model parameters $\Lambda$ of the extended HMM using the probability $\xi_{t+1}(i, j, U_m)$ of equation (5) and the probability $\gamma_t(i, U_m)$ of equation (6).

Supposing that estimated values obtained by re-estimating the model parameters $\Lambda$ are represented as model parameters $\Lambda'$ using a prime ('), the estimated value $\pi'_i$ of initial state probability, which estimated value is a model parameter $\Lambda'$, is obtained according to equation (7).

$$\pi'_i = \frac{\alpha_1(i)\beta_1(i)}{P(O, U \mid \Lambda)} \; (1 \le i \le N) \qquad (7)$$

In addition, the estimated value $a'_{ij}(U_m)$ of state transition probability for each action, which estimated value is a model parameter $\Lambda'$, is obtained according to equation (8).

$$a'_{ij}(U_m) = \frac{\sum_{t=1}^{T-1} \xi_{t+1}(i, j, U_m)}{\sum_{t=1}^{T-1} \gamma_t(i, U_m)} = \frac{\sum_{t=1}^{T-1} \alpha_t(i)a_{ij}(U_m)b_j(o_{t+1})\beta_{t+1}(j)}{\sum_{t=1}^{T-1}\sum_{j=1}^{N} \alpha_t(i)a_{ij}(U_m)b_j(o_{t+1})\beta_{t+1}(j)} \qquad (8)$$

The numerator of the estimated value $a'_{ij}(U_m)$ of state transition probability of equation (8) represents an expected value of the number of times of making a state transition to the state $S_j$ by performing the action $u_t=U_m$ in the state $S_i$, and the denominator of the estimated value $a'_{ij}(U_m)$ of state transition probability of equation (8) represents an expected value of the number of times of making a state transition by performing the action $u_t=U_m$ in the state $S_i$.

The estimated value $b'_j(O_k)$ of observation probability, which estimated value is a model parameter $\Lambda'$, is obtained according to equation (9).

$$b'_j(O_k) = \frac{\sum_{t=1}^{T-1}\sum_{i=1}^{N}\sum_{M=1}^{M} \xi_{t+1}(i, j, U_m, O_k)}{\sum_{t=1}^{T-1}\sum_{i=1}^{N}\sum_{m=1}^{M} \xi_{t+1}(i, j, U_m)} = \frac{\sum_{t=1}^{T-1} \alpha_{t+1}(j)b_j(O_k)\beta_{t+1}(j)}{\sum_{t=1}^{T-1} \alpha_{t+1}(j)\beta_{t+1}(j)} \qquad (9)$$

The numerator of the estimated value $b'_j(O_k)$ of observation probability of equation (9) represents an expected value of the number of times of making a state transition to the state $S_j$ and observing an observed value $O_k$ in the state $S_j$, and the denominator of the estimated value $b'_j(O_k)$ of observation probability of equation (9) represents an expected value of the number of times of making a state transition to the state $S_j$.

After re-estimating the estimated values $\pi'_i$, $a'_{ij}(U_m)$, and $b'_j(O_k)$ of initial state probability state, transition probability, and observation probability as model parameters $\Lambda'$ in step S23, the learning section 21 stores each of the estimated values n'$_i$ as new initial state probability $\pi_i$, the estimated value $a'_{ij}(U_m)$ as new state transition probability $a_{ij}(U_m)$, and the estimated value $b'_j(O_k)$ as new observation probability $b_j(O_k)$ in the model storing section 22 in an overwriting manner. The process then proceeds to step S24.

In step S24, whether the model parameters of the extended HMM, that is, the (new) initial state probability $\pi_i$, the (new) state transition probability $a_{ij}(U_m)$, and the (new) observation probability $b_j(O_k)$ stored in the model storing section 22 have converged is determined.

When it is determined in step S24 that the model parameters of the extended HMM have not converged yet, the process returns to step S22 to repeat a similar process using new initial state probability $\pi_i$, new state transition probability $a_{ij}(U_m)$, and new observation probability $b_j(O_k)$ stored in the model storing section 22.

When it is determined in step S24 that the model parameters of the extended HMM have converged, that is, when the model parameters of the extended HMM after the re-estimation in step S23 are hardly changed from the model parameters of the extended HMM before the re-estimation in step S23, for example, the process of learning the extended HMM is ended.

As described above, by learning the extended HMM defined by the state transition probability $a_{ij}(U_m)$ for each action using the action series of actions performed by the agent and the observed value series of observed values observed in the agent when the agent has performed the actions, the structure of the action environment is obtained through the observed value series in the extended HMM, and relation between each observed value and an action performed when the observed value is observed (relation between actions performed by the agent and observed values observed when the actions have been performed (observed values observed after the actions)) is obtained.

As a result, as will be described later, an appropriate action can be determined as an action to be performed by the agent in the action environment in the recognition action mode by using the extended HMM after such learning.

[Process in Recognition Action Mode]

Figure 8:
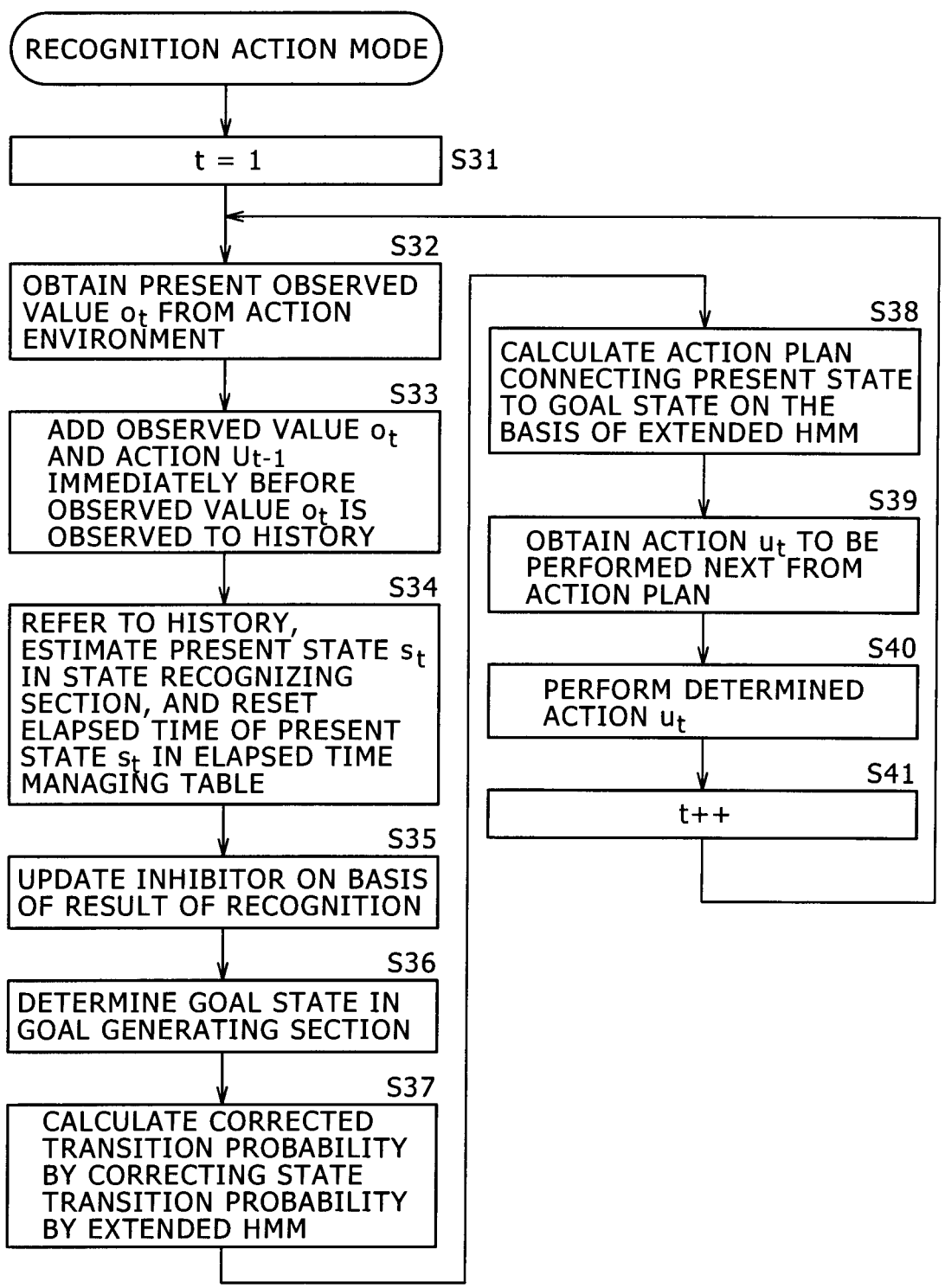
FIG. 8 is a flowchart of assistance in explaining a process in a recognition action mode.

FIG. 8 is a flowchart of assistance in explaining a process in the recognition action mode which process is performed by the agent in FIG. 4.

In the recognition action mode, as described above, the agent determines a goal, recognizes present conditions, and calculates an action plan to achieve the goal from the present conditions. Further, the agent determines an action to be performed next according to the action plan, and performs the action. The agent then repeats the above process.

In step S31, the state recognizing section 23 sets a variable t for counting time to 1, for example, as an initial value. The process then proceeds to step S32.

In step S32, the sensor 13 obtains a present observed value (observed value at time t) $o_t$ from the action environment, and outputs the observed value $o_t$. The process then proceeds to step S33.

In step S33, the history storing section 14 stores the observed value $o_t$ at time t which observed value is obtained by the sensor 13 and an action $u_{t-1}$ (action $u_{t-1}$ performed by the agent at immediately preceding time t−1) output by the sensor 13 when the observed value $o_t$ is observed (immediately before the sensor 13 obtains the observed value $o_t$) as a history of an observed value and an action in the form of being added to already stored series of observed values and actions. The process then proceeds to step S34.

In step S34, the state recognizing section 23 recognizes present conditions of the agent on the basis of the extended HMM using the action performed by the agent and the observed value observed in the agent when the action has been performed, and obtains a present state as a state of the extended HMM which state corresponds to the present conditions.

Specifically, the state recognizing section 23 reads out, from the history storing section 14, an action series of zero or more latest actions and an observed value series of one or more latest observed values as an action series and an observed value series for recognition which series are used to recognize the present conditions of the agent.

Further, the state recognizing section 23 observes the action series and the observed value series for recognition, and obtains an optimum state probability $\delta_t(j)$, which is a maximum value of a state probability of being in a state $S_j$ at time (present time) t, and an optimum path $\psi_t(j)$, which is a state series providing the optimum state probability $\delta_t(j)$, according to a Viterbi algorithm (algorithm obtained by extending the Viterbi algorithm to actions), for example, in the learned extended HMM stored in the model storing section 22.

According to the Viterbi algorithm, a state series that maximizes the likelihood of a certain observed value series being observed (maximum likelihood state series) can be estimated among series of states (state series) traced when the observed value series is observed in the ordinary HMM.

However, because state transition probability is extended with respect to actions in the extended HMM, the Viterbi algorithm needs to be extended with respect to actions in order to be applied to the extended HMM.

Thus, the state recognizing section 23 obtains the optimum state probability $\delta_t(j)$ and the optimum path $\psi_t(j)$ according to equation (10) and equation (11), respectively.

$$\delta_t(i) = \max_{1 \leq i \leq N} \lfloor \delta_{t-1}(i) a_{ij}(u_{t-1}) b_{ij}(o_t) \rfloor \quad (10)$$

$$(1 \leq t \leq T, 1 \leq j \leq N)$$

$$\psi_t(j) = \arg\max_{1 \leq i \leq N} \lfloor \delta_{t-1}(i) a_{ij}(u_{t-1}) b_{ij}(o_t) \rfloor \quad (11)$$

$$(1 \leq t \leq T, 1 \leq j \leq N)$$

In this case, max[X] in equation (10) denotes a maximum value of X obtained when a suffix i indicating a state $S_i$ is changed to integers in a range of 1 to N, which is the number of states. In addition, argmax{X} in equation (11) denotes a suffix i that maximizes X obtained when the suffix i is changed to integers in a range of 1 to N.

The state recognizing section 23 observes the action series and the observed value series for recognition, and obtains the maximum likelihood state series, which is a state series reaching a state $S_j$ and maximizing the optimum state probability $\delta_t(j)$ of equation (10) at time t from the optimum path $\psi_t(j)$ of equation (11).

Further, the state recognizing section 23 sets the maximum likelihood state series as a result of recognition of the present conditions, and obtains (estimates) a last state of the maximum likelihood state series as a present state $s_t$.

After obtaining the present state $s_t$, the state recognizing section 23 updates the elapsed time managing table stored in the elapsed time managing table storing section 32 on the basis of the present state $s_t$. The process then proceeds from step S34 to step S35.

Specifically, in association with each state of the extended HMM, an elapsed time elapsed since the state became a present state is registered in the elapsed time managing table of the elapsed time managing table storing section 32. The state recognizing section 23 resets the elapsed time of the state that has become the present state $s_t$ to zero, for example, and increments the elapsed times of other states by one, for example, in the elapsed time managing table.

The elapsed time managing table is referred to as required when the goal selecting section 31 selects a goal state, as described above.

In step S35, the state recognizing section 23 updates the inhibitor stored in the model storing section 22 on the basis of the present state $s_t$. The updating of the inhibitor will be described later.

Further, in step S35, the state recognizing section 23 supplies the present state $s_t$ to the action determining section 24. The process then proceeds to step S36.

In step S36, the goal determining section 16 determines a goal state from among the states of the extended HMM, and supplies the goal state to the action determining section 24. The process then proceeds to step S37.

In step S37, the action determining section 24 corrects the state transition probability of the extended HMM stored in the model storing section 22 using the inhibitor stored in the same model storing section 22 (inhibitor updated in the immediately preceding step S35). The action determining section 24 thereby calculates corrected transition probability as state transition probability after the correction.

The corrected transition probability is used as the state transition probability of the extended HMM in calculation of an action plan by the action determining section 24 to be described later.

After step S37, the process proceeds to step S38, where the action determining section 24 calculates an action plan as a series of actions that maximizes the likelihood of state transition from the present state from the state recognizing section 23 to the goal state from the goal determining section 16 according to the Viterbi algorithm (algorithm obtained by extending the Viterbi algorithm to actions), for example, on the basis of the extended HMM stored in the model storing section 22.

According to the Viterbi algorithm, a maximum likelihood state series that maximizes the likelihood of a certain observed value series being observed can be estimated among state series from one of two states to the other state, that is, state series from the present state to the goal state, for example, in the ordinary HMM.

However, as described above, because state transition probability is extended with respect to actions in the extended HMM, the Viterbi algorithm needs to be extended with respect to actions in order to be applied to the extended HMM.

Thus, the action determining section 24 obtains a state probability $\delta'_t(j)$ according to equation (12).

$$\delta'_t(j) = \max_{1 < i \leq N, 1 \leq m \leq M} \lfloor \delta'_{t-1}(i) a_{ij}(U_m) \rfloor \quad (12)$$

In this case, max[X] in equation (12) denotes a maximum value of X obtained when a suffix i indicating a state $S_i$ is changed to integers in a range of 1 to N, which is the number of states, and a suffix m indicating an action $U_m$ is changed to integers in a range of 1 to M, which is the number of actions.

Equation (12) is obtained by deleting the observation probability $b_j(o_t)$ from equation (10) for obtaining the optimum state probability $\delta_t(j)$. In addition, in equation (12), the state probability $\delta'_t(j)$ is obtained in consideration of the action $U_m$. This corresponds to the extension of the Viterbi algorithm with respect to actions.

The action determining section 24 performs the calculation of equation (12) in a forward direction, and temporarily stores the suffix i taking a maximum state probability $\delta'_t(j)$ and the suffix m indicating an action $U_m$ performed when a state transition to the state $S_i$ indicated by the suffix i occurs at each time.

Incidentally, the corrected transition probability obtained by correcting the state transition probability $a_{ij}(U_m)$ of the learned extended HMM by the inhibitor is used as state transition probability $a_{ij}(U_m)$ in the calculation of equation (12).

The action determining section 24 calculates the state probability $\delta'_t(j)$ of equation (12) with the present state $s_t$ as a first state, and ends the calculation of the state probability $\delta'_t(j)$ of equation (12) when the state probability $\delta'_t(S_{goal})$ of a goal state $S_{goal}$ becomes a predetermined threshold value $\delta'_{th}$ or more, as shown in equation (13).

$$\delta'_t(S_{goal}) \geq \delta'_{th}$$

Incidentally, the threshold value $\delta'_{th}$ in equation (13) is set according to equation (14), for example.

$$\delta'_{th} = 0.9^{T'}$$

In this case, T' in equation (14) denotes the number of calculations of equation (12) (series length of a maximum likelihood state series obtained from equation (12)).

According to equation (14), the threshold value $\delta'_{th}$ is set by adopting 0.9 as a state probability when one likely state transition occurs.

Hence, according to equation (13), the calculation of the state probability $\delta'_t(j)$ of equation (12) is ended when T' likely state transitions occur consecutively.

Ending the calculation of the state probability $\delta'_t(j)$ of equation (12), the action determining section 24 obtains a maximum likelihood state series (shortest path in many cases) from the present state $s_t$ to the goal state $S_{goal}$ and a series of actions $U_m$ performed when a state transition providing the maximum likelihood state series occurs, by tracing the suffixes i and m stored for the state $S_i$ and the action $U_m$ from a state at the time of ending the calculation of the state probability $\delta'_t(j)$ of equation (12), that is, the goal state $S_{goal}$ to the present state $s_t$ in an opposite direction.

Specifically, as described above, the action determining section 24 stores the suffix i taking a maximum state probability $\delta'_t(j)$ and the suffix m indicating an action $U_m$ performed when a state transition to the state $S_i$ indicated by the suffix i occurs at each time when calculating the state probability $\delta'_t(j)$ of equation (12) in a forward direction.

The suffix i at each time indicates which state $S_i$ has a maximum state probability when a return is made from a state $S_j$ to the state $S_i$ in a temporally retrograde direction. The suffix m at each time indicates an action $U_m$ that effects a state transition providing the maximum state probability.

Hence, when the suffixes i and m at each time are retraced time by time from the time of ending the calculation of the state probability $\delta'_t(j)$ of equation (12), and a time of starting the calculation of the state probability $\delta'_t(j)$ of equation (12) is reached, series formed by arranging each of a series of suffixes of states of a state series from the present state $s_t$ to the goal state $S_{goal}$ and a series of suffixes of actions of an action series performed when state transitions of the state series occur in temporally retrograde order are obtained.

The action determining section 24 obtains the state series (maximum likelihood state series) from the present state $s_t$ to the goal state $S_{goal}$ and the action series performed when the state transitions of the state series occur by rearranging the series arranged in temporally retrograde order in order of time.

The action series performed when the state transitions of the maximum likelihood state series from the present state $s_t$ to the goal state $S_{goal}$ occur, the action series being obtained by the action determining section 24 as described above, is an action plan.

In this case, the maximum likelihood state series obtained in the action determining section 24 together with the action plan is the state series of state transitions that occur (should occur) when the agent performs actions according to the action plan. Thus, if state transitions not in accordance with the arrangement of states of the maximum likelihood state series occur when the agent performs the actions according to the action plan, the agent may not reach the goal state even when the agent performs the actions according to the action plan.

After the action determining section 24 obtains the action plan in step S38 as described above, the process proceeds to step S39, where the action determining section 24 determines an action $u_t$ to be performed next according to the action plan. The process then proceeds to step S40.

That is, the action determining section 24 sets a first action of the action series as the action plan as the determined action $u_t$ to be performed next.

In step S40, the action determining section 24 controls the actuator 12 according to the action (determined action) $u_t$ determined in the immediately preceding step S39, and the agent thereby performs the action $u_t$.

The process thereafter proceeds from step S40 to step S41, where the state recognizing section 23 increments time t by one. The process returns to step S32 to repeat a similar process from step S32 on down.

Incidentally, the process in the recognition action mode of FIG. 8 is ended when the agent is operated so as to end the recognition action mode, when power to the agent is turned off, or when the mode of the agent is changed from the recognition action mode to another mode (reflex action mode or the like), for example.

As described above, the state recognizing section 23 recognizes the present conditions of the agent using an action performed by the agent and an observed value observed in the agent when the action has been performed and obtains a present state corresponding to the present conditions on the basis of the extended HMM, the goal determining section 16 determines a goal state, and the action determining section 24 calculates an action plan, which is a series of actions that maximizes the likelihood (state probability) of state transition from the present state to the goal state on the basis of the extended HMM, and determines an action to be performed next by the agent according to the action plan. Therefore an appropriate action can be determined as an action to be performed by the agent for the agent to reach the goal state.

The existing action determining method prepares a state transition probability model learning an observed value series and an action model, which is a model of actions for realizing state transitions of the state transition probability model, separately from each other, and performs learning.

Thus, because the two models of the state transition probability model and the action model are learned, the learning needs large amounts of calculation cost and storage resources.

On the other hand, the agent of FIG. 4 learns an observed value series and an action series in association with each other in the extended HMM, which is a single model. Therefore the learning can be performed with small amounts of calculation cost and storage resources.

In addition, the existing action determining method needs to calculate a state series up to a goal state using the state transition probability model, and calculate actions to obtain the state series using the action model. That is, the existing action determining method needs to calculate the state series up to the goal state and calculate the actions to obtain the state series using the separate models.

The existing action determining method therefore needs a large amount of calculation cost up to the calculation of actions.

On the other hand, the agent of FIG. 4 can simultaneously determine a maximum likelihood state series from a present state to a goal state and an action series for obtaining the maximum likelihood state series. Therefore an action to be performed next by the agent can be determined with a small amount of calculation cost.

[Determination of Goal State]

Figure 9:
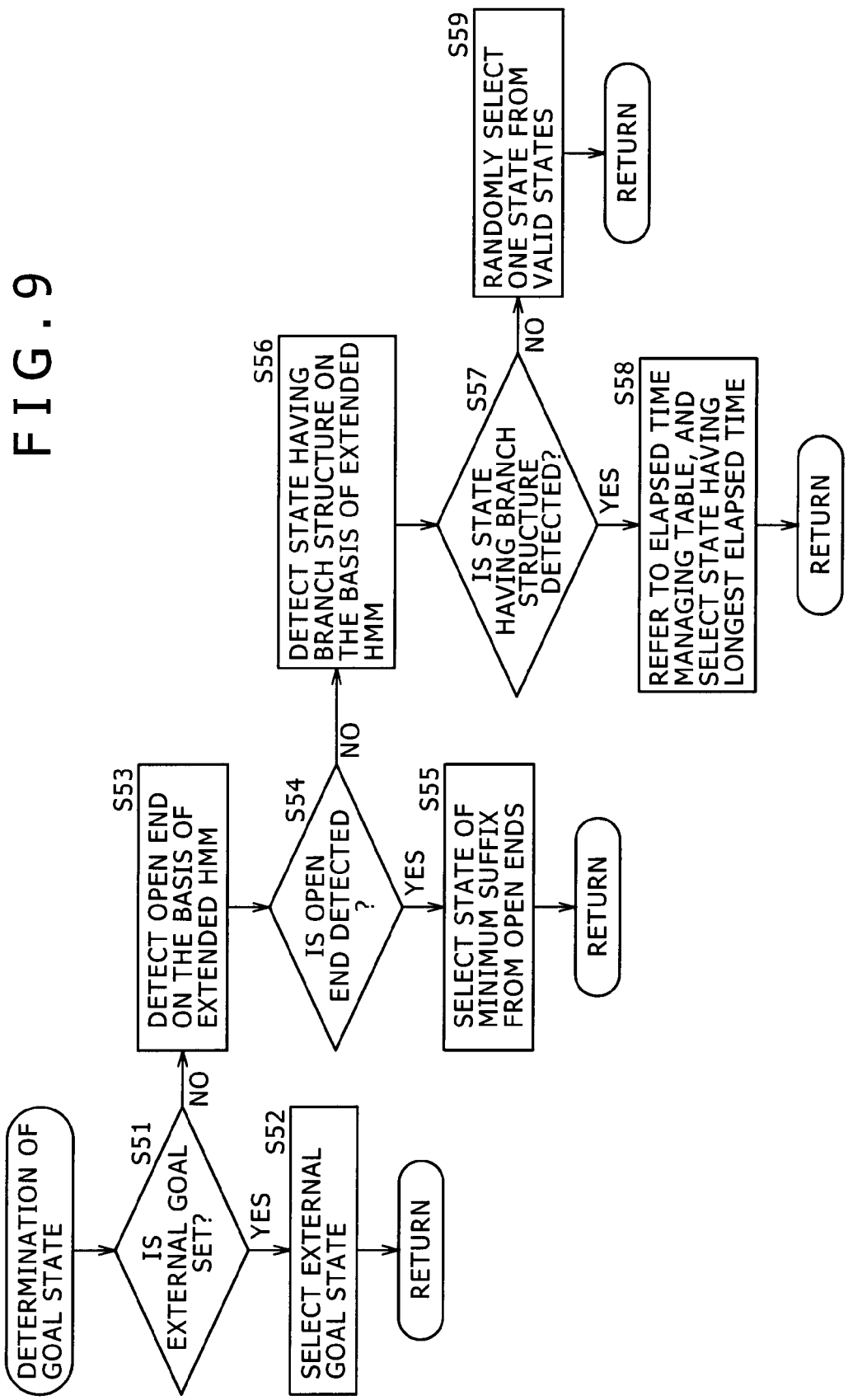
FIG. 9 is a flowchart of assistance in explaining a process of determining a goal state which process is performed by a goal determining section.

FIG. 9 is a flowchart of assistance in explaining a process of determining a goal state which process is performed by the goal determining section 16 in FIG. 4 in step S36 in FIG. 8.

In the goal determining section 16, in step S51, the goal selecting section 31 determines whether an external goal is set.

When it is determined in step S51 that an external goal is set, that is, when for example a user operates the external goal inputting section 33 to specify one state of the extended HMM stored in the model storing section 22 as an external goal, which is a goal state, and the goal state (suffix indicating the goal state) is supplied from the external goal inputting section 33 to the goal selecting section 31, the process proceeds to step S52, where the goal selecting section 31 selects the external goal from the external goal inputting section 33 and then supplies the external goal to the action determining section 24. The process then makes a return.

Incidentally, the user can specify a state (suffix of the state) as a goal state by not only operating the external goal inputting section 33 but also operating a terminal such as a PC (Personal Computer), for example. In this case, the external goal inputting section 33 recognizes the state specified by the user by communicating with the terminal operated by the user, and then supplies the state to the goal selecting section 31.

When it is determined in step S51 that no external goal is set, on the other hand, the process proceeds to step S53, where the open end detecting section 37 detects an open end from the states of the extended HMM on the basis of the extended HMM stored in the model storing section 22. The process then proceeds to step S54.

In step S54, the goal selecting section 31 determines whether an open end is detected.

When the open end detecting section 37 detects an open end from the states of the extended HMM, the open end detecting section 37 supplies the state (suffix indicating the state) as the open end to the goal selecting section 31. The goal selecting section 31 determines whether an open end is detected according to whether the open end is supplied from the open end detecting section 37.

When it is determined in step S54 that an open end is detected, that is, when one or more open ends are supplied from the open end detecting section 37 to the goal selecting section 31, the process proceeds to step S55, where the goal selecting section 31 selects for example an open end having a minimum suffix indicating the state as a goal state from the one or more open ends from the open end detecting section 37, and then supplies the goal state to the action determining section 24. The process then makes a return.

When it is determined in step S54 that no open end is detected, that is, when no open end is supplied from the open end detecting section 37 to the goal selecting section 31, the process proceeds to step S56, where the branch structure detecting section 36 detects a state of branch structure from the states of the extended HMM on the basis of the extended HMM stored in the model storing section 22. The process then proceeds to step S57.

In step S57, the goal selecting section 31 determines whether a state of branch structure is detected.

In this case, when the branch structure detecting section 36 detects a state of branch structure from the states of the extended HMM, the branch structure detecting section 36 supplies the state of branch structure (suffix indicating the state of branch structure) to the goal selecting section 31. The goal selecting section 31 determines whether a state of branch structure is detected according to whether the state of branch structure is supplied from the branch structure detecting section 36.

When it is determined in step S57 that a state of branch structure is detected, that is, when one or more states of branch structure are supplied from the branch structure detecting section 36 to the goal selecting section 31, the process proceeds to step S58, where the goal selecting section 31 selects one state as a goal state from the one or more states of branch structure from the branch structure detecting section 36, and then supplies the goal state to the action determining section 24. The process then makes a return.

Specifically, referring to the elapsed time managing table in the elapsed time managing table storing section 32, the goal selecting section 31 recognizes the elapsed time of the one or more states of branch structure from the branch structure detecting section 36.

Further, the goal selecting section 31 detects a state having a longest elapsed time from the one or more states of branch structure from the branch structure detecting section 36, and selects the state as a goal state.

When it is determined in step S57 that no state of branch structure is detected, on the other hand, that is, when no state of branch structure is supplied from the branch structure detecting section 36 to the goal selecting section 31, the process proceeds to step S59, where the random goal generating section 35 randomly selects one state of the extended HMM stored in the model storing section 22, and then supplies the state to the goal selecting section 31.

Further, in step S59, the goal selecting section 31 selects the state from the random goal generating section 35 as a goal state, and then supplies the goal state to the action determining section 24. The process then makes a return.

Incidentally, the detection of an open end by the open end detecting section 37 and the detection of a state of branch structure by the branch structure detecting section 36 will be described later in detail.

[Calculation of Action Plan]

Figure 10A:
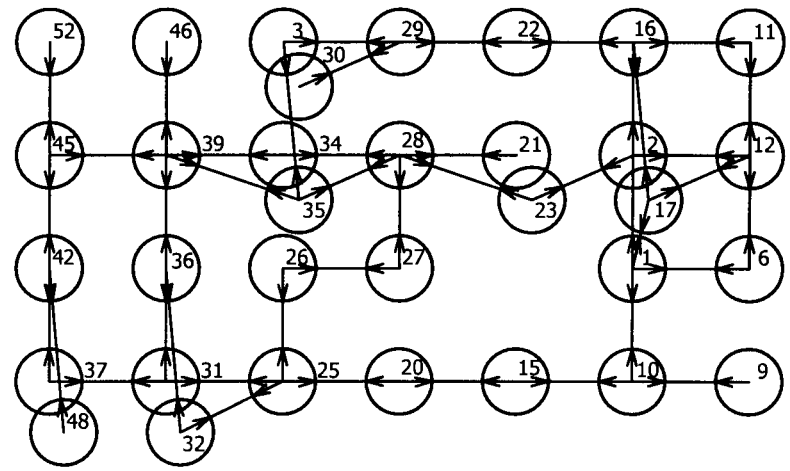
FIGS. 10A, 10B, and 10C are diagrams of assistance in explaining the calculation of an action plan by an action determining section 24.
Figure 10B:
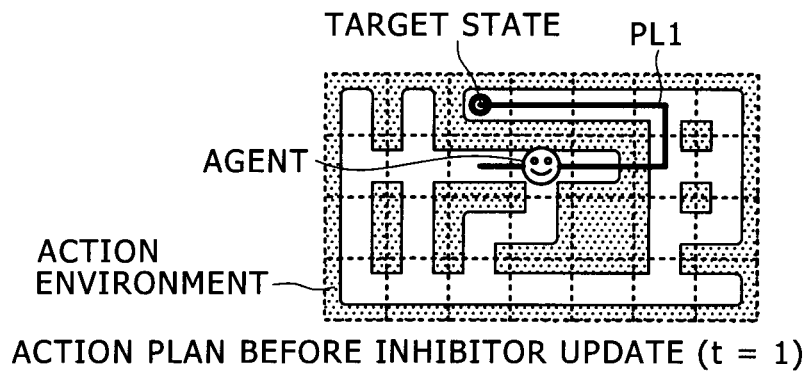
Figure 10C:
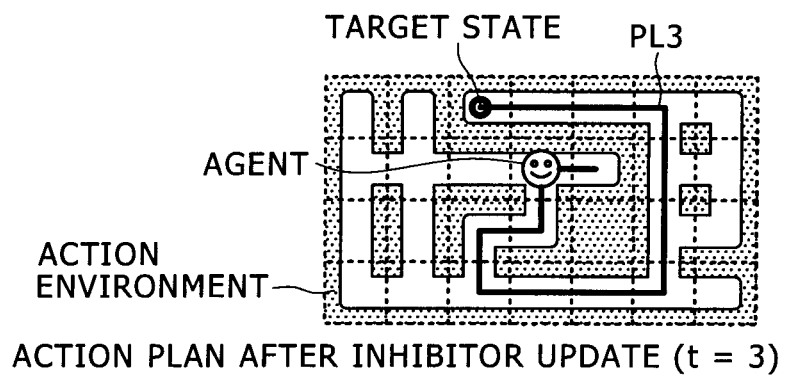

FIGS. 10A, 10B, and 10C are diagrams of assistance in explaining the calculation of an action plan by the action determining section 24 in FIG. 4.

FIG. 10A schematically shows the learned extended HMM used to calculate an action plan.

In FIG. 10A, a circle (○) mark represents a state of the extended HMM, and a number entered in the circle mark is the suffix of the state represented by the circle mark. Arrows indicating states represented by circle marks represent possible state transitions (state transitions whose state transition probability is other than 0.0 (a value that can be assumed to be 0.0)).

In the extended HMM of FIG. 10A, a state $S_j$ is disposed at the position of an observation unit corresponding to the state $S_i$.

Two states between which state transitions are possible represent that the agent can move between two observation units corresponding to the two respective states. Thus, arrows indicating state transitions of the extended HMM represent passages through which the agent can move in the action environment.

In FIG. 10A, there are cases where two (a plurality of) states $S_i$ and $S_{i'}$ are disposed so as to overlap each other at the position of one observation unit. This indicates that the two (plurality of) states $S_i$ and $S_{i'}$ correspond to the one observation unit.

For example, in FIG. 10A, states $S_3$ and $S_{30}$ correspond to one observation unit, and states $S_{34}$ and $S_{35}$ also correspond to one observation unit. Similarly, states $S_{21}$ and $S_{23}$ correspond to one observation unit, states $S_2$ and $S_{17}$ correspond to one observation unit, states $S_{37}$ and $S_{48}$ correspond to one observation unit, and states $S_{31}$ and $S_{32}$ correspond to one observation unit.

When the extended HMM is learned using an observed value series and an action series obtained in the action environment whose structure changes as learning data, the extended HMM in which a plurality of states correspond to one observation unit as shown in FIG. 10A is obtained.

That is, in FIG. 10A, the extended HMM is learned using, as learning data, an observed value series and an action series obtained in the action environment of a structure in which one of a wall and a passage is present between the observation unit corresponding to the states $S_{21}$ and $S_{23}$ and the observation unit corresponding to the states $S_2$ and $S_{17}$, for example.

Further, in FIG. 10A, the extended HMM is learned using, as learning data, also an observed value series and an action series obtained in the action environment of a structure in which the other of the wall and the passage is present between the observation unit corresponding to the states $S_{21}$ and $S_{23}$ and the observation unit corresponding to the states $S_2$ and $S_{17}$.

As a result, in the extended HMM of FIG. 10A, the action environment of the structure having the wall between the observation unit corresponding to the states $S_{21}$ and $S_{23}$ and the observation unit corresponding to the states $S_2$ and $S_{17}$ is obtained by the state $S_{21}$ and the state $S_{17}$.

That is, in the extended HMM, the structure of the action environment is obtained in which no state transition is made and no passage is allowed because of the presence of the wall between the state $S_{21}$ of the observation unit corresponding to the states $S_{21}$ and $S_{23}$ and the state $S_{17}$ of the observation unit corresponding to the states $S_2$ and $S_{17}$.

In addition, in the extended HMM, the action environment of the structure having the passage between the observation unit corresponding to the states $S_{21}$ and $S_{23}$ and the observation unit corresponding to the states $S_2$ and $S_{17}$ is obtained by the state $S_{23}$ and the state $S_2$.

That is, in the extended HMM, the structure of the action environment is obtained in which state transitions are made and passage is allowed between the state $S_{23}$ of the observation unit corresponding to the states $S_{21}$ and $S_{23}$ and the state $S_2$ of the observation unit corresponding to the states $S_2$ and $S_{17}$.

As described above, in the extended HMM, even when the structure of the action environment changes, the structure of the action environment which structure changes can be obtained.

FIG. 10B and FIG. 10C show an example of an action plan calculated by the action determining section 24.

In FIG. 10B and FIG. 10C, a state $S_{30}$ (or a state $S_3$) in FIG. 10A is a goal state, a state $S_{28}$ corresponding to an observation unit in which the agent is located is set as a present state, and an action plan for reaching the goal state from the present state is calculated.

FIG. 10B shows an action plan PL1 calculated by the action determining section 24 at time t=1.

In FIG. 10B, a series of states $S_{28}$, $S_{23}$, $S_2$, $S_{16}$, $S_{22}$, $S_{29}$, and $S_{30}$ in FIG. 10A is set as a maximum likelihood state series for reaching the goal state from the present state, and an action series of actions performed when state transitions providing the maximum likelihood state series occur is calculated as the action plan PL1.

The action determining section 24 sets an action of moving from the first state $S_{28}$ to the next state $S_{23}$ of the action plan PL1 as a determined action. The agent performs the determined action.

As a result, the agent moves in a right direction (performs the action $U_2$ in FIG. 3A) from the observation unit corresponding to the state $S_{28}$ as the present state to the observation unit corresponding to the states $S_{21}$ and $S_{23}$, and time t becomes time t=2 resulting from the passage of one time from time t=1.

In FIG. 10B (also in FIG. 10C), there is a wall between the observation unit corresponding to the states $S_{21}$ and $S_{23}$ and the observation unit corresponding to the states $S_2$ and $S_{17}$.

In a state where the structure having the wall between the observation unit corresponding to the states $S_{21}$ and $S_{23}$ and the observation unit corresponding to the states $S_2$ and $S_{17}$ is obtained, the observation unit corresponding to the states $S_{21}$ and $S_{23}$ is the state $S_{21}$, as described above. At time t=2, the state recognizing section 23 recognizes that the present state is the state $S_{21}$.

The state recognizing section 23 updates an inhibitor for inhibiting state transition so as to inhibit a state transition between a state immediately preceding the present state and a state other than the present state and so as not to inhibit a state transition between the immediately preceding state and the present state (not to inhibit will hereinafter be referred to also as to enable) with respect to the action performed by the agent at the time of the state transition from the immediately preceding state to the present state.

That is, in this case, because the present state is the state $S_{21}$ and the immediately preceding state is the state $S_{28}$, the inhibitor is updated so as to inhibit state transition between the immediately preceding state $S_{28}$ and the state other than the present state $S_{21}$, that is, for example state transition between the first state $S_{28}$ and the next state $S_{23}$ in the action plan PL1 obtained at time t=1.

Further, the inhibitor is updated so as to enable state transition between the immediately preceding state $S_{28}$ and the present state $S_{21}$.

Then, at time t=2, the action determining section 24 sets the state $S_{21}$ as the present state, sets the state $S_{30}$ as the goal state, obtains a maximum likelihood state series $S_{21}$, $S_{28}$, $S_{27}$, $S_{26}$, $S_{25}$, $S_{20}$, $S_{15}$, $S_{10}$, $S_1$, $S_{17}$, $S_{16}$, $S_{22}$, $S_{29}$, and $S_{30}$ for reaching the goal state from the present state, and calculates an action series of actions performed when state transitions providing the maximum likelihood state series occur as an action plan.

Further, the action determining section 24 sets an action of moving from the first state $S_{21}$ to the next state $S_{28}$ of the action plan as a determined action. The agent performs the determined action.

As a result, the agent moves in a left direction (performs the action $U_4$ in FIG. 3A) from the observation unit corresponding to the state $S_{21}$ as the present state to the observation unit corresponding to the state $S_{28}$, and time t becomes time t=3 resulting from the passage of one time from time t=2.

At time t=3, the state recognizing section 23 recognizes that the present state is the state $S_{28}$.

Then, at time t=3, the action determining section 24 sets the state $S_{28}$ as the present state, sets the state $S_{30}$ as the goal state, obtains a maximum likelihood state series for reaching the goal state from the present state, and calculates an action series of actions performed when state transitions providing the maximum likelihood state series occur as an action plan.

FIG. 10C shows an action plan PL3 calculated by the action determining section 24 at time t=3.

In FIG. 10C, a series of states $S_{28}$, $S_{27}$, $S_{26}$, $S_{25}$, $S_{20}$, $S_{15}$, $S_{10}$, $S_1$, $S_{17}$, $S_{16}$, $S_{22}$, $S_{29}$, and $S_{30}$ is obtained as a maximum likelihood state series, and an action series of actions performed when state transitions providing the maximum likelihood state series occur is calculated as the action plan PL3.

That is, at time t=3, the action plan PL3 different from the action plan PL1 at time t=1 is calculated even though the present state is the same state $S_{28}$ as at time t=1 and the goal state is the same state $S_{30}$ as at time t=1.

This is because the inhibitor is updated so as to inhibit state transition between the state $S_{28}$ and the state $S_{23}$ at time t=2, as described above, and in obtaining the maximum likelihood state series at time t=3, the selection of the state $S_{23}$ as the transition destination of a state transition from the state $S_{28}$ as the present state is inhibited and thereby the state $S_{27}$, which is a state to which a state transition can be made from the state $S_{28}$, other than the state $S_{23}$, is selected.

After calculating the action plan PL3, the action determining section 24 sets an action of moving from the first state $S_{28}$ to the next state $S_{27}$ of the action plan PL3 as a determined action. The agent performs the determined action.

As a result, the agent moves in a downward direction (performs the action $U_3$ in FIG. 3A) from the observation unit corresponding to the state $S_{28}$ as the present state to the observation unit corresponding to the state $S_{27}$. Thereafter, an action plan is similarly calculated at each time.

[Correction of State Transition Probability Using Inhibitor]

FIG. 11 is a diagram of assistance in explaining the correction of state transition probability of the extended HMM using the inhibitor, which correction is made by the action determining section 24 in step S37 in FIG. 8.

As shown in FIG. 11, the action determining section 24 corrects the state transition probability $A_{ltm}$ of the extended HMM by multiplying the state transition probability $A_{ltm}$ of the extended HMM by the inhibitor $A_{inhibit}$, and thereby obtains a corrected transition probability $A_{stm}$, which is the state transition probability $A_{ltm}$ after the correction.

The action determining section 24 then calculates an action plan using the corrected transition probability $A_{stm}$ as the state transition probability of the extended HMM.

In this case, in calculating an action plan, the state transition probability used for the calculation is corrected by the inhibitor for the following reasons.

The states of the extended HMM after learning may include a state of branch structure, which state allows state transitions to different states when one action is performed.

For example, in the case of the state $S_{29}$ in FIG. 10A described above, when the action $U_4$ for moving in a left direction (FIG. 3A) is performed, a state transition to the state $S_3$ on a left side may be made, or a state transition to the state $S_{30}$ on the same left side may be made.

Thus, different state transitions can occur from the state $S_{29}$ when one certain action is performed, and the state $S_{29}$ is a state of branch structure.

When different state transitions may occur with respect to one certain action, that is, for example when a state transition to a certain state may occur or a state transition to another state may also occur at the time of one certain action being performed, the inhibitor inhibits the occurrence of a state transition other than one state transition of the different state transitions that can occur so that only the one state transition occurs.

That is, supposing that different state transitions that can occur with respect to one certain action are referred to as a branch structure, when the extended HMM is learned using an observed value series and an action series obtained from the action environment that changes in structure as learning data, the extended HMM obtains a change in structure of the action environment as a branch structure. As a result, a state of branch structure occurs.

Thus, due to the occurrence of states of branch structure, even when the structure of the action environment changes to various structures, the extended HMM obtains all of the various structures of the action environment.

The various structures of the action environment that changes in structure, the various structures being obtained by the extended HMM, are information to be stored for a long period of time without being forgotten. Therefore the extended HMM that has obtained such information (state transition probability, in particular, of the extended HMM) will be referred to also as a long term memory.

When the present state is a state of branch structure, the present structure of the action environment that changes in structure determines which of different state transitions as a branch structure is possible as a state transition from the present state.

That is, even when a state transition is possible from the state transition probability of the extended HMM as a long term memory, the state transition may not be able to be made depending on the present structure of the action environment that changes in structure.

Accordingly, the agent updates the inhibitor on the basis of the present state obtained by recognition of present conditions of the agent independently of the long term memory. Then, the agent obtains the corrected transition probability as state transition probability after correction, the corrected transition probability inhibiting a state transition that cannot be made in the present structure of the action environment and enabling a state transition that can be made in the present structure of the action environment, by correcting the state transition probability of the extended HMM as a long term memory using the inhibitor. The agent calculates an action plan using the corrected transition probability.

The corrected transition probability is information obtained at each time by correcting the state transition probability as a long term memory using the inhibitor updated on the basis of the present state at each time, and is information that it suffices to store for a short period of time. The corrected transition probability will therefore be referred to also as a short term memory.

The action determining section 24 (FIG. 4) performs a process of obtaining the corrected transition probability by correcting the state transition probability of the extended HMM using the inhibitor as follows.

When all the state transition probabilities $A_{ltm}$ of the extended HMM are expressed by a three-dimensional table as shown in FIG. 6B, the inhibitor $A_{inhibit}$ is also expressed by a three-dimensional table having the same size as the three-dimensional table of the state transition probabilities $A_{ltm}$ of the extended HMM.

The three-dimensional table expressing the state transition probabilities $A_{ltm}$ of the extended HMM will be referred to also as a state transition probability table. The three-dimensional table expressing the inhibitor $A_{inhibit}$ will be referred to also as an inhibitor table.

When the number of states of the extended HMM is N, and the number of actions that can be performed by the agent is M, the state transition probability table is a three-dimensional table of N×N×M elements, that is, N elements wide, N elements high, and M elements deep. Thus, in this case, the inhibitor table is also a three-dimensional table of N×N×M elements.

Incidentally, in addition to the inhibitor $A_{inhibit}$, the corrected transition probability $A_{stm}$ is also expressed by a three-dimensional table of N×N×M elements. The three-dimensional table expressing the corrected transition probability $A_{stm}$ will be referred to also as a corrected transition probability table.

For example, supposing that a position in an ith row from the top, a jth column from the left, and an mth plane in a direction of depth from the front side in the state transition probability table is expressed as (i, j, m), the action determining section 24 obtains a corrected transition probability $A_{stm}$ as an element in the position (i, j, m) of the corrected transition probability table by multiplying a state transition probability $A_{ltm}$ ($=a_{ij}(U_m)$) as an element in the position (i, j, m) of the state transition probability table by an inhibitor $A_{inhibit}$ as an element in the position (i, j, m) of the inhibitor table according to equation (15).

$$A_{stm} = A_{ltm} \times A_{inhibit} \qquad (15)$$

Incidentally, the inhibitor is updated in the state recognizing section 23 (FIG. 4) of the agent at each time as follows.

The state recognizing section 23 updates the inhibitor so as to inhibit state transition between a state $S_i$ immediately preceding a present state $S_j$ and a state other than the present state $S_j$ and so as not to inhibit (so as to enable) state transition between the immediately preceding state $S_i$ and the present state $S_j$ with respect to an action $U_m$ performed by the agent at the time of a state transition from the immediately preceding state $S_i$ to the present state $S_j$.

Specifically, supposing that a plane obtained by cutting the inhibitor table with a plane perpendicular to the action axis at a position m of the action axis is referred to as an inhibitor plane with respect to the action $U_m$, the state recognizing section 23 overwrites, with 1.0, an inhibitor as an element in a position (i, j) in an ith row from the top and a jth column from the left among N×N inhibitors, that is, N horizontal inhibitors and N vertical inhibitors of the inhibitor plane with respect to the action $U_m$, and overwrites, with 0.0, inhibitors as elements in positions other than the position (i, j) among the N inhibitors in the ith row from the top.

As a result, according to the corrected transition probability obtained by correcting the state transition probability using the inhibitor, only a most recent experience, that is, a proximate state transition that has been made can be performed among state transitions (branch structure) from a state of branch structure, and the other state transition cannot be made.

The extended HMM expresses the structure of the action environment experienced (obtained by learning) by the agent up to the present. Further, when the structure of the action environment changes to various structures, the extended HMM expresses the various structures of the action environment as branch structures.

On the other hand, the inhibitor expresses which of a plurality of state transitions as a branch structure possessed by the extended HMM as a long term memory models the present structure of the action environment.

Thus, by correcting the state transition probability by multiplying the state transition probability of the extended HMM as a long term memory by the inhibitor, and calculating an action plan using the corrected transition probability (short term memory) as state transition probability after the correction, even when the structure of the action environment is changed, an action plan can be obtained in consideration of the structure after being changed (present structure) without the structure after being changed being relearned by the extended HMM.

That is, when the structure of the action environment after being changed in structure is a structure already obtained by the extended HMM, by updating the inhibitor on the basis of the present state, and correcting the state transition probability of the extended HMM using the inhibitor after being updated, an action plan can be obtained in consideration of the structure after being changed of the action environment without the extended HMM being relearned.

That is, an action plan adapted to a change in structure of the action environment can be obtained quickly and efficiently with calculation cost reduced.

Incidentally, when the action environment is changed to a structure not obtained by the extended HMM, to determine an appropriate action in the action environment of the structure after being changed needs relearning of the extended HMM using an observed value series and an action series observed in the action environment after being changed.

In a case where the action determining section 24 calculates an action plan using the state transition probability of the extended HMM as it is, an action series to be performed when state transitions of a maximum likelihood state series from a present state $s_t$ to a goal state $S_{goal}$ occur is calculated as an action plan assuming that all of a plurality of state transitions as a branch structure can be made according to the Viterbi algorithm even when the present structure of the action environment is a structure in which only one of the plurality of state transitions as the branch structure can be made and the other state transition cannot be made.

On the other hand, in a case where the action determining section 24 corrects the state transition probability of the extended HMM by the inhibitor, and calculates an action plan using the corrected transition probability as state transition probability after the correction, it is assumed that a state transition inhibited by the inhibitor cannot be made, and an action series to be performed when state transitions of a maximum likelihood state series from the present state $s_t$ to the goal state $S_{goal}$ occur without the state transition inhibited by the inhibitor can be calculated as an action plan.

Specifically, for example, in FIG. 10A described above, the state $S_{28}$ is a state of branch structure from which a state transition can be made to both the state $S_{21}$ and the state $S_{23}$ when the action $U_2$ for moving in a right direction is performed.

In FIG. 10A, as described above, at time t=2, the state recognizing section 23 updates the inhibitor so as to inhibit a state transition from the immediately preceding state $S_{28}$ to the state $S_{23}$ other than the present state $S_{21}$ and enable a state transition from the immediately preceding state $S_{28}$ to the present state $S_{21}$ with respect to the action $U_2$ for moving in the right direction which action was performed by the agent at the time of the state transition from the state $S_{28}$ immediately preceding the present state $S_{21}$ to the present state $S_{21}$.

As a result, at time t=3 in FIG. 10C, even though the present state is the state $S_{28}$ and the goal state is the state $S_{30}$, and the present state and the goal state are both the same as at time t=1 in FIG. 10B, because the state transition from the state $S_{28}$ to the state $S_{23}$ other than the state $S_{21}$ when the action $U_2$ for moving in the right direction is performed is inhibited by the inhibitor, a state series different from that at time t=1, that is, a state series $S_{28}, S_{27}, S_{26}, S_{25}, \ldots, S_{30}$ in which the state transition from the state $S_{28}$ to the state $S_{23}$ is not made is obtained as a maximum likelihood state series for reaching the goal state from the present state, and an action series to be performed when state transitions providing the state series occur is calculated as the action plan PL3.

The inhibitor is updated so as to enable a state transition experienced by the agent among a plurality of state transitions as a branch structure and inhibit the other state transitions than the state transition experienced by the agent.

That is, the inhibitor is updated so as to inhibit state transition between the state immediately preceding the present state and the state other than the present state (state transition from the immediately preceding state to the state other than the present state) and enable state transition between the immediately preceding state and the present state (state transition from the immediately preceding state to the present state) with respect to the action performed by the agent at the time of the state transition from the immediately preceding state to the present state.

When only the enabling of a state transition experienced by the agent among a plurality of state transitions as a branch structure and the inhibition of the other state transitions than the state transition experienced by the agent is performed as the updating of the inhibitor, the state transitions inhibited by updating the inhibitor remain inhibited unless the agent thereafter experiences the state transitions.

When an action to be performed next by the agent is determined according to an action plan calculated using the corrected transition probability obtained by correcting the state transition probability of the extended HMM by the inhibitor in the action determining section 24 as described above, no action plans including actions causing the state transitions inhibited by the inhibitor are calculated. The state transitions inhibited by the inhibitor therefore remain inhibited unless the action to be performed next is determined by a method other than the method of determining the action to be performed next according to an action plan or unless the agent experiences the state transitions inhibited by the inhibitor by chance.

Thus, even when the structure of the action environment is changed from a structure in which a state transition inhibited by the inhibitor cannot be made to a structure in which the state transition can be made, action plans including an action causing the state transition cannot be calculated until the agent fortunately experiences the state transition inhibited by the inhibitor.

Accordingly, the state recognizing section 23 not only enables a state transition experienced by the agent among a plurality of state transitions as a branch structure and inhibits the other state transitions than the state transition experienced by the agent as the updating of the inhibitor but also relaxes the inhibition of the state transitions according to the passage of time.

That is, the state recognizing section 23 updates the inhibitor so as to enable a state transition experienced by the agent among a plurality of state transitions as a branch structure and inhibit the other state transitions than the state transition experienced by the agent, and further updates the inhibitor so as to relax the inhibition of the state transitions according to the passage of time.

Specifically, the state recognizing section 23 updates an inhibitor $A_{inhibit}$ at time t to an inhibitor $A_{inhibit}$ (t+1) at time t+1 according to equation (16), for example, so that the inhibitor converges to 1.0 according to the passage of time.

$$A_{inhibit}(t+1) = A_{inhibit}(t) + c(1 - A_{inhibit})(t))(0 \leq c \leq 1) \quad (16)$$

In equation (16), the coefficient c is higher than 0.0 and lower than 1.0. The higher the coefficient c, the more quickly the inhibitor converges to 1.0.

According to equation (16), the inhibition of a state transition once inhibited (state transition whose inhibitor is set at 0.0) is relaxed with the passage of time, so that an action plan including an action causing the state transition is calculated even when the agent has not experienced the state transition.

An inhibitor update performed so as to relax the inhibition of a state transition according to the passage of time will hereinafter be referred to also as an update corresponding to forgetting due to natural decay.

[Inhibitor Update]

Figure 12:
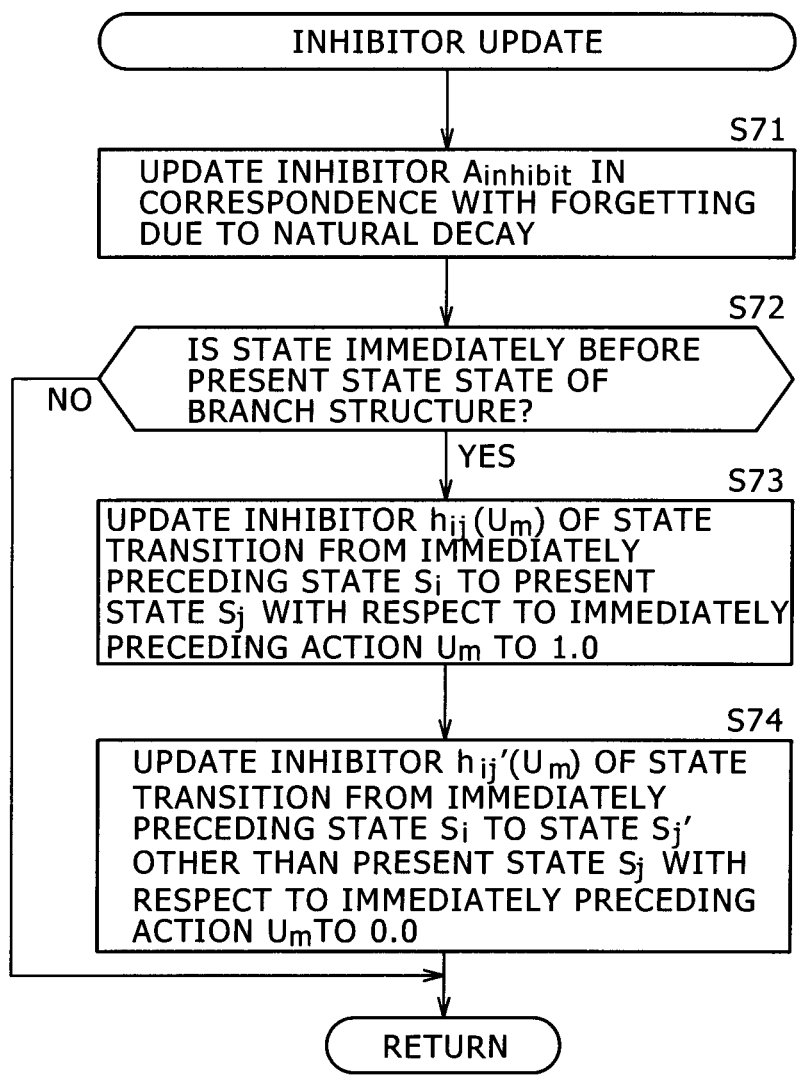
FIG. 12 is a flowchart of assistance in explaining a process of updating the inhibitor which process is performed by a state recognizing section.

FIG. 12 is a flowchart of assistance in explaining a process of updating the inhibitor which process is performed by the state recognizing section 23 in FIG. 4 in step S35 in FIG. 8.

Incidentally, the inhibitor is initialized to 1.0 as an initial value when time t is initialized to 1 in step S31 of the process in the recognition action mode in FIG. 8.

In step S71 in the process of updating the inhibitor, the state recognizing section 23 updates all inhibitors $A_{inhibit}$ stored in the model storing section 22 as an update corresponding to forgetting due to natural decay, that is, an update according to equation (16). The process then proceeds to step S72.

In step S72, the state recognizing section 23 determines whether a state $S_i$ immediately preceding a present state $S_j$ is a state of branch structure and whether the present state $S_j$ is one of different states to which state transition can be made from the state of branch structure as the immediately preceding state $S_i$ by performing a same action on the basis of the extended HMM (state transition probability of the extended HMM) stored in the model storing section 22.

In this case, whether the immediately preceding state $S_i$ is a state of branch structure can be determined as in the case of the branch structure detecting section 36 (FIG. 4) detecting a state of branch structure.

When it is determined in step S72 that the immediately preceding state $S_i$ is not a state of branch structure or it is determined that the immediately preceding state $S_i$ is a state of branch structure but that the present state $S_j$ is not one of different states to which state transition can be made from the state of branch structure as the immediately preceding state $S_i$ by performing a same action, the process skips steps S73 and S74, and makes a return.

When it is determined in step S72 that the immediately preceding state $S_i$ is a state of branch structure and that the present state $S_j$ is one of different states to which state transition can be made from the state of branch structure as the immediately preceding state $S_i$ by performing a same action, the process proceeds to step S73, where the state recognizing section 23 updates, to 1.0, the inhibitor $h_{ij}(U_m)$ of the state transition from the immediately preceding state $S_i$ to the present state $S_j$(inhibitor in a position (i, j, m) of the inhibitor table) with respect to the immediately preceding action $U_m$ among the inhibitors $A_{inhibit}$ stored in the model storing section 22. The process then proceeds to step S74.

In step S74, the state recognizing section 23 updates, to 0.0, the inhibitor $h_{ij}(U_m)$ of state transition from the immediately preceding state $S_i$ to a state $S_{j'}$, other than the present state $S_j$(inhibitor in a position (i, j', m) of the inhibitor table) with respect to the immediately preceding action $U_m$ among the inhibitors $A_{inhibit}$ stored in the model storing section 22. The process then makes a return.

In the existing action determining method, a state transition probability model such as an HMM or the like is learned assuming the modeling of a static structure. Therefore, when the structure of the learning object is changed after the state transition probability model is learned, the state transition probability model needs to be relearned with the structure after being changed as an object. Thus a high calculation cost is required to deal with changes in structure of the learning object.

On the other hand, in the agent of FIG. 4, the extended HMM obtains a change in structure of the action environment as a branch structure. When an immediately preceding state is a state of branch structure, the inhibitor is updated so as to inhibit state transition between the immediately preceding state and states other than the present state with respect to an action performed at the time of state transition from the immediately preceding state to the present state. The state transition probability of the extended HMM is corrected by using the inhibitor after the update. An action plan is calculated on the basis of the corrected transition probability as state transition probability after the correction.

Thus, when the structure of the action environment changes, an action plan adapted to (following) the changing structure can be calculated at low calculation cost (without the extended HMM being relearned).

In addition, the inhibitor is updated so as to relax the inhibition of a state transition according to the passage of time. Thus, an action plan including an action causing the state transition inhibited in the past can be calculated with the passage of time even when the agent does not experience the state transition inhibited in the past by chance. As a result, when the structure of the action environment is changed to a structure different from a structure when the state transition was inhibited in the past, an action plan appropriate for the structure after being changed can be calculated quickly.

[Detection of Open End]

Figure 13:
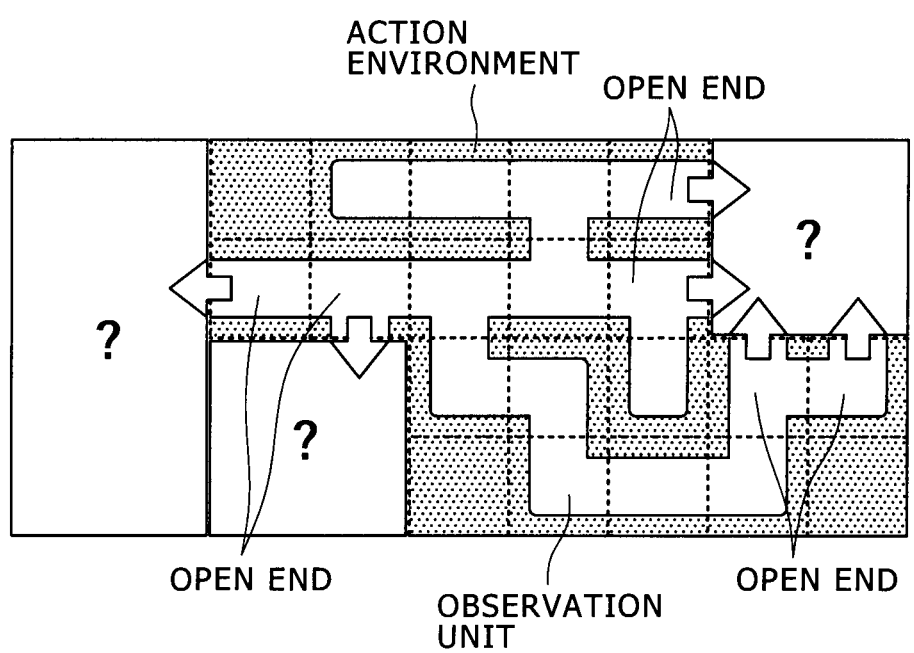
FIG. 13 is a diagram of assistance in explaining states of the extended HMM as open ends detected by an open end detecting section.

FIG. 13 is a diagram of assistance in explaining states of the extended HMM as open ends detected by the open end detecting section 37 in FIG. 4.

An open end is broadly a state as a transition source from which a state transition unexperienced by the agent is known in advance possibly to occur in the extended HMM.

Specifically, a state that is not assigned state transition probability (whose state transition probability is 0.0 (a value assumed to be 0.0)) and from which a state transition cannot be made because even though a comparison between the state transition probability of the state and the state transition probability of another state assigned an observation probability of a same observed value as in the state being observed (the observation probability is not a value of 0.0 (not a value assumed to be 0.0)) shows that the state transition can be made to a next state when a certain action is performed, the action has not been performed in the state corresponds to an open end.

Hence, when another state that has a state transition not yet performed among state transitions that can be made with a state in which a predetermined observed value is observed as a transition source in the extended HMM and in which the same observed value as the predetermined observed value is observed is detected, the other state is an open end.

As shown in FIG. 13, an open end is conceptually for example a state corresponding to an end part of a structure obtained by the extended HMM by placing the agent in a room and performing learning with a certain area in the room as an object (end part of the learned area in the room) or an entrance to a new room which entrance appears as a result of learning being performed with the whole area of a room in which the agent is placed as an object and thereafter the new room to which the agent can move being added next to the room in which the agent is placed.

An open end detected indicates beyond which part of the structure obtained by the extended HMM an area unknown to the agent extends. Thus, by calculating an action plan with an open end as a goal state, the agent aggressively performs an action of stepping into an unknown area. As a result, the agent can more widely learn the structure of the action environment (obtain an observed value series and an action series serving as learning data for learning the structure of the action environment), and efficiently gain experience necessary to supplement an obscure part whose structure is not obtained in the extended HMM (structure near an observation unit corresponding to a state as an open end in the action environment).

The open end detecting section 37 first generates an action template in order to detect an open end.

In generating the action template, the open end detecting section 37 subjects the observation probability $B=\{b_i(O_k)\}$ of the extended HMM to threshold processing, and makes a list for each observed value $O_k$ of states $S_i$ in which the observed value $O_k$ is observed with a probability equal to or higher than a threshold value.

FIGS. 14A and 14B are diagrams of assistance in explaining a process of listing states $S_i$ in which an observed value $O_k$ is observed with a probability equal to or higher than a threshold value.

FIG. 14A shows an example of the observation probability B of the extended HMM.

Specifically, FIG. 14A shows an example of the observation probability B of the extended HMM where the number N of states $S_i$ is five and the number M of observed values $O_k$ is three.

The open end detecting section 37 sets the threshold value at 0.5, for example, and performs threshold processing that detects observation probabilities B equal to or higher than the threshold value.

In this case, in FIG. 14A, the threshold processing detects an observation probability $b_1(O_3)=0.7$ of an observed value $O_3$ being observed with respect to a state $S_1$, an observation probability $b_2(O_2)=0.8$ of an observed value $O_2$ being observed with respect to a state $S_2$, an observation probability $b_3(O_3)=0.8$ of the observed value $O_3$ being observed with respect to a state $S_3$, an observation probability $b_4(O_2)=0.7$ of the observed value $O_2$ being observed with respect to a state $S_4$, and an observation probability $b_5(O_1)=0.9$ of an observed value $O_1$ being observed with respect to a state $S_5$.

Thereafter, for each of the observed values $O_1$, $O_2$, and $O_3$, the open end detecting section 37 lists and detects states $S_i$ in which the observed value $O_k$ is observed with a probability equal to or higher than the threshold value.

FIG. 14B shows states $S_i$ listed for each of the observed values $O_1$, $O_2$, and $O_3$.

For the observed value $O_1$, the state $S_5$ is listed as a state in which the observed value $O_1$ is observed with a probability equal to or higher than the threshold value. For the observed value $O_2$, the states $S_2$ and $S_4$ are listed as states in which the observed value $O_2$ is observed with a probability equal to or higher than the threshold value. For the observed value $O_3$, the states $S_1$ and $S_3$ are listed as states in which the observed value $O_3$ is observed with a probability equal to or higher than the threshold value.

Thereafter, the open end detecting section 37 calculates a transition probability corresponding value for each action $U_m$ with respect to each observed value $O_k$ using the state transition probability $A=\{a_{ij}(U_m)\}$ of the extended HMM, the transition probability corresponding value being a value corresponding to the state transition probability $a_{ij}(U_m)$ of a state transition whose state transition probability $a_{ij}(U_m)$ is a maximum among state transitions from a state $S_i$ listed for the observed value $O_k$, sets the transition probability corresponding value calculated for each action $U_m$ with respect to each observed value $O_k$ as an action probability of the action $U_m$ being performed when the observed value $O_k$ is observed, and generates an action template C, which is a matrix having the action probability as an element.

Figure 15:
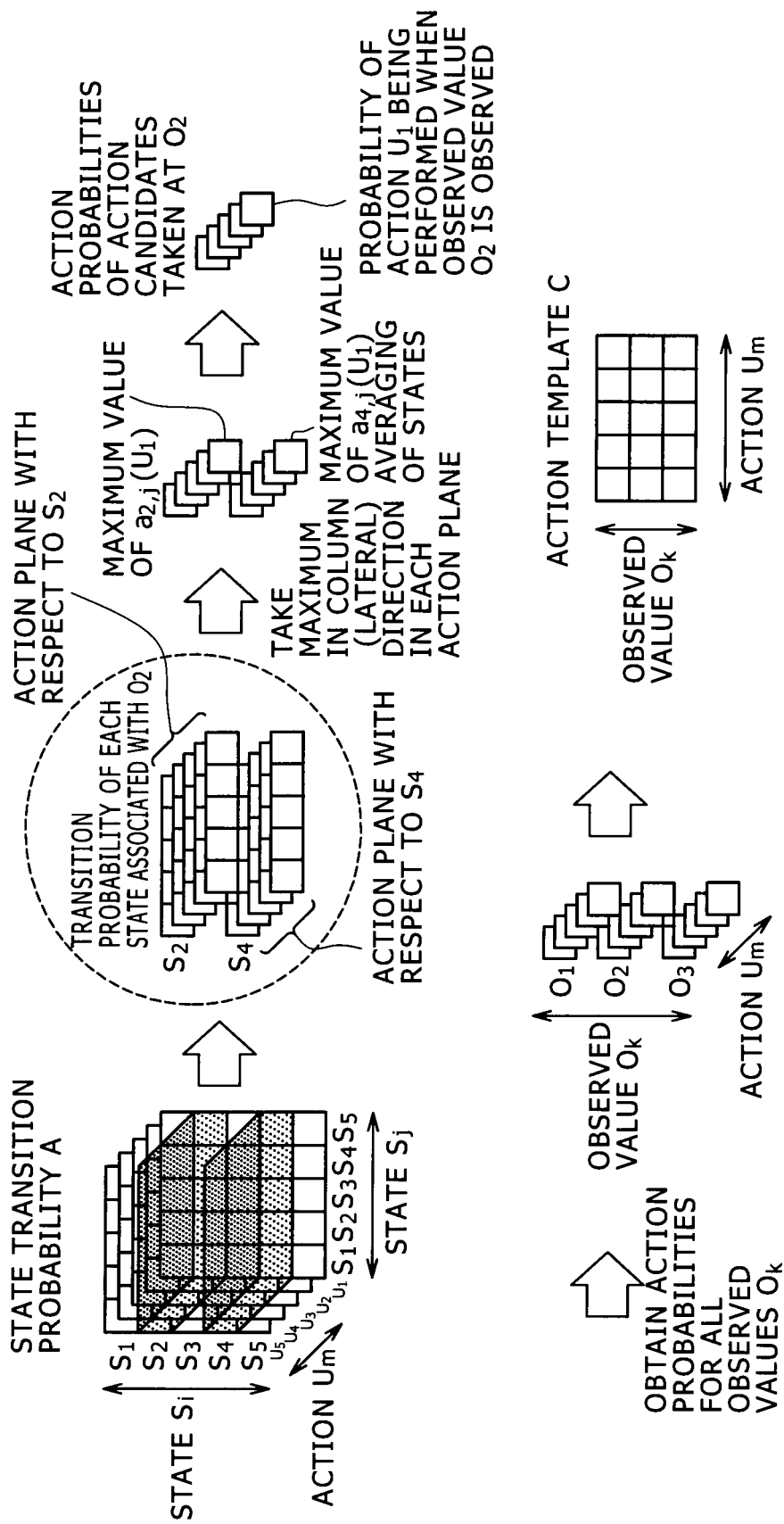
FIG. 15 is a diagram of assistance in explaining a method of generating an action template using the states $S_i$ listed for observed values $O_k$.

FIG. 15 is a diagram of assistance in explaining a method of generating the action template C using states $S_i$ listed for observed values $O_k$.

The open end detecting section 37 detects a maximum state transition probability from state transition probabilities of state transitions from a state $S_i$ listed for an observed value $O_k$, the state transition probabilities being arranged in a column (lateral) direction (j-axis direction), in the three-dimensional state transition probability table.

Specifically, for example, attention will now be directed to the observed value $O_2$, and suppose that the states $S_2$ and $S_4$ are listed for the observed value $O_2$.

In this case, the open end detecting section 37 directs attention to an action plane with respect to the state $S_2$, the action plane with respect to the state $S_2$ being obtained by cutting the three-dimensional state transition probability table by a plane perpendicular to the i-axis at a position i=2 on the i-axis, and detects a maximum value of state transition probabilities $a_{2,j}(U_1)$ of state transitions from the state $S_2$ which state transitions occur when the action $U_1$ is performed in the action plane with respect to the state $S_2$.

That is, the open end detecting section 37 detects a maximum value of the state transition probabilities $a_{2,1}(U_1)$, $a_{2,2}(U_1)$, ..., $a_{2,N}(U_1)$ arranged in the j-axis direction at a position m=1 on the action axis in the action plane with respect to the state $S_2$.

The open end detecting section 37 similarly detects maximum values of the state transition probabilities of state transitions from the state $S_2$ which state transitions occur when the other actions $U_m$ are performed from the action plane with respect to the state $S_2$.

Further, with respect to the state $S_4$ as another state listed for the observed value $O_2$, the open end detecting section 37 similarly detects a maximum value of the state transition probabilities of state transitions from the state $S_4$ which state transitions occur when each action $U_m$ is performed from the action plane with respect to the state $S_4$.

As described above, the open end detecting section 37 detects a maximum value of the state transition probabilities of the state transitions that occur when each action $U_m$ is performed with respect to each of the states $S_2$ and $S_4$ listed for the observed value $O_2$.

Thereafter, the open end detecting section 37 averages the maximum values of the state transition probabilities which maximum values are detected as described above with respect to the states $S_2$ and $S_4$ listed for the observed value $O_2$ for each action $U_m$, and sets the average value obtained by the averaging as a transition probability corresponding value corresponding to a maximum value of state transition probability with respect to the observed value $O_2$.

The transition probability corresponding value with respect to the observed value $O_2$ is obtained for each action $U_m$. The transition probability corresponding value for each action $U_m$ which transition probability corresponding value is obtained with respect to the observed value $O_2$ indicates a probability of the action $U_m$ being performed (action probability) when the observed value $O_2$ is observed.

The open end detecting section 37 similarly obtains a transition probability corresponding value as an action probability for each action $U_m$ with respect to the other observed values $O_k$.

The open end detecting section 37 then generates a matrix having an action probability of the action $U_m$ being performed when the observed value $O_k$ is observed as an element in a kth row from the top and an mth column from the left as an action template C.

The action template C is therefore a matrix of K rows and M columns in which matrix the number of rows is equal to the number of observed values $O_k$ and the number of columns is equal to the number of actions $U_m$.

After generating the action template C, the open end detecting section 37 calculates an action probability D based on observation probability using the action template C.

Figure 16:
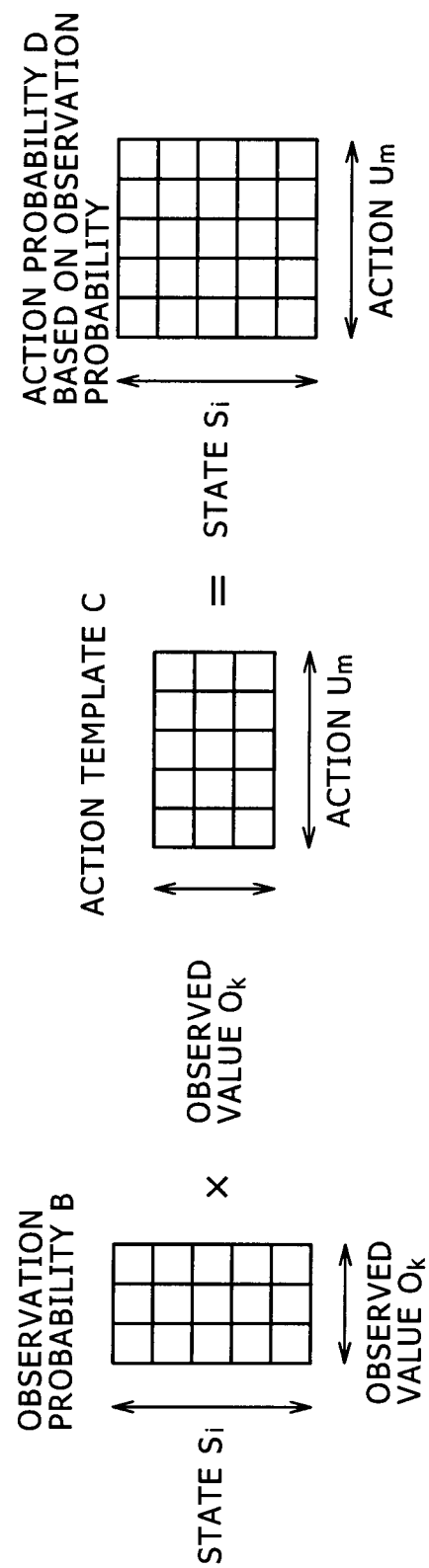
FIG. 16 is a diagram of assistance in explaining a method of calculating action probability based on observation probability.

FIG. 16 is a diagram of assistance in explaining a method of calculating the action probability D based on the observation probability.

Supposing that a matrix having the observation probability $b_i(O_k)$ of an observed value $O_k$ being observed in a state $S_i$ as an element in an ith row and a kth column is referred to as an observation probability matrix B, the observation probability matrix B is a matrix of N rows and K columns in which matrix the number of rows is equal to the number N of states $S_i$ and the number of columns is equal to the number K of observed values $O_k$.

The open end detecting section 37 calculates the action probability D based on the observation probability, the action probability D being a matrix having a probability of an action $U_m$ being performed in a state $S_i$ in which an observed value $O_k$ is observed as an element in an ith row and an mth column, by multiplying the observation probability matrix B of N rows and K columns by the action template C, which is a matrix of K rows and M columns, according to equation (17).

$$D = BC \qquad (17)$$

In addition to calculating the action probability D based on the observation probability as described above, the open end detecting section 37 calculates an action probability E based on state transition probability.

Figure 17:
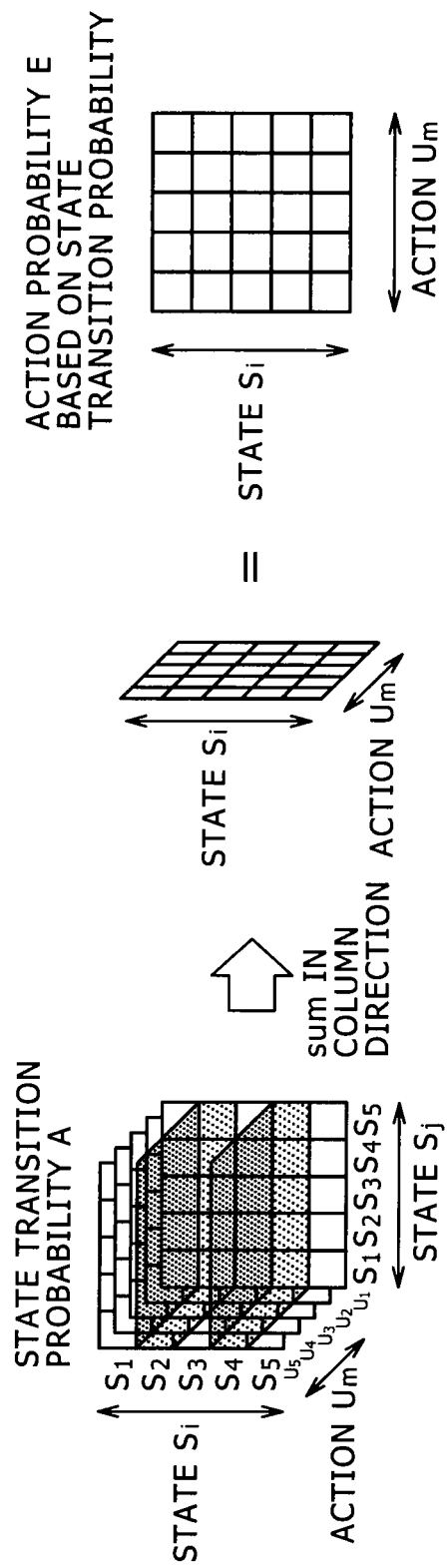
FIG. 17 is a diagram of assistance in explaining a method of calculating action probability based on state transition probability.

FIG. 17 is a diagram of assistance in explaining a method of calculating the action probability E based on the state transition probability.

The open end detecting section 37 calculates the action probability E based on the state transition probability, the action probability E being a matrix having a probability of an action $U_m$ being performed in a state $S_i$ as an element in an ith row and an mth column, by adding together state transition probabilities $a_{ij}(U_m)$ for each action $U_m$ with respect to each state $S_i$ in an i-axis direction in a three-dimensional state transition probability table A made of an i-axis, a j-axis, and an action axis.

That is, the open end detecting section 37 calculates the action probability E based on the state transition probability, the action probability E being a matrix of N rows and M columns, by obtaining a sum total of state transition probabilities $a_{ij}(U_m)$ arranged in a horizontal direction (column direction) in the state transition probability table A made of the i-axis, the j-axis, and the action axis, that is, a sum total of state transition probabilities $a_{ij}(U_m)$ arranged in a straight line parallel to the j-axis which straight line passes through a point (i, m) when attention is directed to a position i on the i-axis and a position m on the action axis, and setting the sum total as an element in the ith row and mth column of the matrix.

After calculating the action probability D based on the observation probability and the action probability E based on the state transition probability as described above, the open end detecting section 37 calculates a differential action probability F, which is a difference between the action probability D based on the observation probability and the action probability E based on the state transition probability according to equation (18).

$$F = D - E \quad (18)$$

The differential action probability F is a matrix of N rows and M columns as with the action probability D based on the observation probability and the action probability E based on the state transition probability.

Figure 18:
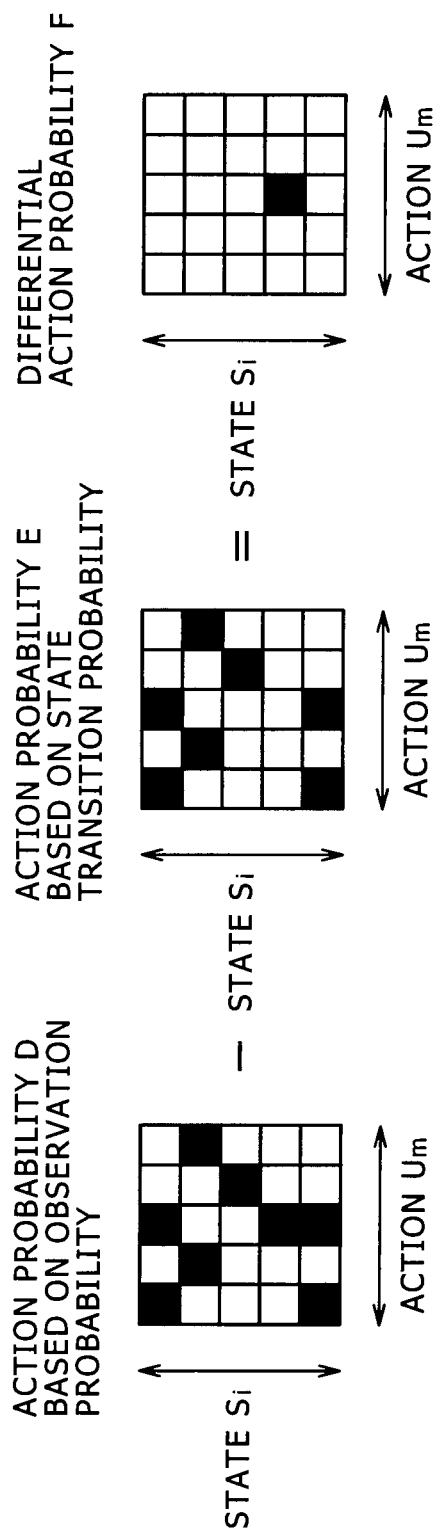
FIG. 18 is a diagram schematically showing differential action probability.

FIG. 18 is a diagram schematically showing the differential action probability F.

Small squares in FIG. 18 represent the elements of the matrix. Squares without a pattern represent elements whose value is 0.0 (a value assumed to be 0.0). Squares filled in with black represent elements whose value is not 0.0 (not a value assumed to be 0.0).

According to the differential action probability F, when there are a plurality of states as states in which an observed value $O_k$ is observed, and it is known that an action $U_m$ can be performed from a part of the plurality of states (a state in which the agent has performed the action $U_m$), another state in which a state transition that occurs when the action $U_m$ is performed is not reflected in a state transition probability $a_{ij}(U_m)$ (a state in which the agent has not performed the action $U_m$), that is, an open end can be detected.

Specifically, when a state transition that occurs when an action $U_m$ is performed is reflected in the state transition probability $a_{ij}(U_m)$ of a state $S_i$, an element in the ith row and the mth column of the action probability D based on the observation probability and an element in the ith row and the mth column of the action probability E based on the state transition probability assume similar values to each other.

On the other hand, when a state transition that occurs when the action $U_m$ is performed is not reflected in the state transition probability $a_{ij}(U_m)$ of the state $S_i$, the element in the ith row and the mth column of the action probability D based on the observation probability is a certain value that cannot be assumed to be 0.0 due to an effect of the state transition probability of a state in which the same observed value as in the state $S_i$ is observed and the action $U_m$ has been performed, whereas the element in the ith row and the mth column of the action probability E based on the state transition probability is 0.0 (including a small value that can be assumed to be 0.0).

Hence, when a state transition that occurs when the action $U_m$ is performed is not reflected in the state transition probability $a_{ij}(U_m)$ of the state $S_i$, an element in the ith row and the mth column of the differential action probability F has a value (absolute value) that cannot be assumed to be 0.0. Therefore an open end and an action that has not been performed in the open end can be detected by detecting an element having a value that cannot be assumed to be 0.0 in the differential action probability F.

That is, when the element in the ith row and the mth column of the differential action probability F has a value that cannot be assumed to be 0.0, the open end detecting section 37 detects the state $S_i$ as an open end, and detects the action $U_m$ as an action that has not been performed in the state $S_i$ as an open end.

Figure 19:
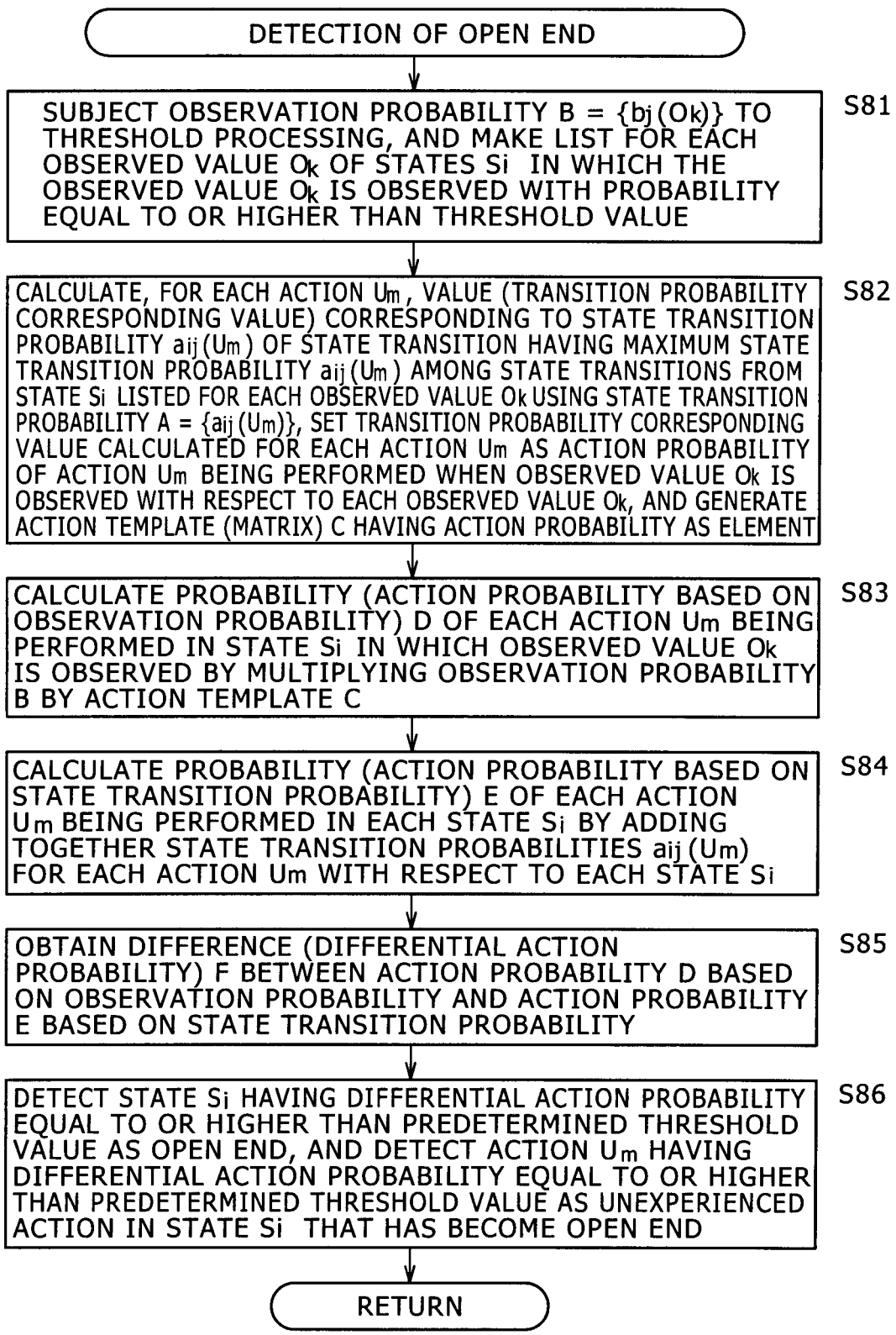
FIG. 19 is a flowchart of assistance in explaining a process of detecting an open end.

FIG. 19 is a flowchart of assistance in explaining a process of detecting an open end which process is performed in step S53 in FIG. 9 by the open end detecting section 37 in FIG. 4.

In step S81, the open end detecting section 37 subjects the observation probability $B = \{b_i(O_k)\}$ of the extended HMM stored in the model storing section 22 (FIG. 4) to threshold processing, and thereby makes a list for each observed value $O_k$ of states $S_i$ in which the observed value $O_k$ is observed with a probability equal to or higher than a threshold value, as described with reference to FIGS. 14A and 14B.

After step S81, the process proceeds to step S82, where, as described with reference to FIG. 15, the open end detecting section 37 calculates a transition probability corresponding value for each action $U_m$ with respect to each observed value $O_k$ using the state transition probability $A = \{a_{ij}(U_m)\}$ of the extended HMM stored in the model storing section 22, the transition probability corresponding value being a value corresponding to the state transition probability $a_{ij}(U_m)$ of a state transition whose state transition probability $a_{ij}(U_m)$ is a maximum among state transitions from a state $S_i$ listed for the observed value $O_k$, sets the transition probability corresponding value calculated for each action $U_m$ with respect to each observed value $O_k$ as an action probability of the action $U_m$ being performed when the observed value $O_k$ is observed, and generates an action template C, which is a matrix having the action probability as an element.

Thereafter, the process proceeds from step S82 to step S83, where the open end detecting section 37 calculates an action probability D based on observation probability by multiplying an observation probability matrix B by the action template C according to equation (17). The process then proceeds to step S84.

In step S84, as described with reference to FIG. 17, the open end detecting section 37 calculates an action probability E based on state transition probability, the action probability E being a matrix having a probability of an action $U_m$ being performed in a state $S_i$ as an element in an ith row and an mth column, by adding together state transition probabilities $a_{ij}(U_m)$ for each action $U_m$ with respect to each state $S_i$ in an i-axis direction in a state transition probability table A.

The process then proceeds from step S84 to step S85, where the open end detecting section 37 calculates a differential action probability F, which is a difference between the action probability D based on the observation probability and the action probability E based on the state transition probability according to equation (18). The process then proceeds to step S86.

In step S86, the open end detecting section 37 subjects the differential action probability F to threshold processing, and thereby detects an element whose value is equal to or higher than a threshold value in the differential action probability F as a detection object element as an object of detection.

Further, the open end detecting section 37 detects the row i and the column m of the detection object element, detects a state $S_i$ as an open end, and detects an action $U_m$ as an unexperienced action that has not been performed in the open end $S_i$. The process then makes a return.

By performing the unexperienced action in the open end, the agent can explore an unknown area continuing beyond the open end.

The existing action determining method determines the goal of the agent with a known area (learned area) and an unknown area (area not learned yet) treated equally (without distinction) without considering the experience of the agent. Thus, many actions need to be performed to accumulate experience of an unknown area. As a result, many trials and much time are required to learn the structure of the action environment widely.

On the other hand, the agent of FIG. 4 detects an open end, and determines an action with the open end as a goal state. The agent of FIG. 4 can therefore learn the structure of the action environment efficiently.

That is, an open end is a state beyond which an unknown area not experienced by the agent extends. Therefore, by detecting an open end and determining an action with the open end as a goal state, the agent can aggressively step into an unknown area. Thereby, the agent can efficiently accumulate experience to learn the structure of the action environment more widely.

[Detection of State of Branch Structure]

Figure 20:
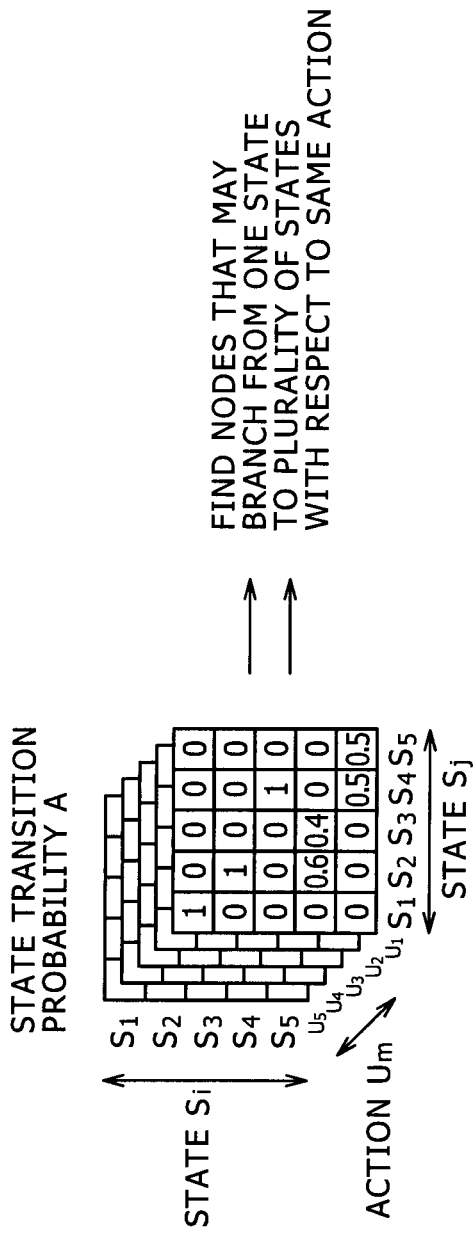
FIG. 20 is a diagram of assistance in explaining a method of detecting a state of branch structure by a branch structure detecting section.

FIG. 20 is a diagram of assistance in explaining a method of detecting a state of branch structure by the branch structure detecting section 36 in FIG. 4.

The extended HMM obtains a part changing in structure in the action environment as a state of branch structure. A state of branch structure corresponding to a change in structure already experienced by the agent can be detected by referring to the state transition probability of the extended HMM as a long term memory. When a state of branch structure is detected, the agent can recognize the presence of a part changing in structure in the action environment.

When a part changing in structure is present in the action environment, it is desirable to actively check the present structure of such a part periodically or irregularly, and reflect the present structure in the inhibitor, or in turn the corrected transition probability as a short term memory.

Accordingly, the agent of FIG. 4 can detect a state of branch structure in the branch structure detecting section 36, and select the state of branch structure as a goal state in the goal selecting section 31.

The branch structure detecting section 36 detects a state of branch structure as shown in FIG. 20.

A state transition probability plane with respect to each action $U_m$ in the state transition probability table A is normalized such that a sum total in a horizontal direction (column direction) of each row is 1.0.

Hence, when attention is directed to a certain row i in a state transition probability plane with respect to an action $U_m$, and the state $S_i$ is not a state of branch structure, a maximum value of state transition probabilities $a_{ij}(U_m)$ in the ith row is 1.0 or a value very close to 1.0.

On the other hand, when the state $S_i$ is a state of branch structure, the maximum value of the state transition probabilities $a_{ij}(U_m)$ in the ith row is sufficiently smaller than 1.0, such as 0.6 or 0.5 shown in FIG. 20, for example, and is larger than a value (average value) 1/N obtained by equally dividing the state transition probabilities whose sum total is 1.0 by the number N of states.

Accordingly, when a maximum value of state transition probabilities $a_{ij}(U_m)$ in each row i in the state transition probability plane with respect to each action $U_m$ is smaller than a threshold value $a_{max\_th}$ which is smaller than 1.0, and is larger than the average value 1/N, the branch structure detecting section 36 detects the state $S_i$ as a state of branch structure according to equation (19).

$$1/N < \max_{j, i=S, m=U}(A_{ijm}) < a_{max\_th} \quad (19)$$

In equation (19), $A_{ijm}$ denotes a state transition probability $a_{ij}(U_m)$ in an ith position from the top in an i-axis direction, a jth position from the left in a j-axis direction, and an mth position from the front in an action axis direction in the three-dimensional state transition probability table A.

In addition, in equation (19), $\max(A_{ijm})$ denotes a maximum value of N state transition probabilities $A_{i, s, u}$ to $A_{N, S, U}$ ($a_{1, S}(U)$ to $a_{N, S}(U)$) in an Sth position from the left in the j-axis direction (a state as a transition destination of state transition from the state $S_i$ is a state S) and a Uth position from the front in the action axis direction (an action performed when state transition from the state $S_i$ occurs is an action U) in the state transition probability table A.

Incidentally, the threshold value $a_{max\_th}$ in equation (19) can be adjusted in a range $1/N < a_{max\_th} < 1.0$ according to a degree of sensitivity to detect a state of branch structure. The closer the threshold value $a_{max\_th}$ is brought to 1.0, the more sensitively states of branch structure can be detected.

When detecting one or more states of branch structure, the branch structure detecting section 36 supplies the one or more states of branch structure to the goal selecting section 31, as described with reference to FIG. 9.

Referring to the elapsed time managing table in the elapsed time managing table storing section 32, the goal selecting section 31 recognizes the elapsed time of the one or more states of branch structure from the branch structure detecting section 36.

Then, the goal selecting section 31 detects a state whose elapsed time is longest from the one or more states of branch structure from the branch structure detecting section 36, and selects the state as a goal state.

By detecting a state whose elapsed time is longest from the one or more states of branch structure and selecting the state as a goal state as described above, it is possible to set each of the one or more states of branch structure as a goal state temporally equally, as it were, and perform action to check how the structure corresponding to the state of branch structure is.

In the existing action determining method, a goal is determined without attention being directed to states of branch structure, and therefore a state that is not a state of branch structure is often set as a goal. Thus, unnecessary actions are often performed when the latest structure of the action environment is to be grasped.

On the other hand, the agent of FIG. 4 determines an action with a state of branch structure set as a goal state. Therefore the latest structure of a part corresponding to the state of branch structure can be grasped early, and reflected in the inhibitor.

Incidentally, when a state of branch structure is set as a goal state, the agent after reaching the state of branch structure (an observation unit corresponding to the state of branch structure) as the goal state can identify an action by which a state transition can be made from the state of branch structure to a different state on the basis of the extended HMM, and move by performing the action. The agent can thereby recognize (grasp) the structure of a part corresponding to the state of branch structure, that is, the state to which a state transition can be made from the state of branch structure at present.

[Simulation]

FIGS. 21A and 21B are diagrams showing an action environment employed in simulation of the agent of FIG. 4 which simulation was performed by the present inventor.

Specifically, FIG. 21A shows the action environment of a first structure, and FIG. 21B shows the action environment of a second structure.

In the action environment of the first structure, positions pos1, pos2, and pos3 are a passage through which the agent can pass, whereas in the action environment of the second structure, the positions pos1 to pos3 are a wall through which the agent cannot pass.

Incidentally, each of the positions pos1 to pos3 can be made to be a passage or a wall individually.

In the simulation, the agent was made to perform actions in the reflex action mode (FIG. 5) in each of the action environments of the first structure and the second structure, an observed value series and an action series serving as learning data of 4000 steps (times) were obtained, and the extended HMM was learned.

Figure 22:
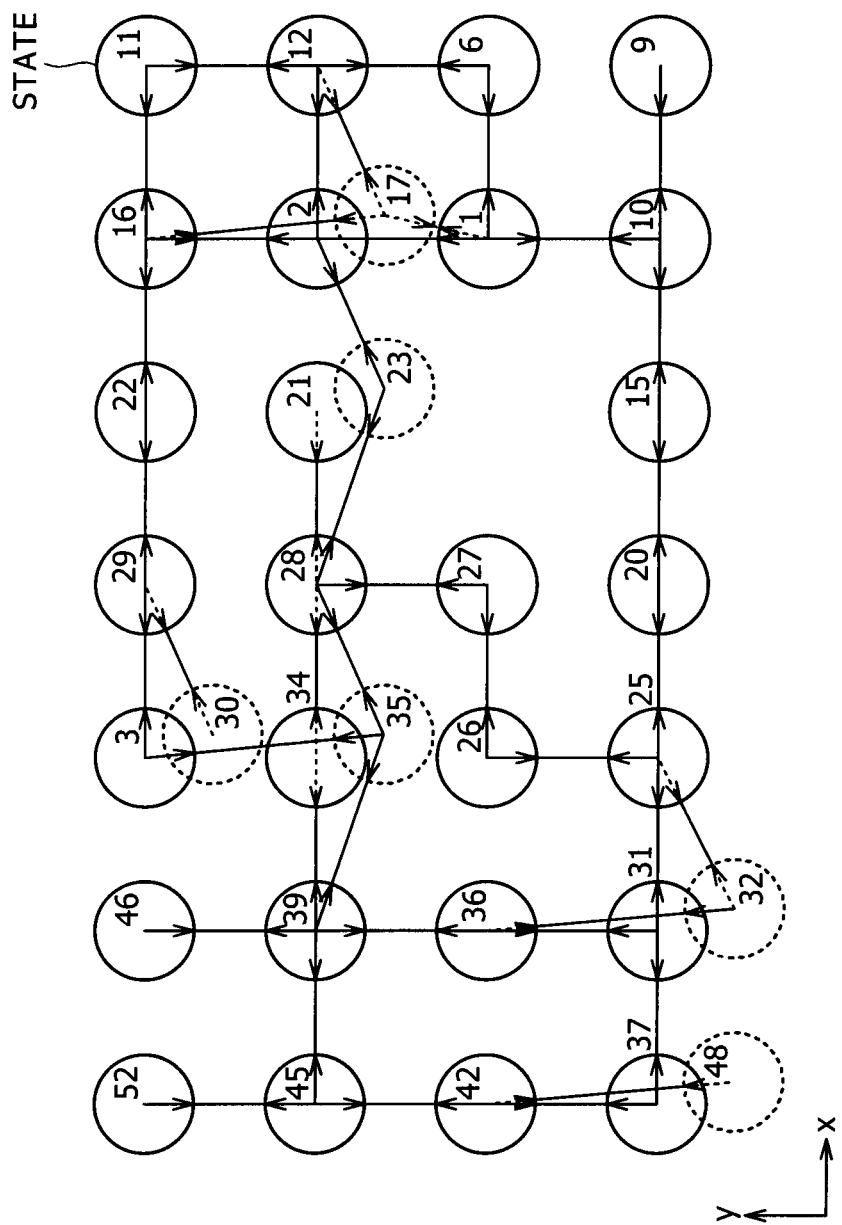
FIG. 22 is a diagram schematically showing the extended HMM after being learned in the simulation.

FIG. 22 is a diagram schematically showing the extended HMM after being learned.

In FIG. 22, a circle (○) mark represents a state of the extended HMM, and a number entered in the circle mark is the suffix of the state represented by the circle mark. Arrows indicating states represented by circle marks represent possible state transitions (state transitions whose state transition probability is other than 0.0 (a value that can be assumed to be 0.0)).

In the extended HMM of FIG. 22, a state $S_i$ is disposed at the position of an observation unit corresponding to the state $S_i$.

Two states between which state transitions are possible represent that the agent can move between two observation units corresponding to the two respective states. Thus, arrows indicating state transitions of the extended HMM represent passages through which the agent can move in the action environment.

In FIG. 22, there are cases where two (a plurality of) states $S_i$ and $S_{i'}$ are disposed so as to overlap each other at the position of one observation unit. This indicates that the two (plurality of) states $S_i$ and $S_{i'}$ correspond to the one observation unit.

In FIG. 22, as in the case of FIG. 10A, states $S_3$ and $S_{30}$ correspond to one observation unit, and states $S_{34}$ and $S_{35}$ also correspond to one observation unit. Similarly, states $S_{21}$ and $S_{23}$ correspond to one observation unit, states $S_2$ and $S_{17}$ correspond to one observation unit, states $S_{37}$ and $S_{48}$ correspond to one observation unit, and states $S_{31}$ and $S_{32}$ correspond to one observation unit.

In FIG. 22, a state $S_{29}$ from which state transition can be made to the different states $S_3$ and $S_{30}$ when the action $U_4$ (FIG. 3B) of moving in the left direction is performed, a state $S_{39}$ from which state transition can be made to the different states $S_{34}$ and $S_{35}$ when the action $U_2$ of moving in the right direction is performed, a state $S_{28}$ from which state transition can be made to the different states $S_{34}$ and $S_{35}$ when the action $U_4$ of moving in the left direction is performed (the state $S_{28}$ is also a state from which state transition can be made to the different states $S_{21}$ and $S_{23}$ when the action $U_2$ of moving in the right direction is performed), a state $S_1$ from which state transition can be made to the different states $S_2$ and $S_{17}$ when the action $U_1$ of moving in the upward direction is performed, a state $S_{16}$ from which state transition can be made to the different states $S_2$ and $S_{17}$ when the action $U_3$ of moving in the downward direction is performed, a state $S_{12}$ from which state transition can be made to the different states $S_2$ and $S_{17}$ when the action $U_4$ of moving in the left direction is performed, a state $S_{42}$ from which state transition can be made to the different states $S_{37}$ and $S_{48}$ when the action $U_3$ of moving in the downward direction is performed, a state $S_{36}$ from which state transition can be made to the different states $S_{31}$ and $S_{32}$ when the action $U_3$ of moving in the downward direction is performed, and a state $S_{25}$ from which state transition can be made to the different states $S_{31}$ and $S_{32}$ when the action $U_4$ of moving in the left direction is performed are a state of branch structure.

Incidentally, dotted line arrows in FIG. 22 represent a state transition possible only in the action environment of the second structure. Thus, when the structure of the action environment is the first structure (FIG. 21A), the state transitions represented by the dotted line arrows in FIG. 22 cannot be made.

In the simulation, an initial setting was made to set inhibitors corresponding to the state transitions represented by the dotted line arrows in FIGS. 22 to 0.0, and set inhibitors corresponding to other state transitions to 1.0. The agent was thereby prevented from calculating action plans including actions effecting state transitions possible in only the action environment of the second structure immediately after a start of the simulation.

FIGS. 23 to 29 are diagrams showing the agent that calculates an action plan to reach a goal state on the basis of the extended HMM after learning, and which performs actions determined according to the action plan.

Incidentally, FIGS. 23 to 29 show the agent within the action environment and a goal state (an observation unit corresponding to the goal state) on an upper side, and show the extended HMM on a lower side.

Figure 23:
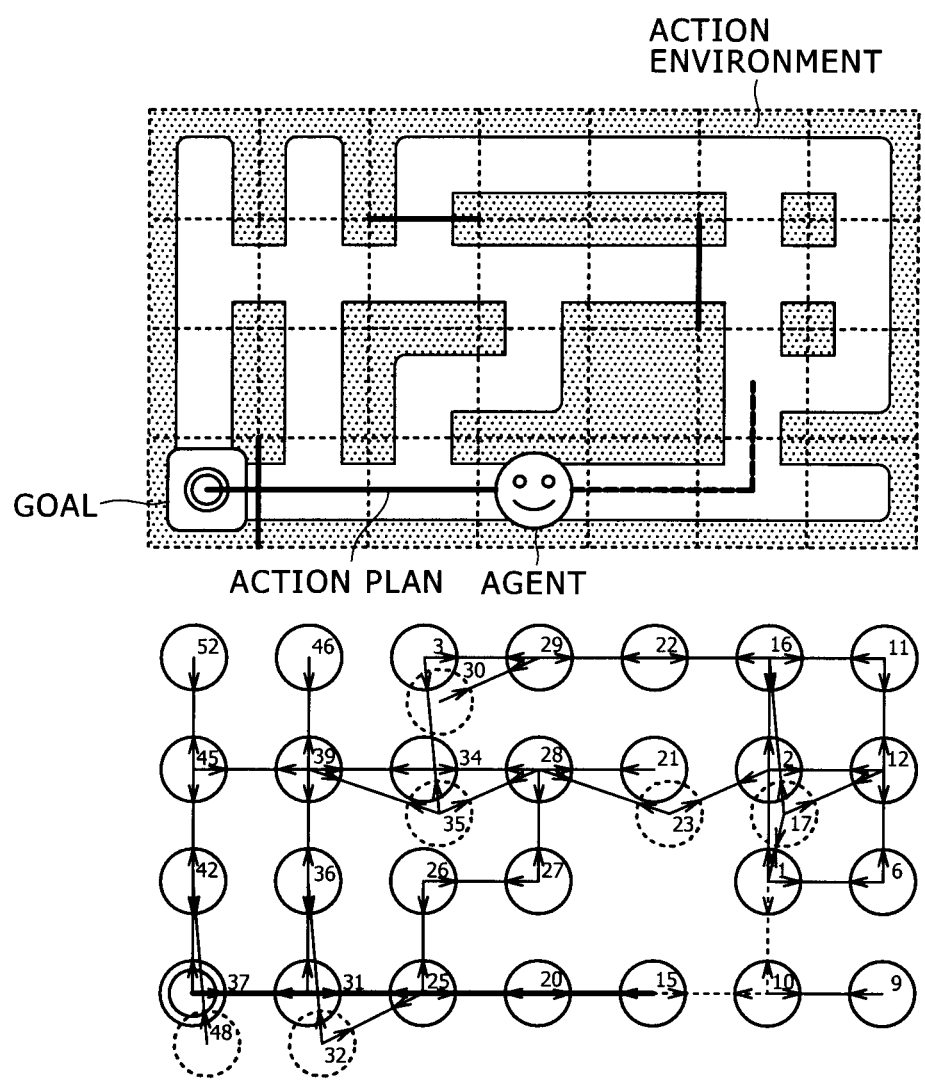
FIG. 23 is a diagram showing a result of the simulation.

FIG. 23 shows the agent at time $t=t_0$.

At time $t=t_0$, the structure of the action environment is the first structure (FIG. 21A) in which the positions pos1 to pos3 are a passage.

Further, at time $t=t_0$, the goal state (observation unit corresponding to the goal state) is a lower left state $S_{37}$, and the agent is located in a state $S_{20}$ (observation unit corresponding to the state $S_{20}$).

Then, the agent calculates an action plan for going to the state $S_{37}$ as the goal state, and is moving in the left direction from the state $S_{20}$ as present state as an action determined according to the action plan.

Figure 24:
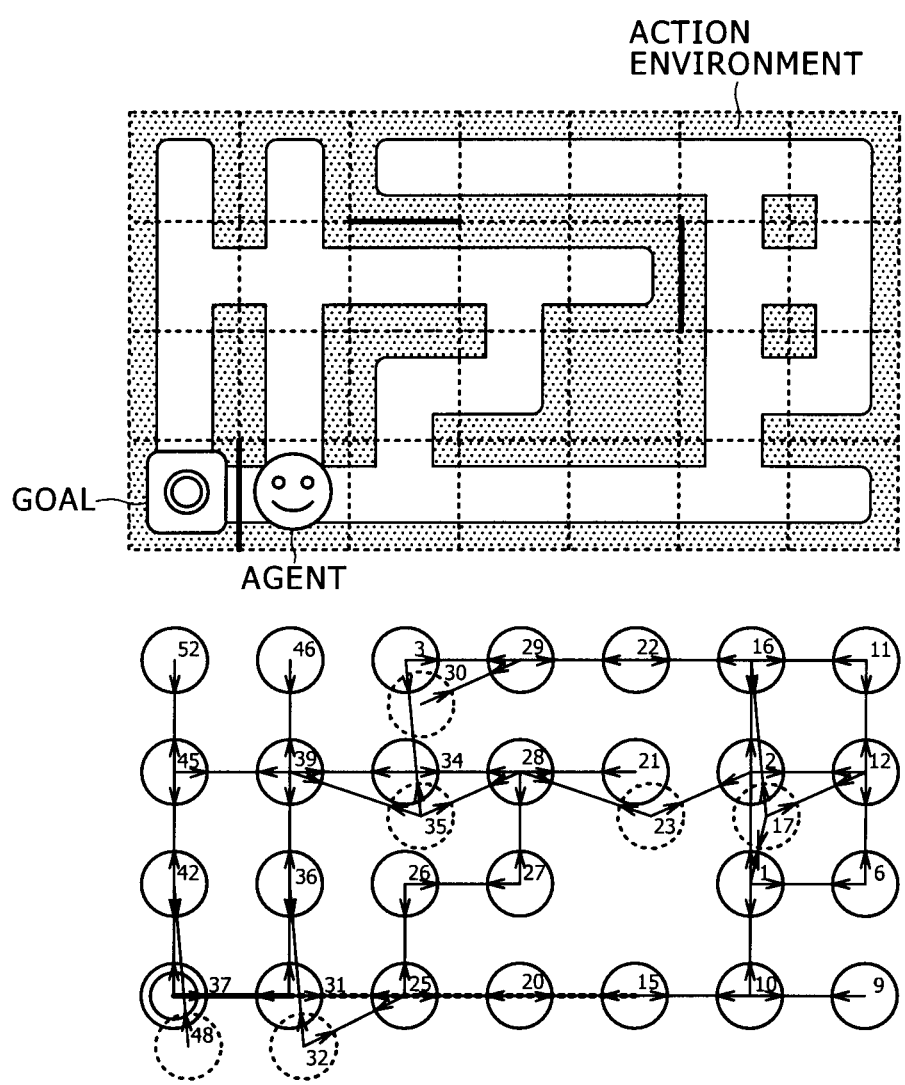
FIG. 24 is a diagram showing a result of the simulation.

FIG. 24 shows the agent at time $t=t_1$ ($>t_0$).

At time $t=t_1$, the structure of the action environment is changed from the first structure to a structure in which the position pos1 is a passage through which the agent can pass but the positions pos2 and pos3 are a wall through which the agent cannot pass.

Further, at time $t=t_1$, the goal state is the lower left state $S_{37}$ as at time $t=t_0$, and the agent is located in a state $S_{31}$.

Figure 25:
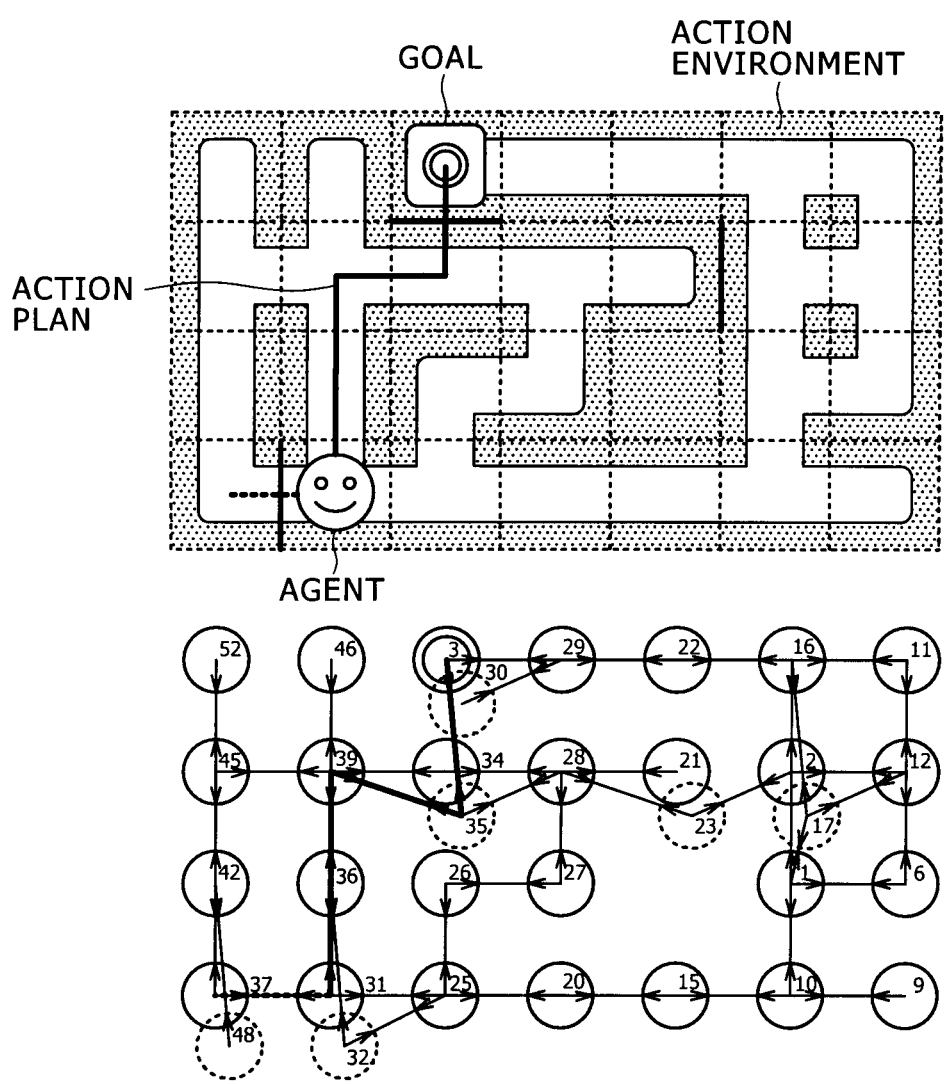
FIG. 25 is a diagram showing a result of the simulation.

FIG. 25 shows the agent at time $t=t_2$ ($>t_1$).

At time $t=t_2$, the structure of the action environment is the structure in which the position pos1 is a passage through which the agent can pass but the positions pos2 and pos3 are a wall through which the agent cannot pass (which structure will hereinafter be referred to also as the structure after the change).

Further, at time $t=t_2$, the goal state is a state $S_3$ on the upper side, and the agent is located in the state $S_{31}$.

Then, the agent calculates an action plan for going to the state $S_3$ as the goal state, and is going to move in the upward direction from the state $S_{31}$ as present state as an action determined according to the action plan.

In this case, at time $t=t_2$, the action plan to effect state transitions of a state series $S_{31}$, $S_{36}$, $S_{39}$, $S_{35}$, and $S_3$ is calculated.

Incidentally, when the action environment is of the first structure, the position pos1 (FIG. 21A) between the observation unit corresponding to the states $S_{37}$ and $S_{48}$ and the observation unit corresponding to the states $S_{31}$ and $S_{32}$, the position pos2 between the observation unit corresponding to the states $S_3$ and $S_{30}$ and the observation unit corresponding to the states $S_{34}$ and $S_{35}$, and the position pos3 between the observation unit corresponding to the states $S_{21}$ and $S_{23}$ and the observation unit corresponding to the states $S_2$ and $S_{17}$ are each a passage. The agent can therefore pass through the positions pos1 to pos3.

However, when the action environment is changed to the structure after the change, the positions pos2 and pos3 are a wall, and thus the agent cannot pass through the positions pos2 and pos3.

As described above, in the initial setting of the simulation, only inhibitors corresponding to the state transitions possible only in the action environment of the second structure are set to 0.0. At time $t=t_2$, state transitions possible in the action environment of the first structure are not inhibited.

Thus, at time $t=t_2$, although the position pos2 between the observation unit corresponding to the states $S_3$ and $S_{30}$ and the observation unit corresponding to the states $S_{34}$ and $S_{35}$ is a wall through which the agent cannot pass, the agent calculates an action plan including an action that effects a state transition from the state $S_{35}$ to the state $S_3$ to pass through the position pos2 between the observation unit corresponding to the states $S_3$ and $S_{30}$ and the observation unit corresponding to the states $S_{34}$ and $S_{35}$.

Figure 26:
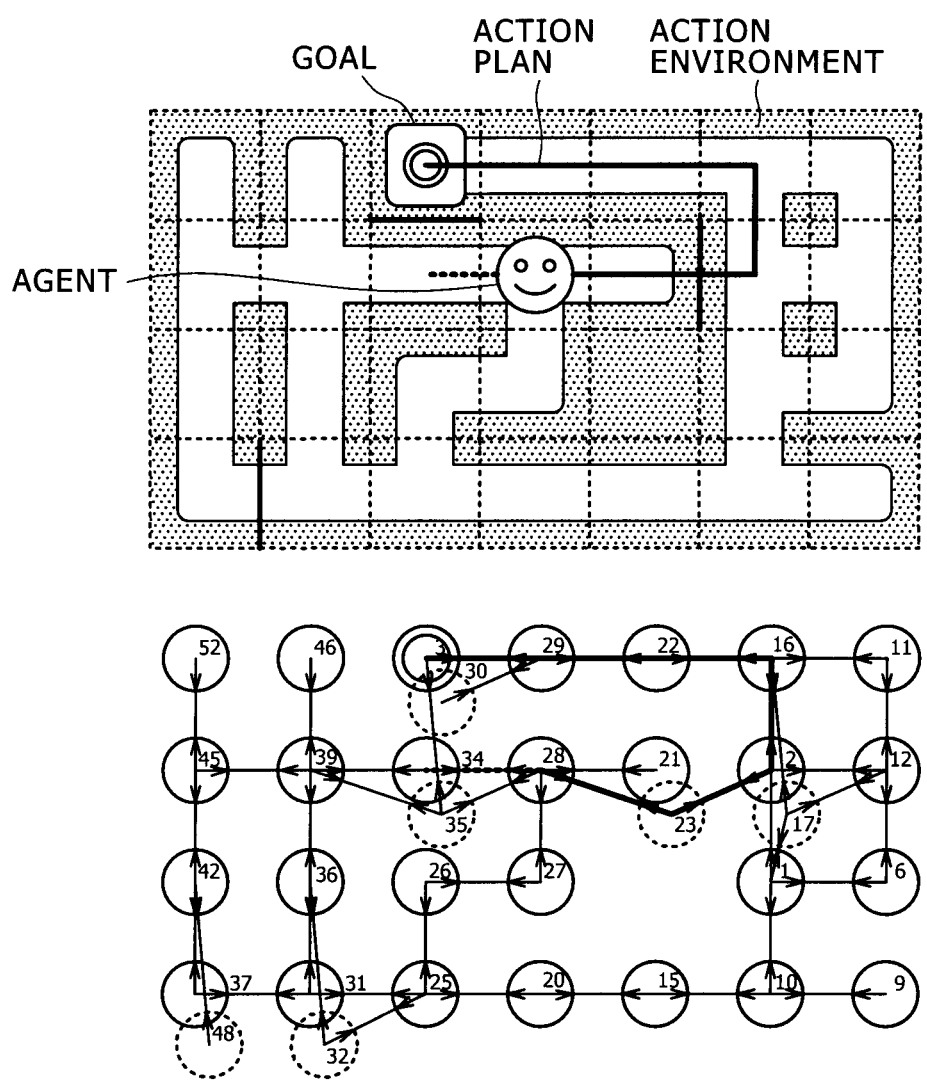
FIG. 26 is a diagram showing a result of the simulation.

FIG. 26 shows the agent at time $t=t_3$ ($>t_2$).

At time $t=t_3$, the structure of the action environment remains the structure after the change.

Further, at time $t=t_3$, the goal state is the state $S_3$ on the upper side, and the agent is located in a state $S_{28}$.

Then, the agent calculates an action plan for going to the state $S_3$ as the goal state, and is going to move in the right direction from the state $S_{28}$ as present state as an action determined according to the action plan.

In this case, at time $t=t_3$, the action plan to effect state transitions of a state series $S_{28}$, $S_{23}$, $S_2$, $S_{16}$, $S_{22}$, $S_{28}$, and $S_3$ is calculated.

The agent calculates a similar action plan to the action plan (FIG. 25) to effect state transitions of the state series $S_{31}$, $S_{36}$, $S_{39}$, $S_{35}$, and $S_3$ calculated at time $t=t_2$ also after time $t=t_2$, and moves to the observation unit corresponding to the state $S_{35}$ by performing an action determined according to the action plan. At this time, the agent recognizes that the agent cannot pass through the position pos2 between the observation unit corresponding to the state $S_3$ (and $S_{30}$) and the observation unit corresponding to the state ($S_{34}$ and) $S_{35}$, that is, recognizes that the state that can be reached from the state $S_{39}$ of the state series $S_{31}$, $S_{36}$, $S_{39}$, $S_{35}$, and $S_3$ corresponding to the action plan by performing the action determined according to the action plan is not the state $S_{35}$ next to the state $S_{39}$ but the state $S_{34}$. The agent updates an inhibitor corresponding to the state transition from the state $S_{39}$ to the state $S_{35}$ which state transition cannot be made to 0.0.

As a result, at time $t=t_3$, the agent calculates an action plan to effect state transitions of a state series $S_{28}$, $S_{23}$, $S_2$, $S_{16}$, $S_{22}$, $S_{29}$, and $S_3$, which action plan does not cause the state transition from the state $S_{39}$ to the state $S_{35}$ in which state transition the agent can pass through the position pos2.

Incidentally, when the action environment is of the structure after the change, the position pos3 (FIG. 21) between the observation unit corresponding to the states $S_{21}$ and $S_{23}$ and the observation unit corresponding to the states $S_2$ and $S_{17}$ is a wall, through which the agent cannot pass.

As described above, in the initial setting of the simulation, only inhibitors corresponding to the state transitions possible only in the action environment of the second structure in which the positions pos1 to pos3 are a wall through which the agent cannot pass are set to 0.0. At time $t=t_3$, a state transition from the state $S_{23}$ to the state $S_2$ which state transition is possible in the action environment of the first structure and corresponds to passing through the position pos3 is not inhibited.

Thus, at time $t=t_3$, the agent calculates an action plan that effects the state transition from the state $S_{23}$ to the state $S_2$ to pass through the position pos3 between the observation unit corresponding to the states $S_{21}$ and $S_{23}$ and the observation unit corresponding to the states $S_2$ and $S_{17}$.

FIG. 27 shows the agent at time $t=t_4$ ($=t_3+1$).

At time $t=t_4$, the structure of the action environment is the structure after the change.

Further, at time $t=t_4$, the goal state is the state $S_3$ on the upper side, and the agent is located in a state $S_{21}$.

The agent moves from the observation unit corresponding to the state $S_{28}$ to the observation unit corresponding to the states $S_{21}$ and $S_{23}$ by performing an action determined according to the action plan (FIG. 26) to effect the state transitions of the state series $S_{28}$, $S_{23}$, $S_2$, $S_{16}$, $S_{22}$, $S_{29}$, and $S_3$ calculated at time $t=t_3$. At this time, the agent recognizes that the state that can be reached from the state $S_{28}$ of the state series $S_{28}$, $S_{23}$, $S_2$, $S_{16}$, $S_{22}$, $S_{29}$, and $S_3$ corresponding to the action plan by performing the action determined according to the action plan is not the state $S_{23}$ next to the state $S_{28}$ but the state $S_{21}$. The agent updates an inhibitor corresponding to the state transition from the state $S_{28}$ to the state $S_{23}$ to 0.0.

As a result, at time $t=t_4$, the agent calculates an action plan that does not include the state transition from the state $S_{28}$ to the state $S_{23}$ (and, in turn, does not include the agent passing through the position pos3 between the observation unit corresponding to the states $S_{21}$ and $S_{23}$ and the observation unit corresponding to the states $S_2$ and $S_{17}$).

In this case, at time $t=t_4$, the action plan to effect state transitions of a state series $S_{28}$, $S_{27}$, $S_{26}$, $S_{25}$, $S_{20}$, $S_{15}$, $S_{10}$, $S_1$, $S_2$, $S_{16}$, $S_{22}$, $S_{29}$, and $S_3$ is calculated.

Figure 28:
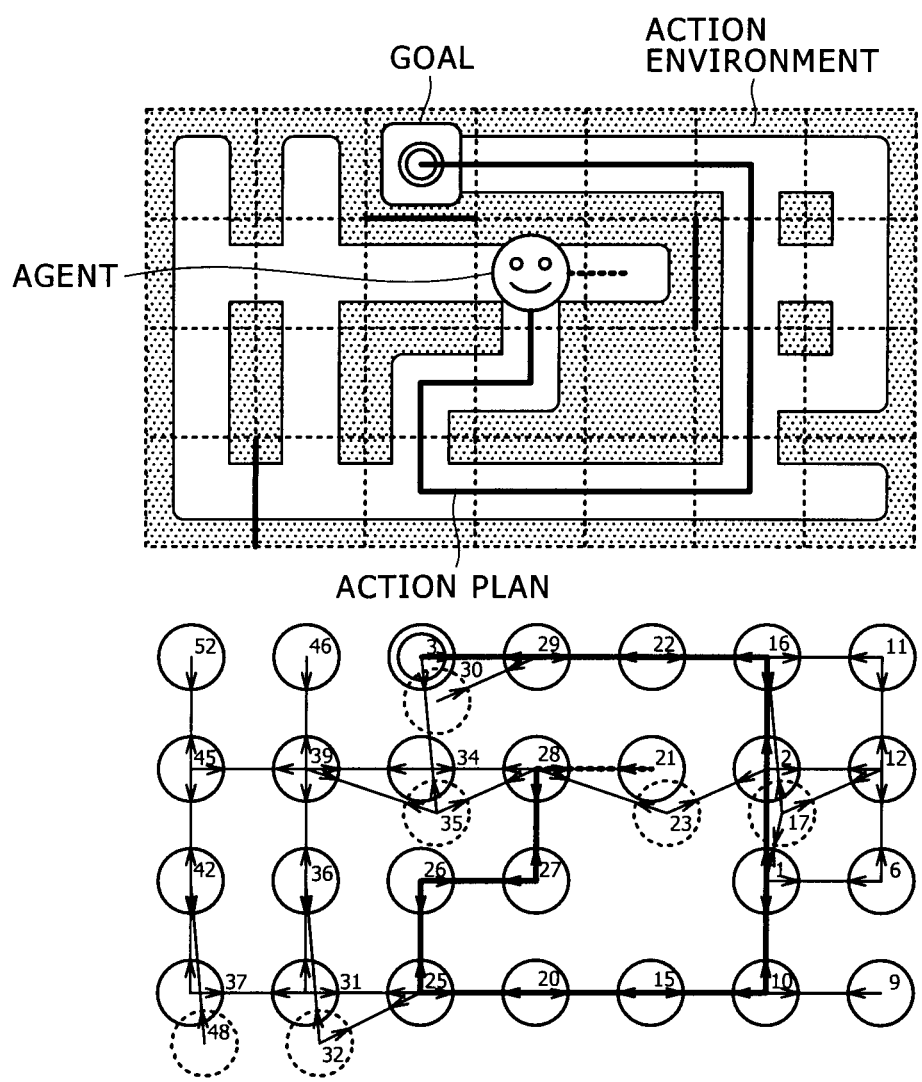
FIG. 28 is a diagram showing a result of the simulation.

FIG. 28 shows the agent at time $t=t_5$ ($=t_4+1$).

At time $t=t_5$, the structure of the action environment is the structure after the change.

Further, at time $t=t_5$, the goal state is the state $S_3$ on the upper side, and the agent is located in a state $S_{28}$.

The agent moves from the observation unit corresponding to the state $S_{21}$ to the observation unit corresponding to the state $S_{28}$ by performing an action determined according to the action plan (FIG. 27) to effect the state transitions of the state series $S_{28}$, $S_{27}$, $S_{26}$, $S_{25}$, $S_{20}$, $S_{15}$, $S_{10}$, $S_1$, $S_2$, $S_{16}$, $S_{22}$, $S_{29}$, and $S_3$ calculated at time $t=t_4$.

Figure 29:
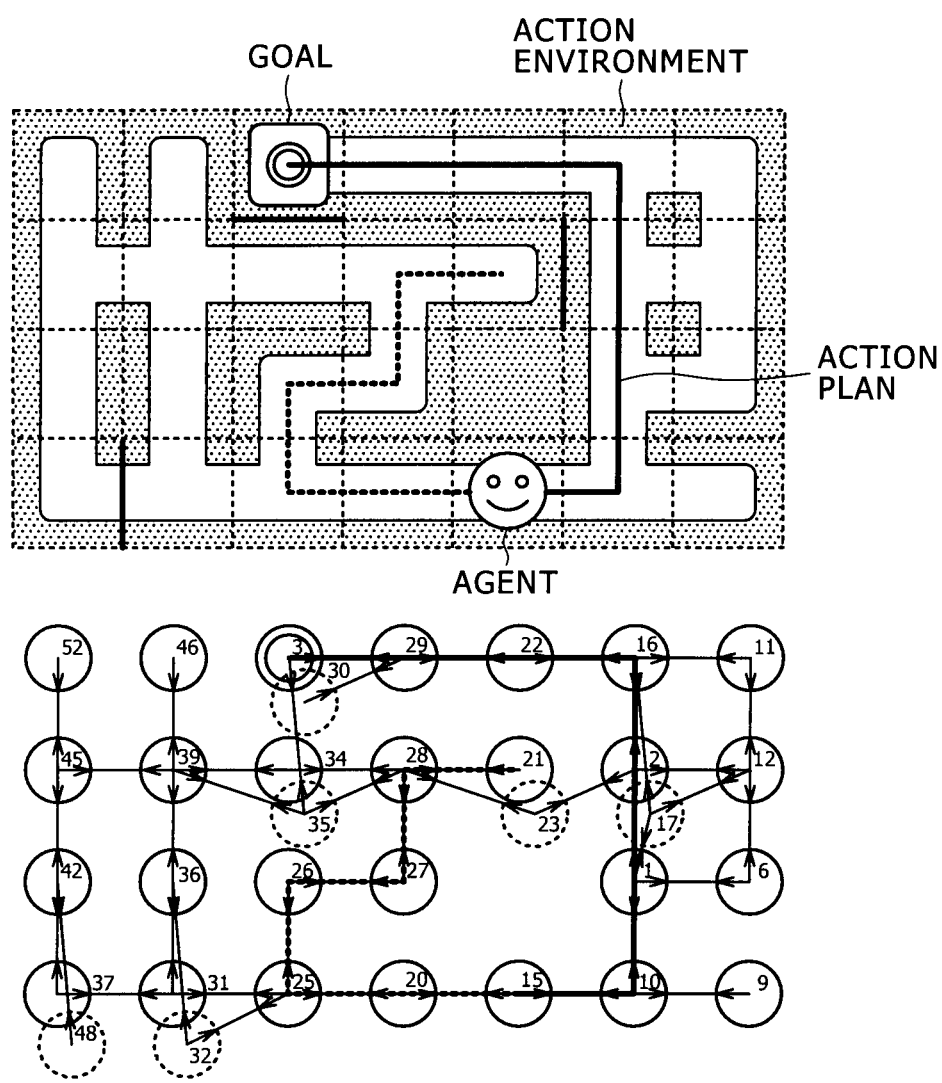
FIG. 29 is a diagram showing a result of the simulation.

FIG. 29 shows the agent at time $t=t_6$ ($>t_5$).

At time $t=t_6$, the structure of the action environment is the structure after the change.

Further, at time $t=t_6$, the goal state is the state $S_3$ on the upper side, and the agent is located in a state $S_{15}$.

Then, the agent calculates an action plan for going to the state $S_3$ as the goal state, and is going to move in the right direction from the state $S_{15}$ as present state as an action determined according to the action plan.

In this case, at time $t=t_6$, the action plan to effect state transitions of a state series $S_{10}$, $S_1$, $S_2$, $S_{16}$, $S_{22}$, $S_{29}$, and $S_3$ is calculated.

As described above, even when the structure of the action environment is changed, the agent observes the structure after the change (determines (recognizes) the present state), and updates an inhibitor. Then, the agent recalculates an action plan using the inhibitor after being updated, and can finally reach the goal state.

[Example of Application of Agent]

FIG. 30 is a diagram showing general outlines of a cleaning robot to which the agent of FIG. 4 is applied.

The cleaning robot 51 in FIG. 30 includes a block functioning as a cleaner, a block corresponding to the actuator 12 and the sensor 13 in the agent of FIG. 4, and a block for performing radio communication.

The cleaning robot in FIG. 30 sets a living room as the action environment, performs movement as action, and performs cleaning in the living room.

A host computer 52 functions as the reflex action determining section 11, the history storing section 14, the action controlling section 15, and the goal determining section 16 in FIG. 4 (has a block corresponding to the reflex action determining section 11, the history storing section 14, the action controlling section 15, and the goal determining section 16).

The host computer 52 is installed in the living room or another room, and is connected to an access point 53 for controlling radio communication by a wireless LAN (Local Area Network) or the like.

The host computer 52 exchanges necessary data with the cleaning robot 51 by performing radio communication with the cleaning robot 51 via the access point 53. The cleaning robot 51 thereby moves as action similar to that of the agent of FIG. 4.

Incidentally, in FIG. 30, in order to miniaturize the cleaning robot 51 and in view of difficulty in incorporating a sufficient power supply and sufficient calculation performance into the cleaning robot 51, the cleaning robot 51 is provided with only the block corresponding to the actuator 12 and the sensor 13, which is a minimum necessary block among the blocks forming the agent of FIG. 4, and the host computer 52 separate from the cleaning robot 51 is provided with the other blocks.

However, the provision of the blocks forming the agent of FIG. 4 to each of the cleaning robot 51 and the host computer 52 is not limited to the above-described blocks.

Specifically, for example, the cleaning robot 51 can be provided with blocks corresponding to not only the actuator 12 and the sensor 13 but also the reflex action determining section 11 not required to have a highly advanced calculating function, and the host computer 52 can be provided with blocks corresponding to the history storing section 14, the action controlling section 15, and the goal determining section 16 that need an advanced calculating function and a high storage capacity.

According to the extended HMM, in the action environment where a same observed value is observed in observation units at different positions, the present conditions of the agent can be recognized using an observed value series and an action series, and a present state, or in turn an observation unit (place) where the agent is located, can be identified uniquely.

The agent of FIG. 4 updates an inhibitor according to the present state, and successively calculates an action plan while correcting the state transition probability of the extended HMM by the inhibitor after being updated. The agent can thereby reach a goal state even in the action environment whose structure changes probabilistically.

Such an agent is for example applicable to a practical robot such as a cleaning robot or the like operating in for example a living environment that is dynamically changed in structure due to life activities of humans and in which environment humans live.

For example, a living environment such as a room or the like may be changed in structure by opening or closing of a door of the room, a change in arrangement of furniture in the room, or the like.

However, because the shape of the room itself does not change, a part that changes in structure and a part that does not change in structure coexist in the living environment.

According to the extended HMM, a part changing in structure can be stored as a state of branch structure. Therefore, a living environment including a part changing in structure can be expressed efficiently (with a low storage capacity).

On the other hand, for a cleaning robot used as an alternative device to a cleaner operated by a human in a living environment to achieve an object of cleaning the entire room, the cleaning robot needs to identify the position of the cleaning robot itself, and move while adaptively changing a path in the room whose structure changes probabilistically (room whose structure may change).

The agent of FIG. 4 is particularly useful in achieving the object (cleaning the entire room) while thus identifying the position of the cleaning robot itself and adaptively changing the path in the living environment whose structure changes probabilistically.

Incidentally, it is desirable from a viewpoint of reducing the manufacturing cost of the cleaning robot to avoid incorporating a camera as an advanced sensor and an image processing device for performing image processing such as recognition of an image output by the camera, for example, as means for observing an observed value into the cleaning robot.

That is, in order to reduce the manufacturing cost of the cleaning robot, it is desirable to employ an inexpensive means such for example as a distance measuring device that measures a distance by outputting ultrasonic waves, a laser or the like in a plurality of directions as means for the cleaning robot to observe an observed value.

However, when inexpensive means such for example as a distance measuring device is employed as means for observing an observed value, a same observed value is often observed in different positions of a living environment, and it is difficult to identify the position of the cleaning robot uniquely with only an observed value at a single time.

Even in a living environment in which it is thus difficult to identify the position of the cleaning robot uniquely with only an observed value at a single time, the position can be identified uniquely using an observed value series and an action series according to the extended HMM.

[One-State One-Observed-Value Constraint]

The learning section 21 in FIG. 4 learns the extended HMM using learning data so as to maximize the likelihood of the learning data being observed according to the Baum-Welch re-estimation method.

The Baum-Welch re-estimation method is basically a method of converging a model parameter by a gradient method. The model parameter may therefore fall into a local minimum.

Whether the model parameter falls into a local minimum is determined by initial value dependence, that is, dependence of the model parameter on an initial value.

The present embodiment employs an ergodic HMM as the extended HMM. An ergodic HMM has a particularly great initial value dependence.

The learning section 21 (FIG. 4) can learn the extended HMM under a one-state one-observed-value constraint in order to reduce the initial value dependence.

In this case, the one-state one-observed-value constraint makes (only) one observed value observed in one state of the extended HMM (an HMM including the extended HMM).

Incidentally, when the extended HMM is learned without any constraint in the action environment that changes in structure, a case where a change in structure of the action environment is represented by having a distribution in observation probability and a case where a change in structure of the action environment is represented by having a branch structure of state transitions may be mixed in the extended HMM after being learned.

A case where a change in structure of the action environment is represented by having a distribution in observation probability is a case where a plurality of observed values are observed in a certain state. A case where a change in structure of the action environment is represented by having a branch structure of state transitions is a case where state transitions to different states are caused by a same action (there is a possibility of a state transition being made from a present state to a certain state and there is also a possibility of a state transition being made to a state different from the certain state when a certain action is performed).

According to the one-state one-observed-value constraint, a change in structure of the action environment is represented only by having a branch structure of state transitions in the extended HMM.

Incidentally, when the structure of the action environment does not change, the extended HMM can be learned without the one-state one-observed-value constraint being imposed.

The one-state one-observed-value constraint can be imposed by introducing state division and, more desirably, state merge (integration) into the learning of the extended HMM.

[State Division]

Figure 31A:
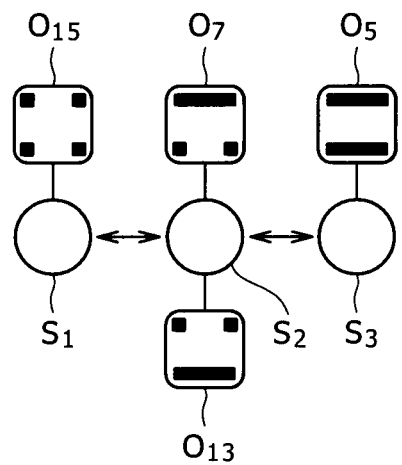
FIGS. 31A and 31B are diagrams of assistance in explaining an outline of state division for implementing a one-state one-observed-value constraint.
Figure 31B:
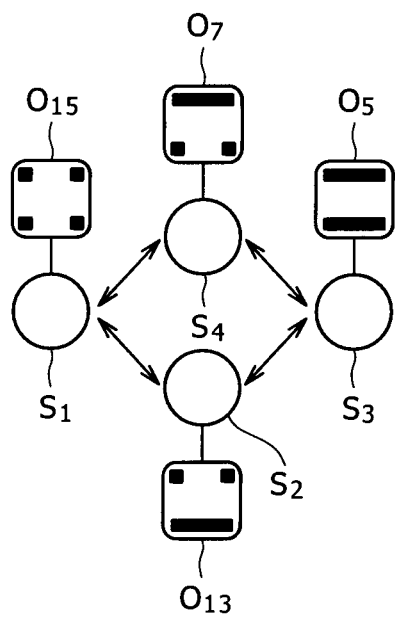

FIGS. 31A and 31B are diagrams of assistance in explaining an outline of state division for implementing the one-state one-observed-value constraint.

In the state division, when a plurality of observed values are observed in one state in the extended HMM whose model parameters (initial state probability $\pi_i$, state transition probability $a_{ij}(U_m)$, and observation probability $b_i(O_k)$) are converged by the Baum-Welch re-estimation method, the state is divided into a plurality of states the number of which is equal to the number of the plurality of observed values so that each of the plurality of observed values is observed in one state.

FIG. 31A shows the extended HMM (a part of the extended HMM) immediately after the model parameters are converged by the Baum-Welch re-estimation method.

In FIG. 31A, the extended HMM has three states $S_1$, $S_2$, and $S_3$. State transitions can be made between the states $S_1$ and $S_2$, and state transitions can be made between the states $S_2$ and $S_3$.

Further, in FIG. 31A, one observed value $O_{15}$ is observed in the state $S_1$, two observed values $O_7$ and $O_{13}$ are observed in the state $S_2$, and one observed value $O_5$ is observed in the state $S_3$.

Because the two observed values $O_7$ and $O_{13}$ as a plurality of observed values are observed in the state $S_2$ in FIG. 31A, the state $S_2$ is divided into two states equal in number to the two observed values $O_7$ and $O_{13}$.

FIG. 31B shows the extended HMM (a part of the extended HMM) after the state division.

In FIG. 31B, the state $S_2$ before the division in FIG. 31A is divided into two states, that is, the state $S_2$ after the division and a state $S_4$, which is one of invalid states (for example states whose state transition probabilities and observation probabilities are all 0.0 (values that can be assumed to be 0.0)) in the extended HMM immediately after the model parameters have converged.

Further, in FIG. 31B, only the observed value $O_{13}$, which is one of the two observed values $O_7$ and $O_{13}$ observed in the state $S_2$ before the division, is observed in the state $S_2$ after the division, and only the observed value $O_7$, which is the other of the two observed values $O_7$ and $O_{13}$ observed in the state $S_2$ before the division, is observed in the state $S_4$ after the division.

In addition, in FIG. 31B, state transitions are possible between the state $S_2$ after the division and each of the states $S_1$ and $S_3$, as with the state $S_2$ before the division. State transitions are also possible between the state $S_4$ after the division and each of the states $S_1$ and $S_3$, as with the state $S_2$ before the division.

In the state division, the learning section 21 (FIG. 4) first detects a state in which a plurality of observed values are observed in the extended HMM after learning (immediately after the model parameters have converged) as a dividing object state to be divided.

Figure 32:
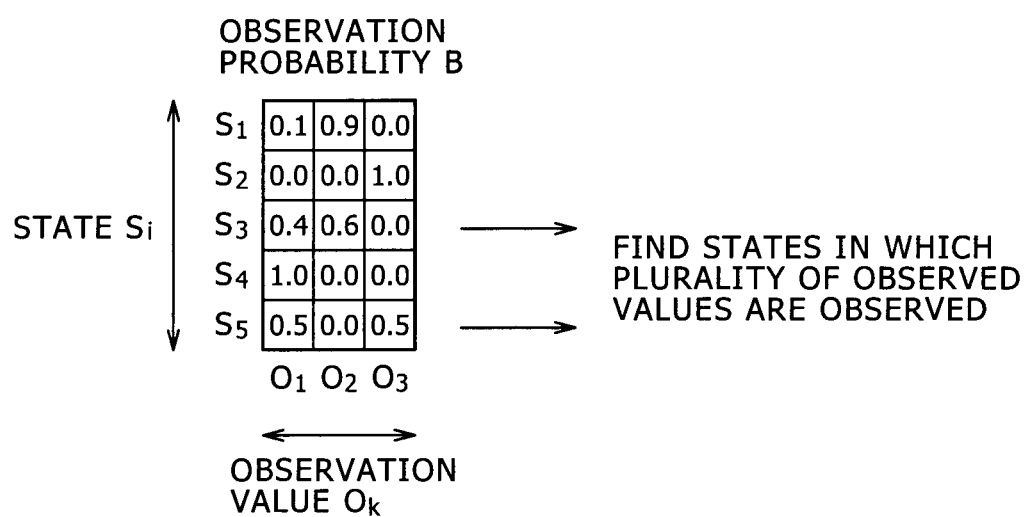
FIG. 32 is a diagram of assistance in explaining a method of detecting a dividing object state.

FIG. 32 is a diagram of assistance in explaining a method of detecting a dividing object state.

FIG. 32 shows the observation probability matrix B of the extended HMM.

As described with reference to FIG. 16, the observation probability matrix B is a matrix having an observation probability $b_i(O_k)$ of an observed value $O_k$ being observed in a state $S_i$ as an element in an ith row and a kth column.

In learning the extended HMM (HMMs including the extended HMM), each of observation probabilities $b_i(O_1)$ to $b_i(O_K)$ of observed values $O_1$ to $O_K$ being observed in a certain state $S_i$ in the observation probability matrix B is normalized such that a sum total of the observation probabilities $b_i(O_1)$ to $b_i(O_K)$ is 1.0.

Hence, when (only) one observed value is observed in one state $S_i$, a maximum value of the observation probabilities $b_i(O_1)$ to $b_i(O_K)$ of the state $S_i$ is 1.0 (a value that can be assumed to be 1.0), and the observation probabilities other than the maximum value are 0.0 (a value that can be assumed to be 0.0).

When a plurality of observed values are observed in one state $S_i$, on the other hand, a maximum value of the observation probabilities $b_i(O_1)$ to $b_i(O_K)$ of the state $S_i$ is sufficiently smaller than 1.0, such as 0.6 or 0.5 shown in FIG. 32, for example, and is larger than a value (average value) 1/K obtained by equally dividing the observation probabilities whose sum total is 1.0 by the number K of observed values $O_1$ to $O_K$.

Hence, a dividing object state can be detected by searching for an observation probability $B_{ik}=b_i(O_k)$ that is smaller than a threshold value $b_{max\_th}$ smaller than 1.0 and which is larger than the average value 1/K with respect to each state $S_i$ according to equation (20).

$$\underset{k,i=s}{\arg\text{find}}\ (1/K < B_{ik} < b_{max\_th}) \tag{20}$$

In equation (20), $B_{ik}$ denotes an element in an ith row and a kth column of the observation probability matrix B, and is equal to an observation probability $b_i(O_k)$ of an observed value $O_k$ being observed in a state $S_i$.

In equation (20), argfind($1/K<B_{ik}<b_{max\_th}$) denotes the suffix k of all observation probabilities $B_{SK}$ satisfying a conditional expression $1/K<B_{ik}<b_{max\_th}$ in parentheses when the observation probabilities $B_{SK}$ satisfying the conditional expression $1/K<B_{ik}<b_{max\_th}$ in the parentheses can be retrieved (found) in a case of the suffix i of the state $S_i$ being S.

Incidentally, the threshold value $b_{max\_th}$ in equation (20) can be adjusted in a range $1/K<b_{max\_th}<1.0$ according to a degree of sensitivity to detect a dividing object state. The closer the threshold value $b_{max\_th}$ is brought to 1.0, the more sensitively dividing object states can be detected.

The learning section 21 (FIG. 4) detects a state whose suffix i is S when an observation probability $B_{SK}$ satisfying the conditional expression $1/K<B_{ik}<b_{max\_th}$ in the parentheses in equation (20) can be retrieved (found) as a dividing object state.

Further, the learning section 21 detects the observed values $O_k$ of all the suffixes k expressed in equation (20) as a plurality of observed values observed in the dividing object state (state whose suffix i is S).

The learning section 21 then divides the dividing object state into a plurality of states equal in number to the plurality of observed values observed in the dividing object state.

Supposing that the states after the division that divided the dividing object state are referred to as states after the division, the dividing object state can be employed as one of the states after the division, and an invalid state in the extended HMM at the time of the division can be employed as the other states after the division.

Specifically, for example, when the dividing object state is divided into three states after the division, the dividing object state can be employed as one of the three states after the division, and an invalid state in the extended HMM at the time of the division can be employed as the other two states after the division.

In addition, an invalid state in the extended HMM at the time of the division can be employed as all of the plurality of states after the division. In this case, however, the dividing object state needs to be made to be an invalid state after the state division.

Figure 33A:
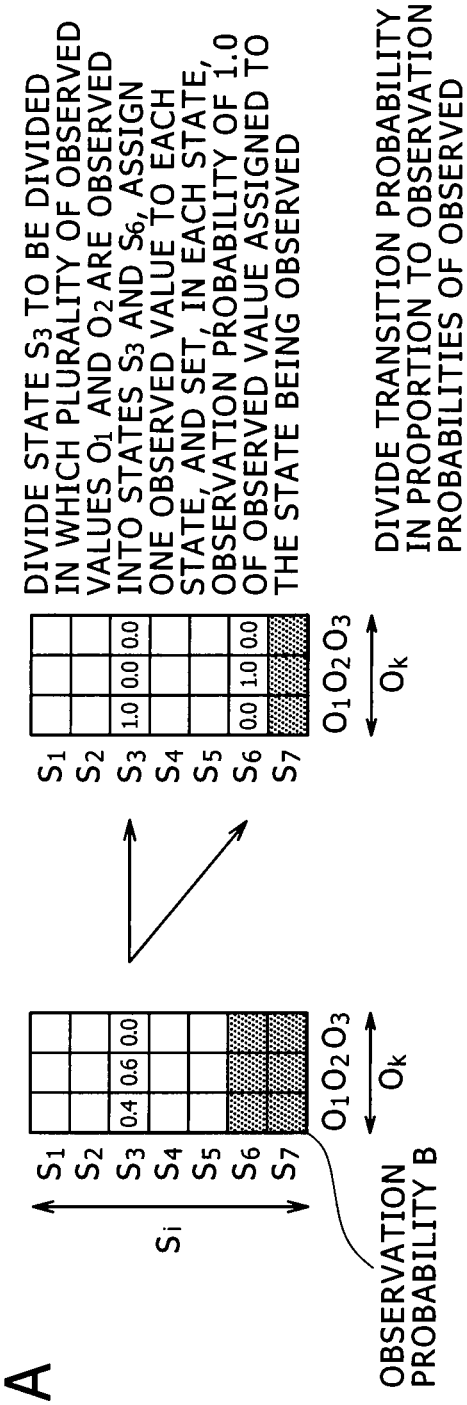
FIGS. 33A and 33B are diagrams of assistance in explaining a method of dividing a dividing object state into states after the division.
Figure 33B:
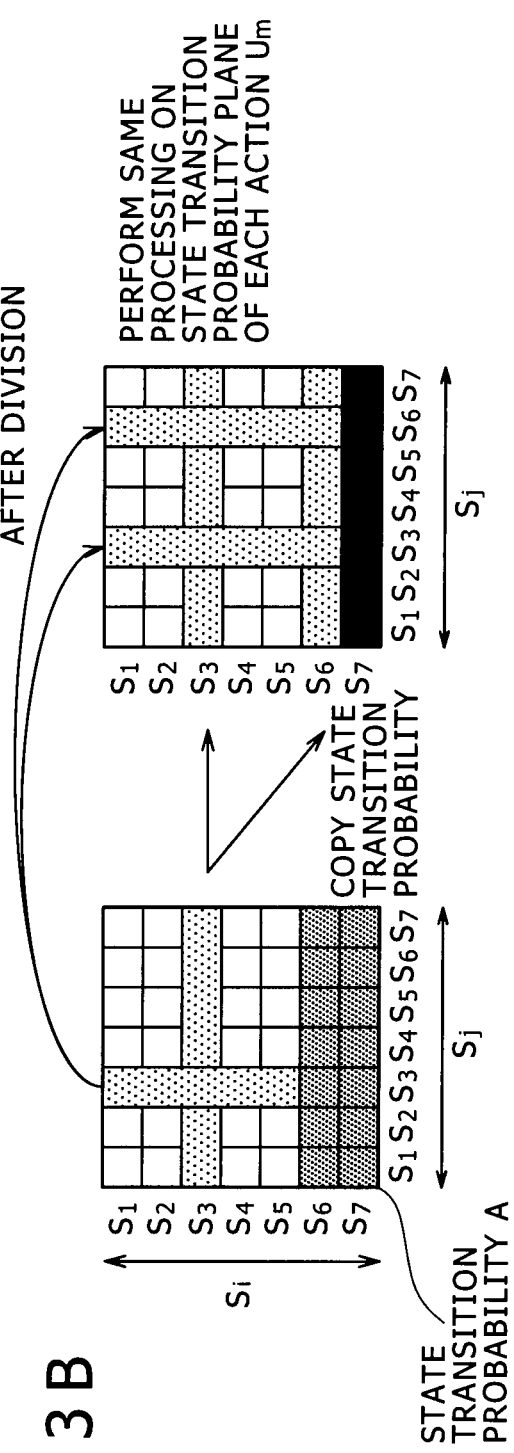

FIGS. 33A and 33B are diagrams of assistance in explaining a method of dividing a dividing object state into states after the division.

In FIGS. 33A and 33B, the extended HMM has seven states $S_1$ to $S_7$ of which two states $S_6$ and $S_7$ are invalid states.

Further, in FIGS. 33A and 33B, the state $S_3$ is set as a dividing object state in which two observed values $O_1$ and $O_2$ are observed, and the dividing object state $S_3$ is divided into the state $S_3$ after the division in which state the observed value $O_1$ is observed and the state $S_6$ after the division in which state the observed value $O_2$ is observed.

The learning section 21 (FIG. 4) divides the dividing object state $S_3$ into the two states after the division as follows.

The learning section 21 assigns the state $S_3$ after the division that divided the dividing object state $S_3$ one of the plurality of observed values $O_1$ and $O_2$, for example the observed value $O_1$, and sets an observation probability of the observed value $O_1$ assigned to the state $S_3$ after the division being observed in the state $S_3$ after the division to 1.0 and sets observation probabilities of the other observed values being observed to 0.0.

Further, the learning section 21 sets the state transition probabilities $a_{3,j}(U_m)$ of state transitions having the state $S_3$ after the division as a transition source to the state transition probabilities $a_{3,j}(U_m)$ of state transitions having the dividing object state $S_3$ as a transition source, and sets the state transition probabilities of the state transitions having the state $S_3$ after the division as a transition destination to values obtained by correcting the state transition probabilities of the state transitions having the dividing object state $S_3$ as a transition destination by the observation probability in the dividing object state $S_3$ of the observed value assigned to the state $S_3$ after the division.

The learning section 21 similarly sets observation probabilities and state transition probabilities with respect to the other state $S_6$ after the division.

FIG. 33A is a diagram of assistance in explaining the setting of the observation probabilities of the states $S_3$ and $S_6$ after the division.

In FIGS. 33A and 33B, the state $S_3$ after the division, which is one of the two states $S_3$ and $S_6$ after the division obtained by dividing the dividing object state $S_3$, is assigned the observed value $O_1$, which is one of the observed values $O_1$ and $O_2$ observed in the dividing object state $S_3$, and the other state $S_6$ after the division is assigned the other observed value $O_2$.

In this case, as shown in FIG. 33A, the learning section 21 sets an observation probability of the observed value $O_1$ being observed in the state $S_3$ after the division to which the observed value $O_1$ is assigned to 1.0, and sets observation probabilities of other observed values being observed to 0.0.

Further, as shown in FIG. 33A, the learning section 21 sets an observation probability of the observed value $O_2$ being observed in the state $S_6$ after the division to which the observed value $O_2$ is assigned to 1.0, and sets observation probabilities of other observed values being observed to 0.0.

The setting of the observation probabilities as described above is expressed by equation (21).

$$B(S_3, :) = 0.0$$

$$B(S_3, O_1) = 1.0$$

$$B(S_6, :) = 0.0$$

$$B(S_6, O_2) = 1.0 \tag{21}$$

In equation (21), B(,) is a two-dimensional array, and an element B(S, O) of the array represents an observation probability of an observed value O being observed in a state S.

A colon (:) as a suffix of the array represents all elements of a dimension as the colon. Hence, in equation (21), an equation $B(S_3, :)=0.0$ indicates that observation probabilities of respective observed values $O_1$ to $O_k$ being observed in the state $S_3$ are all set to 0.0.

According to equation (21), the observation probabilities of the respective observed values $O_1$ to $O_k$ being observed in the state $S_3$ are all set to 0.0 ($B(S_3, :)=0.0$), and then only the observation probability of the observed value $O_1$ being observed is set to 1.0 ($B(S_3, O_1)=1.0$).

Further, according to equation (21), the observation probabilities of the respective observed values $O_1$ to $O_k$ being observed in the state $S_6$ are all set to 0.0 ($B(S_6, :)=0.0$), and then only the observation probability of the observed value $O_2$ being observed is set to 1.0 ($B(S_6, O_2)=1.0$).

FIG. 33B is a diagram of assistance in explaining the setting of the state transition probabilities of the states $S_3$ and $S_6$ after the division.

State transitions similar to state transitions having the dividing object state $S_3$ as a transition source should be made as state transitions having each of the states $S_3$ and $S_6$ after the division as a transition source.

Accordingly, as shown in FIG. 33B, the learning section 21 sets the state transition probabilities of state transitions having the state $S_3$ after the division as a transition source to the state transition probabilities of state transitions having the dividing object state $S_3$ as a transition source. Further, as shown in FIG. 33B, the learning section 21 also sets the state transition probabilities of state transitions having the state $S_6$ after the division as a transition source to the state transition probabilities of the state transitions having the dividing object state $S_3$ as a transition source.

On the other hand, state transitions such that state transitions having the dividing object state $S_3$ as a transition destination are divided by rates (ratios) of observation probabilities of the respective observed values $O_1$ and $O_2$ being observed in the dividing object state $S_3$ should be made as state transitions having the state $S_3$ after the division to which the observed value $O_1$ is assigned and the state $S_6$ after the division to which the observed value $O_2$ is assigned as a transition destination.

Accordingly, as shown in FIG. 33B, the learning section 21 corrects the state transition probabilities of state transitions having the dividing object state $S_3$ as a transition destination by multiplying the state transition probabilities of the state transitions having the dividing object state $S_3$ as a transition destination by the observation probability in the dividing object state $S_3$ of the observed value $O_1$ assigned to the state $S_3$ after the division, and thereby obtains corrected values resulting from correcting the state transition probabilities by the observation probability of the observed value $O_1$.

The learning section 21 then sets the state transition probabilities of state transitions having the state $S_3$ after the division to which the observed value $O_1$ is assigned as a transition destination to the corrected values resulting from correcting the state transition probabilities by the observation probability of the observed value $O_1$.

Further, as shown in FIG. 33B, the learning section 21 corrects the state transition probabilities of the state transitions having the dividing object state $S_3$ as a transition destination by multiplying the state transition probabilities of the state transitions having the dividing object state $S_3$ as a transition destination by the observation probability in the dividing object state $S_3$ of the observed value $O_2$ assigned to the state $S_6$ after the division, and thereby obtains corrected values resulting from correcting the state transition probabilities by the observation probability of the observed value $O_2$.

The learning section 21 then sets the state transition probabilities of state transitions having the state $S_6$ after the division to which the observed value $O_2$ is assigned as a transition destination to the corrected values resulting from correcting the state transition probabilities by the observation probability of the observed value $O_2$.

The setting of the state transition probabilities as described above is expressed by equation (22).

$$A(S_3,:,:) = A(S_3,:,:)$$
$$A(S_6,:,:) = A(S_3,:,:)$$
$$A(:,S_3,:) = B(S_3, O_1)A(:,S_3,:)$$
$$A(:,S_6,:) = B(S_3, O_2)A(:,S_3,:) \quad (22)$$

In equation (22), A(, ,) is a three-dimensional array, and an element A(S, S', U) of the array indicates a state transition probability of a state transition being made from a state S as a transition source to a state S' when an action U is performed.

As in equation (21), a colon (:) as a suffix of the array represents all elements of a dimension as the colon.

Hence, in equation (22), $A(S_3,:,:)$, for example, denotes all state transition probabilities of state transitions from a state $S_3$ as a transition source to each state S when each action is performed. In equation (22), $A(:,S_3,:)$, for example, denotes all state transition probabilities of state transitions from each state to a state $S_3$ as a transition destination when each action is performed.

According to equation (22), with respect to all actions, the state transition probabilities of state transitions having the state $S_3$ after the division as a transition source are set to the state transition probabilities of state transitions having the dividing object state $S_3$ as a transition source ($A(S_3,:,:)=A(S_3,:,:)$).

In addition, with respect to all the actions, the state transition probabilities of state transitions having the state $S_6$ after the division as a transition source are set to the state transition probabilities of the state transitions having the dividing object state $S_3$ as a transition source ($A(S_6,:,:)=A(S_3,:,:)$).

Further, according to equation (22), with respect to all the actions, the state transition probabilities $A(:, S_3, :)$ of state transitions having the dividing object state $S_3$ as a transition destination are multiplied by the observation probability $B(S_3, O_1)$ in the dividing object state $S_3$ of the observed value $O_1$ assigned to the state $S_3$ after the division, whereby corrected values $B(S_3, O_1)A(:, S_3, :)$ resulting from the correction of the state transition probabilities $A(:, S_3, :)$ of the state transitions having the dividing object state $S_3$ as a transition destination are obtained.

Then, with respect to all the actions, the state transition probabilities $A(:, S_3, :)$ of state transitions having the state $S_3$ after the division to which the observed value $O_1$ is assigned as a transition destination are set to the corrected values $B(S_3, O_1)A(:, S_3, :)$ ($A(:, S_3, :)=B(S_3, O_1)A(:, S_3, :)$).

In addition, according to equation (22), with respect to all the actions, the state transition probabilities $A(:, S_3, :)$ of the state transitions having the dividing object state $S_3$ as a transition destination are multiplied by the observation probability $B(S_3, O_2)$ in the dividing object state $S_3$ of the observed value $O_2$ assigned to the state $S_6$ after the division, whereby corrected values $B(S_3, O_2)A(:, S_3, :)$ resulting from the correction of the state transition probabilities $A(:, S_3, :)$ of the state transitions having the dividing object state $S_3$ as a transition destination are obtained.

Then, with respect to all the actions, the state transition probabilities $A(:, S_6, :)$ of state transitions having the state $S_6$ after the division to which the observed value $O_2$ is assigned as a transition destination are set to the corrected values $B(S_3, O_2)A(:, S_3, :)$ ($A(:, S_6, :)=B(S_3, O_2)A(:, S_3, :)$).

[State Merge]

Figure 34A:
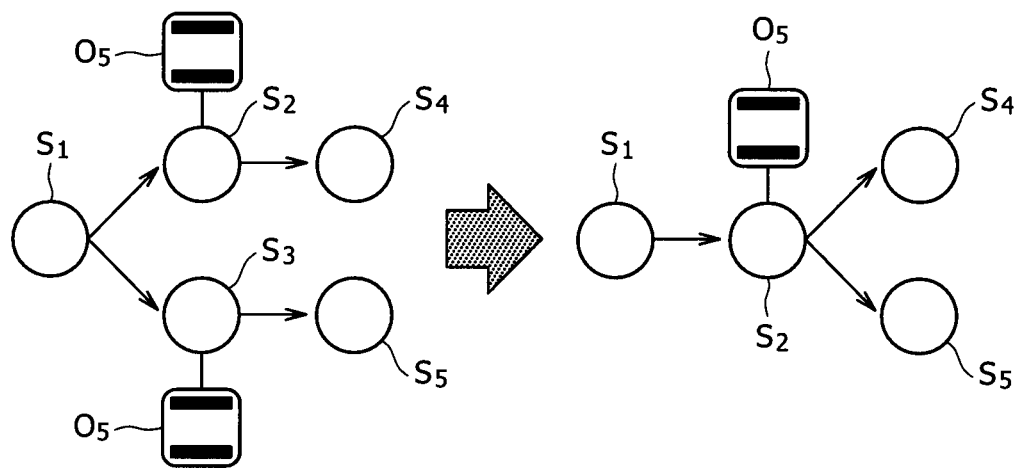
FIGS. 34A and 34B are diagrams of assistance in explaining an outline of a state merge for implementing the one-state one-observed-value constraint.
Figure 34B:
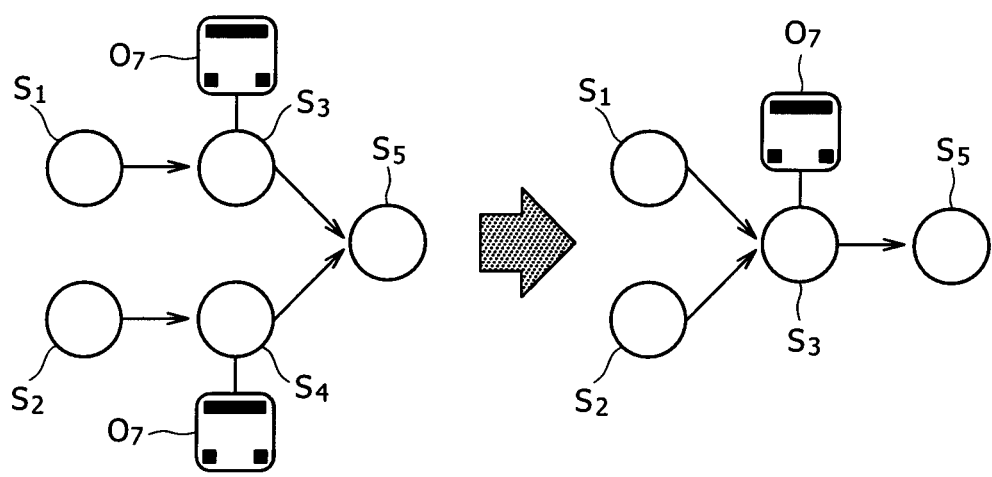

FIGS. 34A and 34B are diagrams of assistance in explaining an outline of a state merge for implementing the one-state one-observed-value constraint.

In the state merge, in the extended HMM whose model parameters are converged by the Baum-Welch re-estimation method, when there are a plurality of states (different states) as states of transition destinations of state transitions having one state as a transition source at the time of a certain action being performed, and an identical observed value is observed in each of the plurality of states, the plurality of states in which the identical observed value is observed are merged into one state.

Further, in the state merge, in the extended HMM whose model parameters are converged, when there are a plurality of states as states of transition sources of state transitions having one state as a transition destination at the time of a certain action being performed, and an identical observed value is observed in each of the plurality of states, the plurality of states in which the identical observed value is observed are merged into one state.

That is, in the state merge, in the extended HMM whose model parameters are converged, when state transitions having an identical state as a transition source or a transition destination occur with respect to each action, and there are a plurality of states in which an identical observed value is observed, such a plurality of states are redundant, and are thus merged into one state.

In this case, the state merge includes a forward merge that merges a plurality of states as transition destinations when the plurality of states are present as states of the transition destinations of state transitions from one state at the time of a certain action being performed and a backward merge that merges a plurality of states as transition sources when the plurality of states are present as states of the transition sources of state transitions to one state at the time of a certain action being performed.

FIG. 34A shows an example of a forward merge.

In FIG. 34A, the extended HMM has states $S_1$ to $S_5$, and state transitions from the state $S_1$ to the states $S_2$ and $S_3$, a state transition from the state $S_2$ to the state $S_4$, and a state transition from the state $S_3$ to the state $S_5$ are possible.

Each of the state transitions from the state $S_1$ to the plurality of states $S_2$ and $S_3$ as transition destinations, that is, the state transition from the state $S_1$ to the state $S_2$ as a transition destination and the state transition from the state $S_1$ to the state $S_3$ as a transition destination is made when an identical action is performed in the state $S_1$.

Further, an identical observed value $O_5$ is observed in the state $S_2$ and the state $S_3$.

In this case, the learning section 21 (FIG. 4) sets the plurality of states $S_2$ and $S_3$ that are the transition destinations of the state transitions from one state $S_1$ which state transitions are effected by the identical action and in which states the identical observed value $O_5$ is observed as merging object states to be merged, and merges the merging object states $S_2$ and $S_3$ into one state.

The one state obtained by merging the plurality of merging object states will hereinafter be referred to also as a representative state. In FIG. 34A, the two merging object states $S_2$ and $S_3$ are merged into one representative state $S_2$.

A plurality of state transitions that can occur from a certain state to states in which an identical observed value is observed when a certain action is performed appear to be branches from the one transition source state to the plurality of transition destination states. Therefore such state transitions will be referred to as branches in a forward direction. In FIG. 34A, the state transition from the state $S_1$ to the state $S_2$ and the state transition from the state $S_1$ to the state $S_3$ are branches in the forward direction.

Incidentally, in the case of the branches in the forward direction, a state as a branch source is the state $S_1$ as the transition source, and states as branch destinations are the states $S_2$ and $S_3$ as the transition destinations in which the identical observed value is observed. The branch destination states $S_2$ and $S_3$, which are also the transition destination states, are the merging object states.

FIG. 34B shows an example of a backward merge.

In FIG. 34B, the extended HMM has states $S_1$ to $S_5$, and a state transition from the state $S_1$ to the state $S_3$, a state transition from the state $S_2$ to the state $S_4$, a state transition from the state $S_3$ to the state $S_5$, and a state transition from the state $S_4$ to the state $S_5$ are possible.

Each of the state transitions from the plurality of states $S_3$ and $S_4$ as transition sources to the state $S_5$, that is, the state transition from the state $S_3$ as a transition source to the state $S_5$ and the state transition from the state $S_4$ as a transition source to the state $S_5$ is made when an identical action is performed in the states $S_3$ and $S_4$.

Further, an identical observed value $O_7$ is observed in the state $S_3$ and the state $S_4$.

In this case, the learning section 21 (FIG. 4) sets the plurality of states $S_3$ and $S_4$ that are the transition sources of the state transitions to one state $S_5$ which state transitions are effected by the identical action and in which states the identical observed value $O_7$ is observed as merging object states, and merges the merging object states $S_3$ and $S_4$ into a representative state as one state.

In FIG. 34B, the state $S_3$ as one of the two merging object states $S_3$ and $S_4$ is the representative state.

State transitions from a plurality of states in which an identical observed value is observed to a certain state as a transition destination when a certain action is performed appear to be branches from the one transition destination state to the plurality of transition source states. Therefore such state transitions will be referred to as branches in a backward direction. In FIG. 34B, the state transition from the state $S_3$ to the state $S_5$ and the state transition from the state $S_4$ to the state $S_5$ are branches in the backward direction.

Incidentally, in the case of the branches in the backward direction, a state as a branch source is the state $S_5$ as the transition destination, and states as branch destinations are the states $S_3$ and $S_4$ as the transition sources in which the identical observed value is observed. The branch destination states $S_3$ and $S_4$, which are also the transition source states, are the merging object states.

In the state merge, the learning section 21 (FIG. 4) first detects a plurality of states that are branch destination states in the extended HMM after learning (immediately after the model parameters have converged) as merging object states.

FIGS. 35A and 35B are diagrams of assistance in explaining a method of detecting merging object states.

When there are a plurality of states as states of the extended HMM which states are transition sources or transition destinations of state transitions when a predetermined action is performed, and observed values observed in the plurality of respective states and having a maximum observation probability coincide with each other, the learning section 21 detects the plurality of states as merging object states.

FIG. 35A represents a method of detecting a plurality of states that are branch destinations of branches in the forward direction as merging object states.

Specifically, FIG. 35A shows a state transition probability plane A with respect to a certain action $U_m$ and an observation probability matrix B.

In the state transition probability plane A with respect to each action $U_m$, state transition probabilities are normalized such that with respect to each state $S_i$, a sum total of state transition probabilities $a_{ij}(U_m)$ having the state $S_i$ as a transition source (sum total of $a_{ij}(U_m)$ taken while a suffix j is changed from 1 to N with suffixes i and m fixed) is 1.0.

Hence, a maximum value of state transition probabilities having a certain state $S_i$ as a transition source with respect to a certain action $U_m$ (state transition probabilities arranged in a certain row i in a horizontal direction in the state transition probability plane A with respect to the action $U_m$) when there are no branches in the forward direction with the state $S_i$ as a branch source is 1.0 (a value that can be assumed to be 1.0), and the state transition probabilities other than the maximum value are 0.0 (a value that can be assumed to be 0.0).

On the other hand, a maximum value of state transition probabilities having a certain state $S_i$ as a transition source with respect to a certain action $U_m$ when there are branches in the forward direction with the state $S_i$ as a branch source is sufficiently smaller than 1.0, such as 0.5 shown in FIG. 35A, for example, and is larger than a value (average value) 1/N obtained by equally dividing the state transition probabilities whose sum total is 1.0 by the number N of states $S_1$ to $S_N$.

Accordingly, a state as a branch source of branches in the forward direction can be detected by searching for a state $S_i$ such that a maximum value of state transition probabilities $a_{ij}(U_m)$ $(=A_{ijm})$ in a row i in the state transition probability plane with respect to an action $U_m$ is smaller than a threshold value $a_{max\_th}$ which is smaller than 1.0, and is larger than the average value 1/N, according to equation (19) as in the case of detecting a state of branch structure as described above.

Incidentally, in this case, the threshold value $a_{max\_th}$ in equation (19) can be adjusted in a range $1/N < a_{max\_th} < 1.0$ according to a degree of sensitivity to detect a state as a branch source of branches in the forward direction. The closer the threshold value $a_{max\_th}$ is brought to 1.0, the more sensitively a state as a branch source can be detected.

When detecting a state as a branch source of branches in the forward direction (which state will hereinafter be referred to also as a branch source state) as described above, the learning section 21 (FIG. 4) detects a plurality of states as branch destinations of the branches in the forward direction from the branch source state.

That is, the learning section 21 detects a plurality of states as branch destinations of the branches in the forward direction from the branch source state when the suffix m of an action $U_m$ is U and the suffix i of the branch source state $S_i$ of the branches in the forward direction is S according to equation (23).

$$\underset{j,i=S,m=U}{\arg \text{find}} (a_{min\_th1} < A_{ijm}) \quad (23)$$

In equation (23), $A_{ijm}$ denotes a state transition probability $a_{ij}(U_m)$ in an ith position from the top in an i-axis direction, a jth position from the left in a j-axis direction, and an mth position from the front in an action axis direction in the three-dimensional state transition probability table.

In addition, in equation (23), argfind($a_{min\_th1} < A_{ijm}$) denotes the suffix j of all state transition probabilities $A_{S,j,U}$ satisfying a conditional expression $a_{min\_th1} < A_{ijm}$ in parentheses when the state transition probabilities $A_{S,j,U}$ satisfying the conditional expression $a_{min\_th1} < A_{ijm}$ in the parentheses can be retrieved (found) in a case of the suffix m of an action $U_m$ being U and the suffix i of the branch source state $S_i$ being S.

Incidentally, the threshold value $a_{min\_th1}$ in equation (23) can be adjusted in a range $0.0 < a_{min\_th1} < 1.0$ according to a degree of sensitivity to detect a plurality of states as branch destinations of branches in the forward direction. The closer the threshold value $a_{min\_th1}$ is brought to 1.0, the more sensitively a plurality of states as branch destinations of branches in the forward direction can be detected.

The learning section 21 (FIG. 4) detects a state $S_j$ whose suffix is j when a state transition probability $A_{ijm}$ satisfying the conditional expression $a_{min\_th1} < A_{ijm}$ in the parentheses in equation (23) can be retrieved (found), as a candidate for a state as a branch destination of a branch in the forward direction (which state will hereinafter be referred to also as a branch destination state).

Thereafter, when a plurality of states are detected as candidates for branch destination states of branches in the forward direction, the learning section 21 determines whether observed values observed in the plurality of respective candidates for branch destination states and having a maximum observation probability coincide with each other.

The learning section 21 then detects candidates whose observed values having a maximum observation probability coincide with each other among the plurality of candidates for branch destination states as branch destination states of branches in the forward direction.

Specifically, the learning section 21 obtains an observed value $O_{max}$ having a maximum observation probability with respect to each of the plurality of candidates for branch destination states according to equation (24).

$$O_{max} = \underset{k,j=S}{\arg \max} (B_{ik}) \quad (24)$$

In equation (24), $B_{ik}$ denotes an observation probability $b_i(O_k)$ of an observed value $O_k$ being observed in a state $S_i$.

In equation (24), argmax($B_{ik}$) denotes the suffix k of a maximum observation probability $B_{S,K}$ of a state whose suffix is S in the observation probability matrix B.

When the suffixes k of maximum observation probabilities $B_{S,K}$ obtained in equation (24) with respect to the suffix i of each of a plurality of states $S_i$ as a plurality of candidates for branch destination states coincide with each other, the learning section 21 detects the candidates whose suffixes k obtained in equation (24) coincide with each other among the plurality of candidates for branch destination states as branch destination states of branches in the forward direction.

In FIG. 35A, the state $S_3$ is detected as a branch source state of branches in the forward direction, and the states $S_1$ and $S_4$ whose state transition probabilities of state transitions from the branch source state $S_3$ are both 0.5 are detected as candidates for branch destination states of the branches in the forward direction.

With respect to the states $S_1$ and $S_4$ as candidates for branch destination states of the branches in the forward direction, the observed value $O_2$ observed in the state $S_1$ and having a maximum observation probability of 1.0 and the observed value $O_2$ observed in the state $S_4$ and having a maximum observation probability of 0.9 coincide with each other. The states $S_1$ and $S_4$ are therefore detected as branch destination states of the branches in the forward direction.

FIG. 35B represents a method of detecting a plurality of states that are branch destinations of branches in the backward direction as merging object states.

Specifically, FIG. 35B shows a state transition probability plane A with respect to a certain action $U_m$ and an observation probability matrix B.

In the state transition probability plane A with respect to each action $U_m$, state transition probabilities are normalized such that with respect to each state $S_i$, a sum total of state transition probabilities $a_{ij}(U_m)$ having the state $S_i$ as a transition source is 1.0, as described with reference to FIG. 35A. However, normalization such that a sum total of state transition probabilities $a_{ij}(U_m)$ having a state $S_j$ as a transition destination (sum total of $a_{ij}(U_m)$ taken while a suffix i is changed from 1 to N with suffixes j and m fixed) is 1.0 is not performed.

However, when there is a possibility of a state transition from the state $S_i$ to the state $S_j$ being made, a state transition probability $a_{ij}(U_m)$ having the state $S_j$ as a transition destination is a positive value other than 0.0 (a value that can be assumed to be 0.0).

Hence, a branch source state (a state that can be a branch source state) of branches in the backward direction and candidates for branch destination states can be detected according to equation (25).

$$\underset{i,j=S,m=U}{\arg \text{find}} (a_{min\_th2} < A_{ijm}) \quad (25)$$

In equation (25), $A_{ijm}$ denotes a state transition probability $a_{ij}(U_m)$ in an ith position from the top in an i-axis direction, a jth position from the left in a j-axis direction, and an mth position from the front in an action axis direction in the three-dimensional state transition probability table.

In addition, in equation (25), argfind($a_{min\_th2} < A_{ijm}$) denotes the suffix i of all state transition probabilities $A_{i,S,U}$ satisfying a conditional expression $a_{min\_th2} < A_{ijm}$ in parentheses when the state transition probabilities $A_{i,S,U}$ satisfying the conditional expression $a_{min\_th2} < A_{ijm}$ in the parentheses can be retrieved (found) in a case of the suffix m of an action $U_m$ being U and the suffix j of the branch destination state $S_j$ being S.

Incidentally, the threshold value $a_{min\_th2}$ in equation (25) can be adjusted in a range $0.0 < a_{min\_th2} < 1.0$ according to a degree of sensitivity to detect a branch source state and branch destination states (candidates for branch destination states) of branches in the backward direction. The closer the threshold value $a_{min\_th2}$ is brought to 1.0, the more sensitively a branch source state and branch destination states of branches in the backward direction can be detected.

The learning section 21 (FIG. 4) detects a state having a suffix j being S as a branch source state (as a state possible to be a branch source state) of branches in the backward direction when the plurality of state transition probabilities $A_{ijm}$ satisfying the conditional expression $a_{min\_th2} < A_{ijm}$ in the parentheses in equation (25) can be retrieved (found).

The learning section 21 further detects, as candidates for branch destination states, a plurality of branch source states of state transitions corresponding to a plurality of state transition probabilities $A_{ijm}$ satisfying the conditional expression $a_{min\_th2} < A_{ijm}$ in the parentheses in equation (25) when the plurality of state transition probabilities $A_{ijm}$ satisfying the conditional expression $a_{min\_th2} < A_{ijm}$ in the parentheses in equation (25) can be retrieved, that is, a plurality of states $S_i$ having i of each of a plurality of state transition probabilities $A_{i,S,U}$ satisfying the conditional expression $a_{min\_th2} < A_{ijm}$ in the parentheses (a plurality of i's indicated by equation (25)) as a suffix when the plurality of state transition probabilities $A_{i,S,U}$ satisfying the conditional expression $a_{min\_th2} < A_{ijm}$ can be retrieved.

Thereafter, the learning section 21 determines whether observed values observed in the plurality of respective candidates for branch destination states of branches in the backward direction and having a maximum observation probability coincide with each other.

Then, as in the case of detecting branch destination states of branches in the forward direction, the learning section 21 detects candidates whose observed values having a maximum observation probability coincide with each other among the plurality of candidates for branch destination states as branch destination states of branches in the backward direction.

In FIG. 35B, the state $S_2$ is detected as a branch source state of branches in the backward direction, and the states $S_2$ and $S_5$ whose state transition probabilities of state transitions to the branch source state $S_2$ are both 0.5 are detected as candidates for branch destination states of the branches in the backward direction.

With respect to the states $S_2$ and $S_5$ as candidates for branch destination states of the branches in the backward direction, the observed value $O_3$ observed in the state $S_2$ and having a maximum observation probability of 1.0 and the observed value $O_3$ observed in the state $S_5$ and having a maximum observation probability of 0.8 coincide with each other. The states $S_2$ and $S_5$ are therefore detected as branch destination states of the branches in the backward direction.

When the learning section 21 detects a branch source state of branches in the forward direction and the backward direction and a plurality of branch destination states branching from the branch source state as described above, the learning section 21 merges the plurality of branch destination states into one representative state.

In this case, the learning section 21 for example sets a branch destination state having a minimum suffix among the plurality of branch destination states as a representative state, and merges the plurality of branch destination states into the representative state.

That is, for example, when three states are detected as a plurality of branch destination states branching from a certain branch source state, the learning section 21 sets a branch destination state having a minimum suffix among the plurality of branch destination states as a representative state, and merges the plurality of branch destination states into the representative state.

In addition, the learning section 21 makes the other two states not set as the representative state among the three branch destination states invalid states.

Incidentally, a representative state in the state merge can be selected from invalid states rather than branch destination states. In this case, after the plurality of branch destination states are merged into the representative state, the plurality of branch destination states are all made to be an invalid state.

Figure 36A:
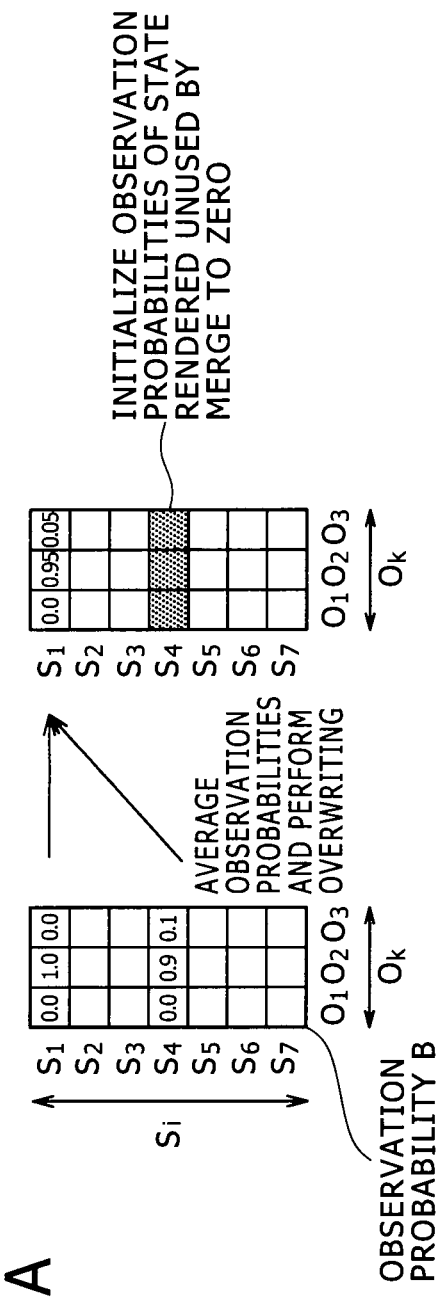
FIGS. 36A and 36B are diagrams of assistance in explaining a method of merging a plurality of branch destination states into one representative state.
Figure 36B:
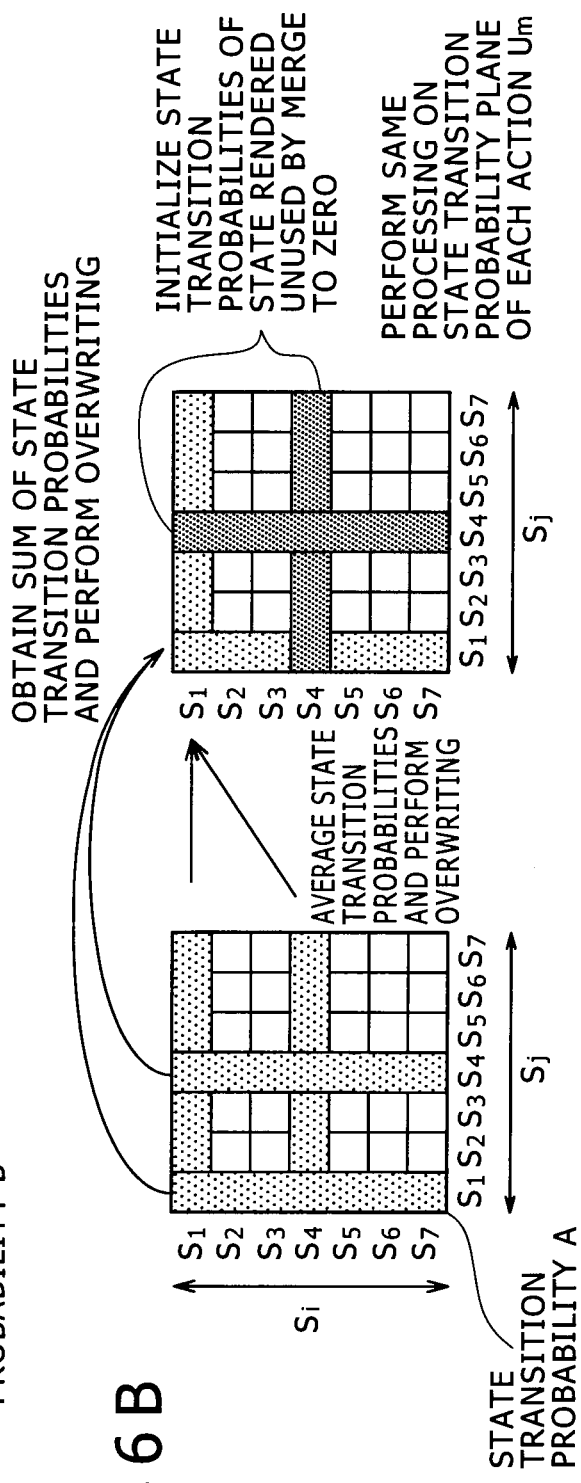

FIGS. 36A and 36B are diagrams of assistance in explaining a method of merging a plurality of branch destination states branching from a certain branch source state into one representative state.

In FIGS. 36A and 36B, the extended HMM has seven states $S_1$ to $S_7$.

Further, in FIGS. 36A and 36B, two states $S_1$ and $S_4$ are set as merging object states, the state $S_1$ having a minimum suffix of the two merging object states $S_1$ and $S_4$ is set as a representative state, and the two merging object states $S_1$ and $S_4$ are merged into one representative state $S_1$.

The learning section 21 (FIG. 4) merges the two merging object states $S_1$ and $S_4$ into one representative state $S_1$ as follows.

The learning section 21 sets observation probabilities $b_1(O_k)$ of respective observed values $O_k$ being observed in the representative state $S_1$ to average values of observation probabilities $b_1(O_k)$ and $b_4(O_k)$ of the respective observed values $O_k$ being observed in each of the plurality of states $S_1$ and $S_4$ as merging object states, and sets observation probabilities $b_4(O_k)$ of the respective observed values $O_k$ being observed in the state $S_4$ other than the representative state $S_1$ of the plurality of states $S_1$ and $S_4$ as merging object states to zero.

In addition, the learning section 21 sets state transition probabilities $a_{1,j}(U_m)$ of state transitions having the representative state $S_1$ as a transition source to average values of state transition probabilities $a_{1,j}(U_m)$ and $a_{4,j}(U_m)$ of state transitions having each of the plurality of states $S_1$ and $S_4$ that are merging object states as a transition source, and sets state transition probabilities $a_{i,1}(U_m)$ of state transitions having the representative state $S_1$ as a transition destination to sums of state transition probabilities $a_{i,1}(U_m)$ and $a_{i,4}(U_m)$ of state transitions having each of the plurality of states $S_1$ and $S_4$ that are merging object states as a transition destination.

Further, the learning section 21 sets state transition probabilities $a_{4j}(U_m)$ of state transitions having the state $S_4$ other than the representative state $S_1$ of the plurality of states $S_1$ and $S_4$ that are merging object states as a transition source and state transition probabilities $a_{i,4}(U_m)$ of state transitions having the state $S_4$ as a transition destination to zero.

FIG. 36A is a diagram of assistance in explaining the setting of observation probabilities which setting is made in the state merge.

The learning section 21 sets an observation probability $b_1(O_1)$ of an observed value $O_1$ being observed in the representative state $S_1$ to an average value $(b_1(O_1) + b_4(O_1))/2$ of observation probabilities $b_1(O_1)$ and $b_4(O_1)$ of the observed value $O_1$ being observed in the merging object states $S_1$ and $S_4$.

The observation probabilities $b_1(O_k)$ of the other observed values $O_k$ being observed in the representative state $S_1$ are similarly set.

Further, the learning section 21 sets the observation probabilities $b_4(O_k)$ of the respective observed values $O_k$ being observed in the state $S_4$ other than the representative state $S_1$ of the merging object states $S_1$ and $S_4$ to zero.

The setting of the observation probabilities as described above is expressed by equation (26).

$$B(S_1, :) = (B(S_1, :) + B(S_4, :))/2$$

$$B(S_4, :) = 0.0 \quad (26)$$

In equation (26), B(,) is a two-dimensional array, and an element B(S, O) of the array represents an observation probability of an observed value O being observed in a state S.

A colon (:) as a suffix of an array represents all elements of a dimension as the colon. Hence, in equation (26), an equation $B(S_4, :) = 0.0$ indicates that observation probabilities of the respective observed values being observed in the state $S_4$ are all set to 0.0.

According to equation (26), the observation probabilities of the respective observed values $O_k$ being observed in the representative state $S_1$ are set to average values of the observation probabilities $b_1(O_k)$ and $b_4(O_k)$ of the respective observed values $O_k$ being observed in each of the merging object states $S_1$ and $S_4(B(S_1, :) = (B(S_1, :) + B(S_4, :))/2)$.

Further, according to equation (26), the observation probabilities $b_4(O_k)$ of the respective observed values $O_k$ being observed in the state $S_4$ other than the representative state $S_1$ of the merging object states $S_1$ and $S_4$ are set to zero (B $(S_4, :) = 0.0$).

FIG. 36B is a diagram of assistance in explaining the setting of state transition probabilities which setting is made in the state merge.

State transitions having each of a plurality of states that are merging object states as a transition source do not necessarily coincide with each other. State transitions having each of a plurality of states that are merging object states as a transition source should be possible as state transitions having a representative state obtained by merging the merging object states as a transition source.

Accordingly, as shown in FIG. 36B, the learning section 21 sets the state transition probabilities $a_{1,j}(U_m)$ of state transitions having the representative state $S_1$ as a transition source to average values of the state transition probabilities $a_{1,j}(U_m)$ and $a_{4,j}(U_m)$ of state transitions having each of the plurality of merging object states $S_1$ and $S_4$ as a transition source.

State transitions having each of a plurality of states that are merging object states as a transition destination do not necessarily coincide with each other, either. State transitions having each of a plurality of states that are merging object states as a transition destination should be possible as state transitions having a representative state obtained by merging the merging object states as a transition destination.

Accordingly, as shown in FIG. 36B, the learning section 21 sets the state transition probabilities $a_{i,1}(U_m)$ of state transitions having the representative state $S_1$ as a transition destination to sums of the state transition probabilities $a_{i,1}(U_m)$ and $a_{i,4}(U_m)$ of state transitions having each of the plurality of merging object states $S_1$ and $S_4$ as a transition destination.

Incidentally, whereas the average values of the state transition probabilities $a_{1,j}(U_m)$ and $a_{4,j}(U_m)$ of the state transitions having the merging object states $S_1$ and $S_4$ as a transition source are adopted as the state transition probabilities $a_{1,j}(U_m)$ of the state transitions having the representative state $S_1$ as a transition source, the sums of the state transition probabilities $a_{i,1}(U_m)$ and $a_{i,4}(U_m)$ of the state transitions having the merging object states $S_1$ and $S_4$ as a transition destination are adopted as the state transition probabilities $a_{i,1}(U_m)$ of the state transitions having the representative state $S_1$ as a transition destination because in the state transition probability plane A with respect to each action $U_m$, whereas the state transition probabilities $a_{i,j}(U_m)$ are normalized such that a sum total of state transition probabilities $a_{i,j}(U_m)$ having a state $S_i$ as a transition source is 1.0, normalization such that a sum total of state transition probabilities $a_{i,j}(U_m)$ having a state $S_j$ as a transition destination is 1.0 is not performed.

In addition to the setting of the state transition probabilities having the representative state $S_1$ as a transition source and the state transition probabilities having the representative state $S_1$ as a transition destination, the learning section 21 sets the state transition probabilities having the merging object state $S_4$ (merging object state other than the representative state $S_1$) as a transition source and the state transition probabilities having the merging object state $S_4$ as a transition destination, the merging object state $S_4$ being rendered unnecessary for the expression of the structure of the action environment by merging the merging object states $S_1$ and $S_4$ into the representative state $S_1$, to zero.

The setting of the state transition probabilities as described above is expressed by equation (27).

$$A(S_1, :, :) = (A(S_1, :, :) + A(S_4, :, :))/2$$

$$A(:, S_1, :) = A(:, S_1, :) + A(:, S_4, :)$$

$$A(S_4, :, :) = 0.0$$

$$A(:, S_4, :) = 0.0 \quad (27)$$

In equation (27), A(,) is a three-dimensional array, and an element A(S, S', U) of the array indicates a state transition probability of a state transition being made from a state S as a transition source to a state S' when an action U is performed.

As in equation (26), a colon (:) as a suffix of an array represents all elements of a dimension as the colon.

Hence, in equation (27), $A(S_1, :)$, for example, denotes all state transition probabilities of state transitions from a state $S_1$ as a transition source to each state when each action is performed. In equation (27), $A(:, S_1, :)$, for example, denotes all state transition probabilities of state transitions from each state to a state $S_1$ as a transition destination when each action is performed.

According to equation (27), with respect to all actions, the state transition probabilities of state transitions having the representative state $S_1$ as a transition source are set to the average values of the state transition probabilities $a_{1, j}(U_m)$ and $a_{4, j}(U_m)$ of state transitions having the merging object states $S_1$ and $S_4$ as a transition source $(A(S_1, :, :) = (A(S_1, :, :) + A(S_4, :, :))/2)$.

In addition, with respect to all the actions, the state transition probabilities of state transitions having the representative state $S_1$ as a transition destination are set to sums of the state transition probabilities $a_{i, 1}(U_m)$ and $a_{i, 4}(U_m)$ of state transitions having the merging object states $S_1$ and $S_4$ as a transition destination $(A(:, S_1, :) = A(:, S_1, :) + A(:, S_4, :))$.

Further, according to equation (27), with respect to all the actions, the state transition probabilities having the merging object state $S_4$ as a transition source and the state transition probabilities having the merging object state $S_4$ as a transition destination, the merging object state $S_4$ being rendered unnecessary for the expression of the structure of the action environment by merging the merging object states $S_1$ and $S_4$ into the representative state $S_1$, are set to zero $(A(S_4, :, :) = 0.0, A(:, S_4, :) = 0.0)$.

As described above, the state transition probabilities having the merging object state $S_4$ as a transition source and the state transition probabilities having the merging object state $S_4$ as a transition destination, the merging object state $S_4$ being rendered unnecessary for the expression of the structure of the action environment by merging the merging object states $S_1$ and $S_4$ into the representative state $S_1$, are set to 0.0, and the observation probabilities of each observed value being observed in the merging object state $S_4$ rendered unnecessary are set to 0.0. The merging object state $S_4$ rendered unnecessary thereby becomes an invalid state.

[Learning of Extended HMM under One-State One-Observed Value Constraint]

Figure 37:
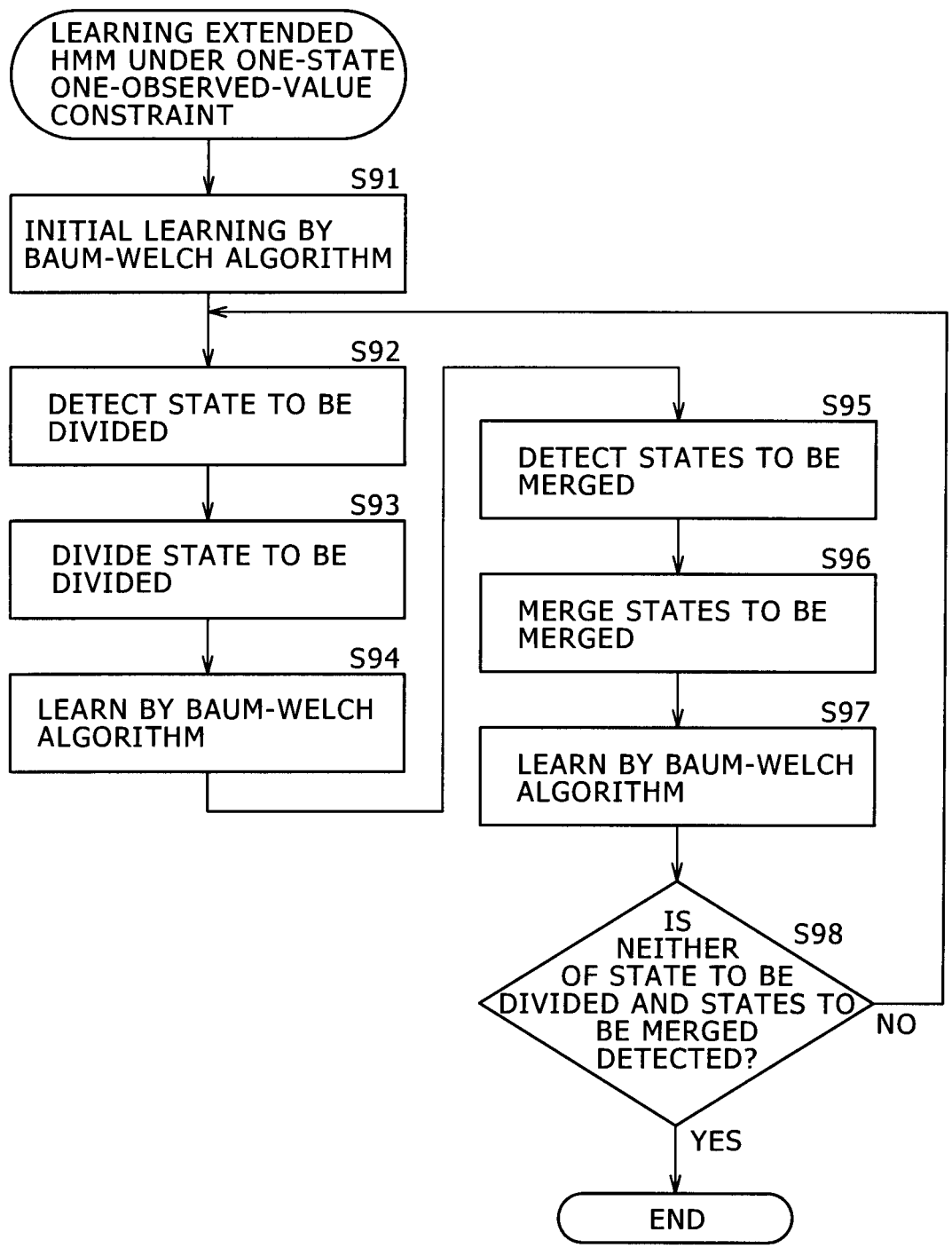
FIG. 37 is a flowchart of assistance in explaining a process of learning the extended HMM which process is performed under the one-state one-observed-value constraint.

FIG. 37 is a flowchart of assistance in explaining a process of learning the extended HMM which process is performed by the learning section 21 in FIG. 4 under the one-state one-observed-value constraint.

In step S91, the learning section 21 performs initial learning of the extended HMM, that is, a process similar to steps S21 to S24 in FIG. 7 according to the Baum-Welch re-estimation method using an observed value series and an action series as learning data stored in the history storing section 14.

After the model parameters have converged in the initial learning in step S91, the learning section 21 stores the model parameters of the extended HMM in the model storing section 22 (FIG. 4). The process then proceeds to step S92.

In step S92, the learning section 21 detects a dividing object state from the extended HMM stored in the model storing section 22. The process then proceeds to step S93.

When the learning section 21 cannot detect a dividing object state in step S92, that is, when there is no dividing object state in the extended HMM stored in the model storing section 22, the process skips steps S93 and S94, and proceeds to step S95.

In step S93, the learning section 21 performs a state division that divides the dividing object state detected in step S92 into a plurality of states after the division. The process then proceeds to step S94.

In step S94, the learning section 21 performs learning of the extended HMM that is stored in the model storing section 22 and in which the state division has been performed in immediately preceding step S93, that is, a process similar to steps S22 to S24 in FIG. 7 according to the Baum-Welch re-estimation method using the observed value series and the action series as learning data stored in the history storing section 14.

Incidentally, in the learning in step S94 (also in step S97 to be described later), the model parameters of the extended HMM stored in the model storing section 22 are used as initial values of the model parameters as they are.

After the model parameters of the extended HMM have converged in the learning in step S94, the learning section 21 stores (overwrites) the model parameters of the extended HMM in the model storing section 22 (FIG. 4). The process then proceeds to step S95.

In step S95, the learning section 21 detects merging object states from the extended HMM stored in the model storing section 22. The process then proceeds to step S96.

When the learning section 21 cannot detect merging object states in step S95, that is, when there are no merging object states in the extended HMM stored in the model storing section 22, the process skips steps S96 and S97, and proceeds to step S98.

In step S96, the learning section 21 performs a state merge that merges the merging object states detected in step S95 into a representative state. The process then proceeds to step S97.

In step S97, the learning section 21 performs learning of the extended HMM that is stored in the model storing section 22 and in which the state merge has been performed in immediately preceding step S96, that is, a process similar to steps S22 to S24 in FIG. 7 according to the Baum-Welch re-estimation method using the observed value series and the action series as learning data stored in the history storing section 14.

After the model parameters of the extended HMM have converged in the learning in step S97, the learning section 21 stores (overwrites) the model parameters of the extended HMM in the model storing section 22 (FIG. 4). The process then proceeds to step S98.

In step S98, the learning section 21 determines whether no dividing object state is detected in the process of detecting a dividing object state in step S92 and no merging object states are detected in the process of detecting merging object states in step S95.

When it is determined in step S98 that at least one of a dividing object state and merging object states is detected, the process returns to step S92 to repeat a similar process from step S92 on down.

When it is determined in step S98 that neither of a dividing object state and merging object states is detected, the process of learning the extended HMM is ended.

By repeating the state division, the learning of the extended HMM after the state division, the state merge, and the learning of the extended HMM after the state merge as described above until neither of a dividing object state and merging object states is detected, learning satisfying the one-state one-observed-value constraint is performed, and the extended HMM in which (only) one observed value is observed in one state can be obtained.

Figure 38:
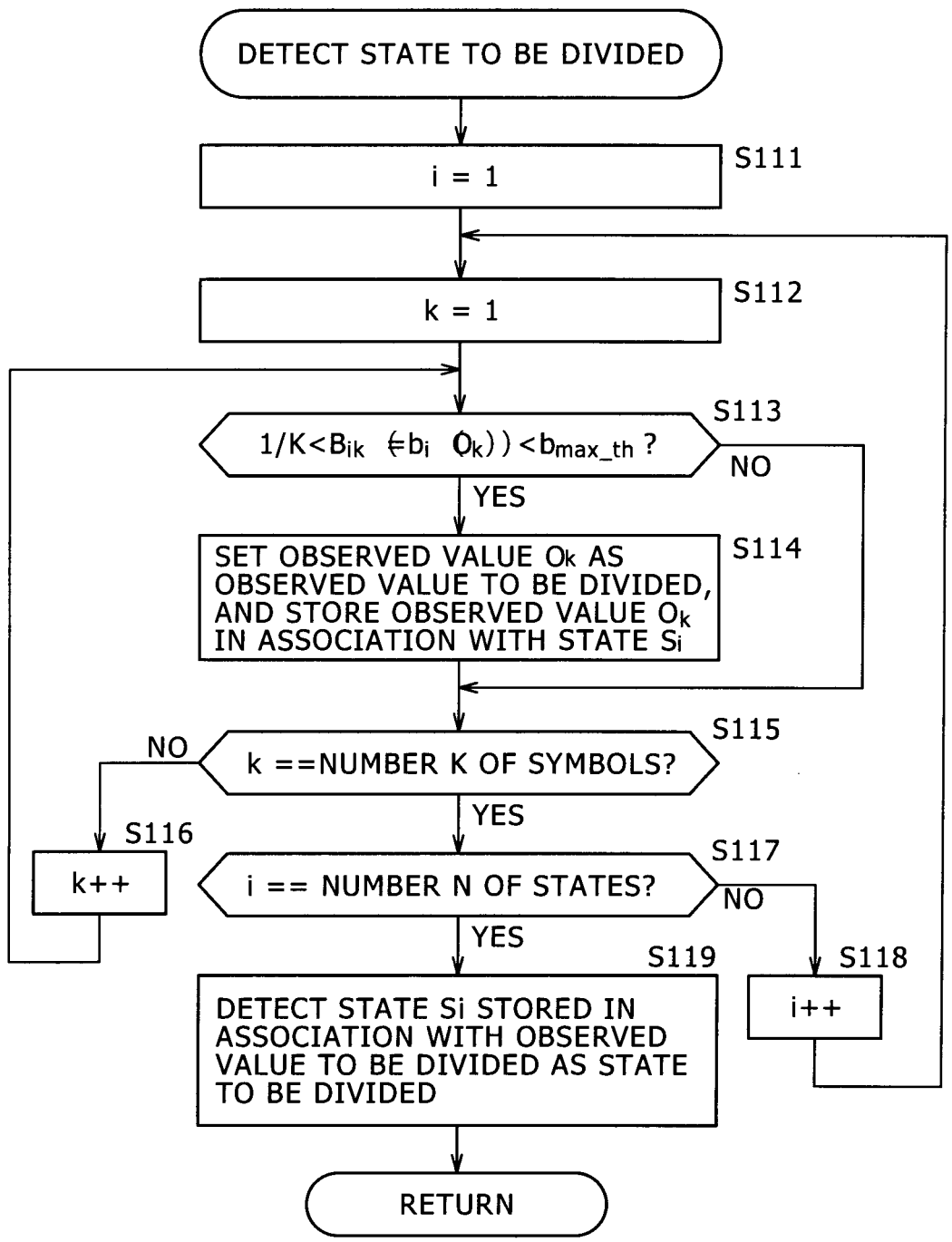
FIG. 38 is a flowchart of assistance in explaining a process of detecting a dividing object state.

FIG. 38 is a flowchart of assistance in explaining the process of detecting a dividing object state which process is performed by the learning section 21 in FIG. 4 in step S92 in FIG. 37.

In step S111, the learning section 21 initializes a variable i indicating the suffix of a state $S_i$ to one, for example. The process then proceeds to step S112.

In step S112, the learning section 21 initializes a variable k indicating the suffix of an observed value $O_k$ to one, for example. The process then proceeds to step S113.

In step S113, the learning section 21 determines whether an observation probability $B_{ik}=b_i(O_k)$ of an observed value $O_k$ being observed in the state $S_i$ satisfies the conditional expression $1/K<B_{ik}<b_{max\_th}$ in the parentheses in equation (20).

When it is determined in step S113 that the observation probability $B_{ik}=b_i(O_k)$ does not satisfy the conditional expression $1/K<B_{ik}<b_{max\_th}$, the process skips step S114, and proceeds to step S115.

When it is determined in step S113 that the observation probability $B_{ik}=b_i(O_k)$ satisfies the conditional expression $1/K<B_{ik}<b_{max\_th}$, the process proceeds step S114, where the learning section 21 temporarily stores the observed value $O_k$ as an observed value to be divided (observed value to be assigned to a state after the division on a one-to-one basis) in association with the state $S_i$ in a memory not shown in the figure.

The process thereafter proceeds from step S114 to step S115, where whether the suffix k is equal to the number K of observed values (hereinafter referred to also as the number of symbols) is determined.

When it is determined in step S115 that the suffix k is not equal to the number K of symbols, the process proceeds to step S116, where the learning section 21 increments the suffix k by one. The process then returns from step S116 to step S113 to repeat a similar process from step S113 on down.

When it is determined in step S115 that the suffix k is equal to the number K of symbols, the process proceeds to step S117, where the learning section 21 determines whether the suffix i is equal to the number N of states (the number of states of the extended HMM).

When it is determined in step S117 that the suffix i is not equal to the number N of states, the process proceeds to step S118, where the learning section 21 increments the suffix i by one. The process then returns from step S118 to step S112 to repeat a similar process from step S112 on down.

When it is determined in step S117 that the suffix i is equal to the number N of states, the process proceeds to step S119, where the learning section 21 detects each state $S_i$ stored in association with the observed value to be divided in step S114 as a dividing object state. The process then makes a return.

Figure 39:
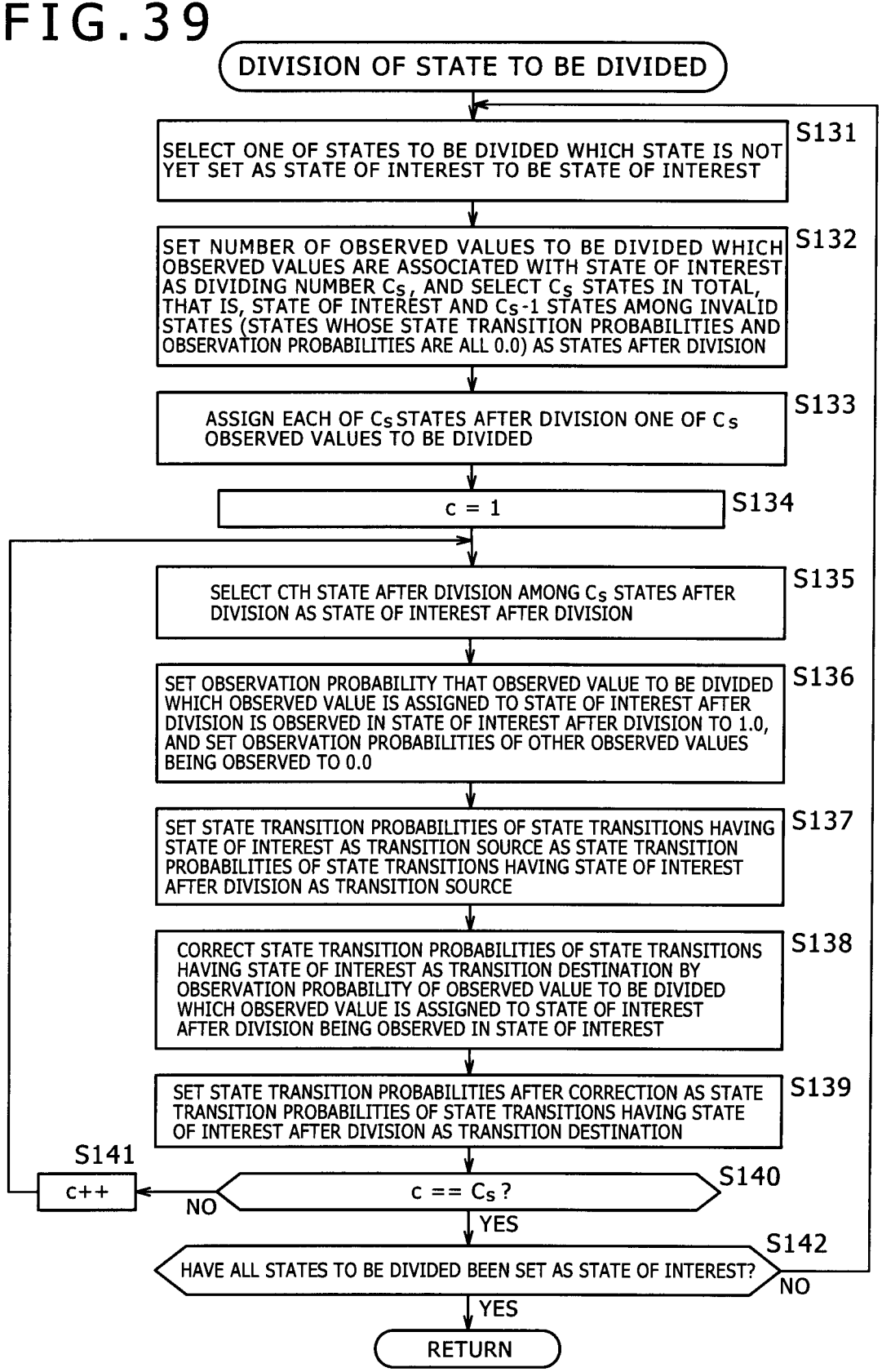
FIG. 39 is a flowchart of assistance in explaining a process of dividing a state.

FIG. 39 is a flowchart of assistance in explaining the process of dividing a state (dividing a dividing object state) which process is performed by the learning section 21 in FIG. 4 in step S93 in FIG. 37.

In step S131, the learning section 21 selects one of dividing object states which state is not yet set as a state of interest to be a state of interest. The process then proceeds to step S132.

In step S132, the learning section 21 sets the number of observed values to be divided which observed values are associated with the state of interest as the number Cs of states after division into which the state of interest is divided (which number will hereinafter be referred to also as a dividing number), and selects Cs states in total, that is, the state of interest and Cs−1 states of invalid states among the states of the extended HMM, as states after division.

The process thereafter proceeds from step S132 to step S133, where the learning section 21 assigns each of the Cs states after division one of the Cs observed values to be divided which observed values are associated with the state of interest. The process then proceeds to step S134.

In step S134, the learning section 21 initializes a variable c for counting the Cs states after the division to one, for example. The process then proceeds to step S135.

In step S135, the learning section 21 selects a cth state after the division among the Cs states after the division as a state of interest after the division to which state attention is directed. The process then proceeds to step S136.

In step S136, the learning section 21 sets an observation probability that the observed value to be divided which observed value is assigned to the state of interest after the division is observed in the state of interest after the division to 1.0, and sets observation probabilities of the other observed values being observed to 0.0. The process then proceeds to step S137.

In step S137, the learning section 21 sets state transition probabilities of state transitions having the state of interest after the division as a transition source to state transition probabilities of state transitions having the state of interest as a transition source. The process then proceeds to step S138.

In step S138, the learning section 21 corrects state transition probabilities of state transitions having the state of interest as a transition destination by an observation probability that the observed value of the dividing object state which observed value is assigned to the state of interest after the division is observed in the state of interest, as described with reference to FIGS. 33A and 33B, and thereby obtains the corrected values of the state transition probabilities. The process then proceeds to step S139.

In step S139, the learning section 21 sets state transition probabilities of state transitions having the state of interest after the division as a transition destination to the corrected values obtained in the immediately preceding step S138. The process then proceeds to step S140.

In step S140, the learning section 21 determines whether the variable c is equal to the dividing number Cs.

When it is determined in step S140 that the variable c is not equal to the dividing number Cs, the process proceeds to step S141, where the learning section 21 increments the variable c by one. The process then returns to step S135.

When it is determined in step S140 that the variable c is equal to the dividing number Cs, the process proceeds to step S142, where the learning section 21 determines whether all the dividing object states have been selected as a state of interest.

When it is determined in step S142 that all the dividing object states have not been selected as a state of interest, the process returns to step S131 to repeat a similar process from step S131 on down.

When it is determined in step S142 that all the dividing object states have been selected as a state of interest, that is, when the division of all the dividing object states has been completed, the process makes a return.

Figure 40:
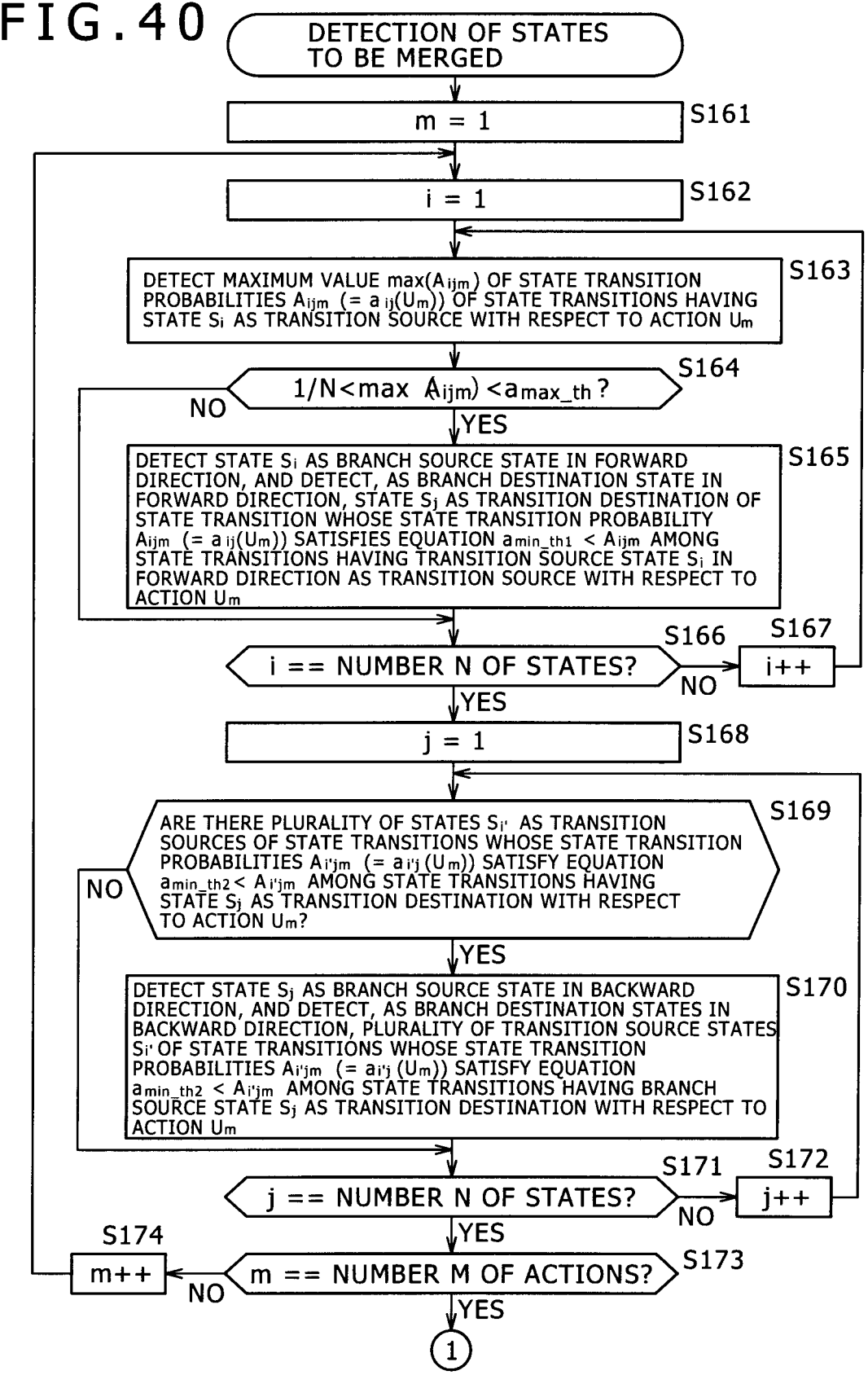
FIG. 40 is a flowchart of assistance in explaining a process of detecting merging object states.

FIG. 40 is a flowchart of assistance in explaining the process of detecting merging object states which process is performed by the learning section 21 in FIG. 4 in step S95 in FIG. 37.

In step S161, the learning section 21 initializes a variable m indicating the suffix of an action $U_m$ to one, for example. The process then proceeds to step S162.

In step S162, the learning section 21 initializes a variable i indicating the suffix of a state $S_i$ to one, for example. The process then proceeds to step S163.

In step S163, the learning section 21 detects a maximum value $\max(A_{ijm})$ of state transition probabilities $A_{ijm}(=a_{ij}(U_m))$ of state transitions having the state $S_i$ as a transition source to each state $S_j$ with respect to an action $U_m$ in the extended HMM stored in the model storing section 22. The process then proceeds to step S164.

In step S164, the learning section 21 determines whether the maximum value $\max(A_{ijm})$ satisfies equation (19), that is, the equation $1/N < \max(A_{ijm}) < a_{max\_th}$.

When it is determined in step S164 that the maximum value $\max(A_{ijm})$ does not satisfy equation (19), the process skips step S165, and proceeds to step S166.

When it is determined in step S164 that the maximum value $\max(A_{ijm})$ satisfies equation (19), the process proceeds to step S165, where the learning section 21 detects the state $S_i$ as a branch source state of branches in the forward direction.

Further, the learning section 21 detects a state $S_j$ as a transition destination of a state transition whose state transition probability $A_{ijm}=a_{ij}(U_m)$ satisfies the conditional expression $a_{min\_th1} < A_{ijm}$ in the parentheses in equation (23) among state transitions having the branch source state $S_i$ of branches in the forward direction as a transition source with respect to the action $U_m$ as a branch destination state of branches in the forward direction. The process then proceeds from step S165 to step S166.

In step S166, the learning section 21 determines whether the suffix i is equal to the number N of states.

When it is determined in step S166 that the suffix i is not equal to the number N of states, the process proceeds to step S167, where the learning section 21 increments the suffix i by one. The process then returns to step S163.

When it is determined in step S166 that the suffix i is equal to the number N of states, the process proceeds to step S168, where the learning section 21 initializes a variable j indicating the suffix of the state $S_j$ to one, for example. The process then proceeds to step S169.

In step S169, the learning section 21 determines whether there are a plurality of states $S_{i'}$, as transition sources of state transitions whose state transition probabilities $A_{i'jm}=a_{i'j}(U_m)$ satisfy the conditional expression $a_{min\_th2} < A_{i'jm}$ in the parentheses in equation (25) among state transitions from each state $S_{i'}$ to the state $S_j$ as a transition destination with respect to the action $U_m$.

When it is determined in step S169 that there are not a plurality of states $S_{i'}$ as transition sources of state transitions satisfying the conditional expression $a_{min\_th2} < A_{i'jm}$ in the parentheses in equation (25), the process skips step S170, and proceeds to step S171.

When it is determined in step S169 that there are a plurality of states $S_{i'}$, as transition sources of state transitions satisfying the conditional expression $a_{min\_th2} < A_{i'jm}$ in the parentheses in equation (25), the process proceeds to step S170, where the learning section 21 detects the state $S_j$ as a branch source state of branches in the backward direction.

Further, the learning section 21 detects the plurality of states $S_{i'}$ as transition sources of the state transitions whose state transition probabilities $A_{i'jm} = a_{i'j}(U_m)$ satisfy the conditional expression $a_{min\_th2} < A_{i'jm}$ in the parentheses in equation (25) among the state transitions from each state $S_{i'}$ to the branch source state $S_j$ of branches in the backward direction as a transition destination with respect to the action $U_m$ as branch destination states of branches in the backward direction. The process then proceeds from step S170 to step S171.

In step S171, the learning section 21 determines whether the suffix j is equal to the number N of states.

When it is determined in step S171 that the suffix j is not equal to the number N of states, the process proceeds to step S172, where the learning section 21 increments the suffix j by one. The process then returns to step S169.

When it is determined in step S171 that the suffix j is equal to the number N of states, the process proceeds to step S173, where the learning section 21 determines whether the suffix m is equal to the number M of actions $U_m$ (which number will hereinafter be referred to also as an action number).

When it is determined in step S173 that the suffix m is not equal to the action number M, the process proceeds to step S174, where the learning section 21 increments the suffix m by one. The process then returns to step S162.

Figure 41:
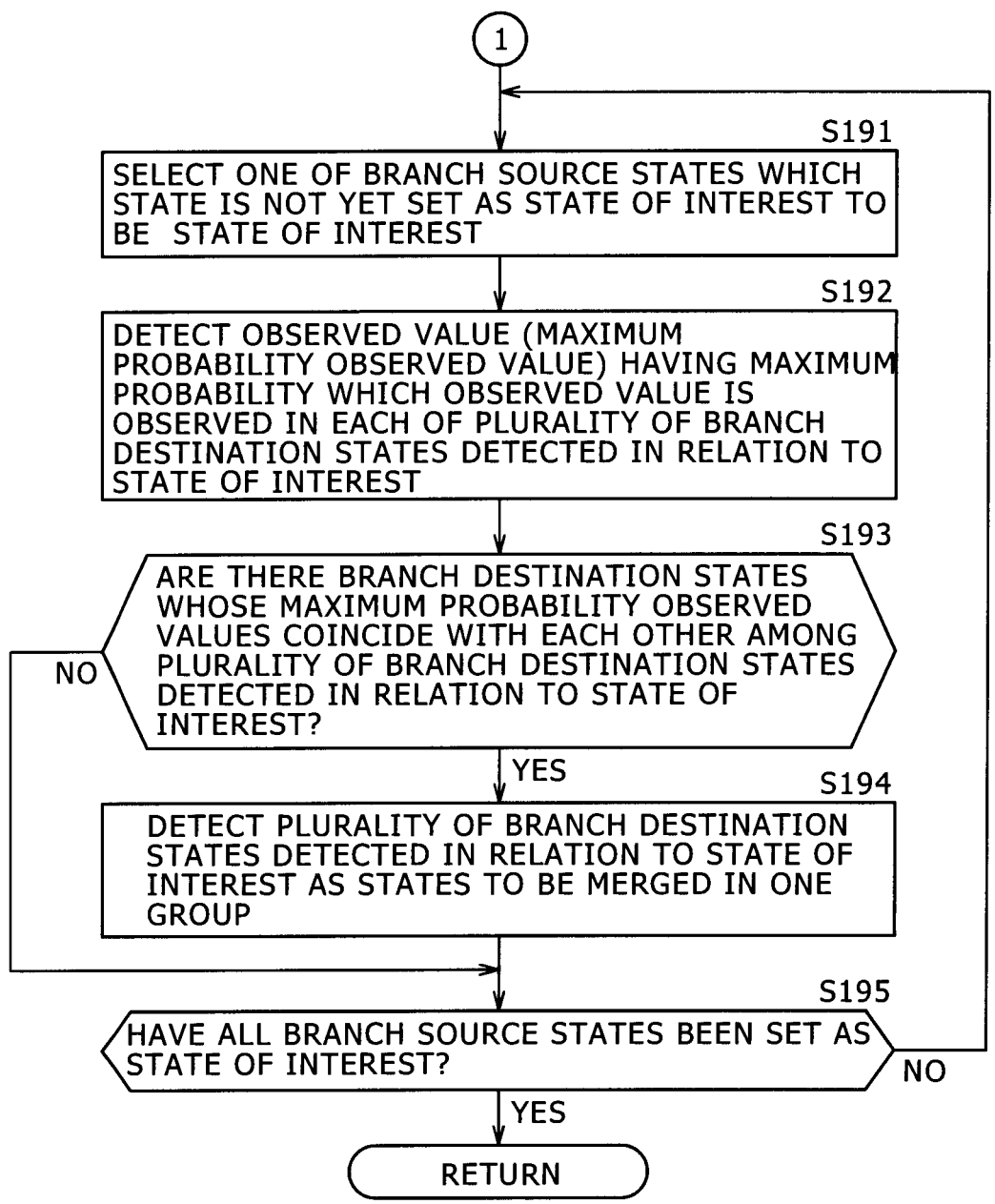
FIG. 41 is a flowchart of assistance in explaining the process of detecting merging object states.

When it is determined in step S173 that the suffix m is equal to the action number M, the process proceeds to step S191 in FIG. 41.

FIG. 41 is a flowchart continued from FIG. 40.

In step S191 in FIG. 41, the learning section 21 selects one branch source state that is not yet set as a state of interest among the branch source states detected by the process of steps S161 to S174 in FIG. 40 to be a state of interest. The process then proceeds to step S192.

In step S192, with respect to each of a plurality of branch destination states (candidates for branch destination states) detected in relation to the state of interest, that is, a plurality of branch destination states (candidates for branch destination states) branching from the state of interest as a branch source, the learning section 21 detects an observed value $O_{max}$ observed in the branch destination state and having a maximum observation probability (which observed value will hereinafter be referred to also as a maximum probability observed value) according to equation (24). The process then proceeds to step S193.

In step S193, the learning section 21 determines whether the plurality of branch destination states detected in relation to the state of interest include branch destination states whose maximum probability observed values $O_{max}$ coincide with each other.

When it is determined in step S193 that the plurality of branch destination states detected in relation to the state of interest do not include branch destination states whose maximum probability observed values $O_{max}$ coincide with each other, the process skips step S194, and proceeds to step S195.

When it is determined in step S193 that the plurality of branch destination states detected in relation to the state of interest include branch destination states whose maximum probability observed values $O_{max}$ coincide with each other, the process proceeds to step S194, where the learning section 21 detects the plurality of branch destination states whose maximum probability observed values $O_{max}$ coincide with each other among the plurality of branch destination states detected in relation to the state of interest as merging object states of one group. The process then proceeds to step S195.

In step S195, the learning section 21 determines whether all the branch source states have been selected as a state of interest.

When it is determined in step S195 that not all the branch source states have been selected as a state of interest, the process returns to step S191.

When it is determined in step S195 that all the branch source states have been selected as a state of interest, the process makes a return.

FIG. 42 is a flowchart of assistance in explaining the process of merging states (merging merging object states) which process is performed by the learning section 21 in FIG. 4 in step S96 in FIG. 37.

In step S211, the learning section 21 selects one of groups of merging object states which group is not yet set as a group of interest to be a group of interest. The process then proceeds to step S212.

In step S212, the learning section 21 selects a merging object state having a minimum suffix, for example, among a plurality of merging object states of the group of interest to be a representative state of the group of interest. The process then proceeds to step S213.

In step S213, the learning section 21 sets observation probabilities of each observed value being observed in the representative state to average values of observation probabilities of each observed value being observed in the plurality of respective merging object states of the group of interest.

Further, in step S213, the learning section 21 sets observation probabilities of each observed value being observed in the other merging object states than the representative state of the group of interest to 0.0. The process then proceeds to step S214.

In step S214, the learning section 21 sets state transition probabilities of state transitions having the representative state as a transition source to average values of state transition probabilities of state transitions having each of the merging object states of the group of interest as a transition source. The process then proceeds to step S215.

In step S215, the learning section 21 sets state transition probabilities of state transitions having the representative state as a transition destination to sums of state transition probabilities of state transitions having each of the merging object states of the group of interest as a transition destination. The process then proceeds to step S216.

In step S216, the learning section 21 sets state transition probabilities of state transitions having the other merging object states than the representative state of the group of interest as a transition source and state transitions having the other merging object states than the representative state of the group of interest as a transition destination to 0.0. The process then proceeds to step S217.

In step S217, the learning section 21 determines whether all the groups of merging object states have been selected as a group of interest.

When it is determined in step S217 that not all the groups of merging object states have been selected as a group of interest, the process returns to step S211.

When it is determined in step S217 that all the groups of merging object states have been selected as a group of interest, the process makes a return.

Figure 43A:
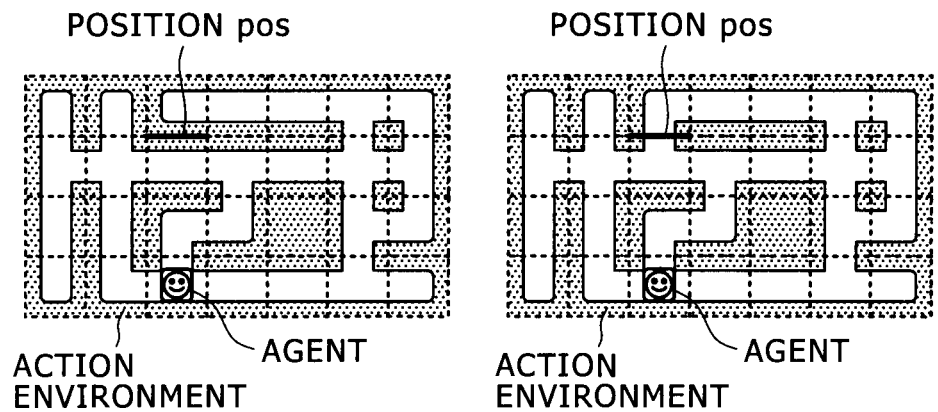
FIGS. 43A, 43B, and 43C are diagrams of assistance in explaining simulation of learning of the extended HMM under the one-state one-observed-value constraint.
Figure 43B:
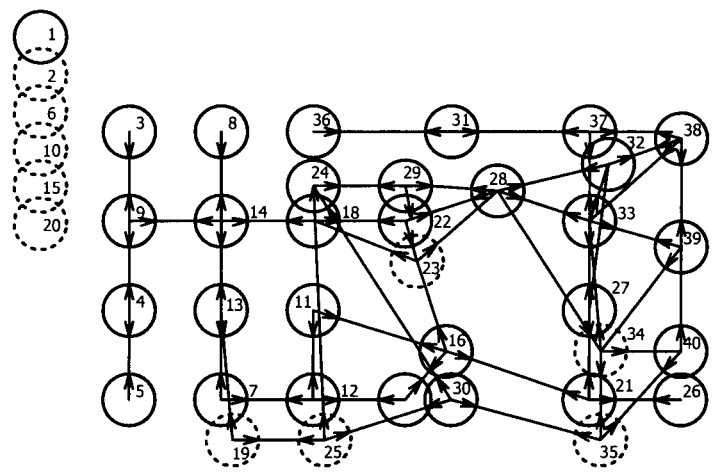
Figure 43C:
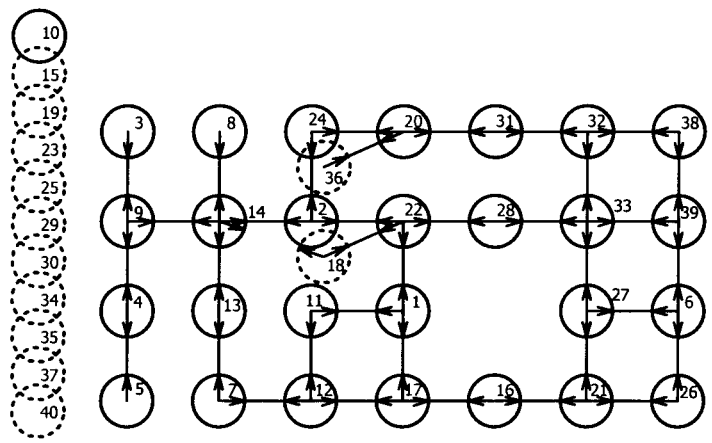

FIGS. 43A, 43B, and 43C are diagrams of assistance in explaining simulation of learning of the extended HMM under the one-state one-observed-value constraint which simulation was performed by the present inventor.

FIG. 43A is a diagram showing an action environment employed in the simulation.

In the simulation, an environment whose structure is converted to a first structure and a second structure is employed as the action environment.

In the action environment of the first structure, a position pos is a wall and thus cannot be passed, whereas in the action environment of the second structure, the position pos is a passage and can thus be passed.

In the simulation, an observed value series and an action series serving as learning data were obtained in each of the action environment of the first structure and the action environment of the second structure, and the learning of the extended HMM was performed.

FIG. 43B shows the extended HMM obtained as a result of learning without the one-state one-observed-value constraint. FIG. 43C shows the extended HMM obtained as a result of learning under the one-state one-observed-value constraint.

In FIG. 43B and FIG. 43C, a circle (○) mark represents a state of the extended HMM, and a number entered in the circle mark is the suffix of the state represented by the circle mark. Arrows indicating states represented by circle marks represent possible state transitions (state transitions whose state transition probability is other than 0.0 (a value that can be assumed to be 0.0)).

In addition, in FIG. 43B and FIG. 43C, states arranged in a vertical direction (circle marks representing the states) in a left side position are invalid states in the extended HMM.

The extended HMM in FIG. 43B confirms that in the learning without the one-state one-observed-value constraint, the model parameters fall into a local minimum, a case where the first structure and the second structure of the action environment changing in structure are represented by having a distribution in observation probability and a case where the first structure and the second structure of the action environment changing in structure are represented by having a branch structure of state transitions are mixed with each other in the extended HMM after being learned, and consequently the structure of the action environment changing in structure cannot be properly represented by state transitions of the extended HMM.

On the other hand, the extended HMM in FIG. 43C confirms that in the learning under the one-state one-observed-value constraint, the first structure and the second structure of the action environment changing in structure are represented by only having a branch structure of state transitions in the extended HMM after being learned, and thus the structure of the action environment changing in structure can be properly represented by state transitions of the extended HMM.

According to the learning under the one-state one-observed-value constraint, when the structure of the action environment changes, parts not changing in structure are commonly stored in the extended HMM, and parts changing in structure are represented by branch structures of state transitions ((a plurality of) state transitions to different states as state transitions occurring when a certain action is performed) in the extended HMM.

Thus, because the action environment changing in structure can be properly represented by the single extended HMM without models being prepared for each structure, the action environment changing in structure can be modeled with a small amount of storage resources.

[Process in Recognition Action Mode for Determining Action according to Predetermined Strategy]

In the process in the recognition action mode of FIG. 8, the agent of FIG. 4 recognizes the present conditions of the agent assuming that the agent is located in a known area of the action environment (area (learned area) when the extended HMM is learned using an observed value series and an action series observed in the area), obtains a present state as a state of the extended HMM which state corresponds to the present conditions, and determines an action for reaching a goal state from the present state. However, the agent is not necessarily located in the known area, but may be located in an unknown area (area not learned yet).

In a case where the agent is located in an unknown area, even when an action is determined as described with reference to FIG. 8, the action is not necessarily an appropriate action for reaching the goal state, but can instead be an unnecessary or redundant action, as it were, such as wandering in the unknown area.

Accordingly, the agent in the recognition action mode can determine whether the present conditions of the agent are unknown conditions (conditions in which an observed value series and an action series not heretofore observed are observed) (conditions not obtained in the extended HMM) or known conditions (conditions in which an observed value series and an action series heretofore observed are observed) (conditions obtained in the extended HMM), and determine an appropriate action on the basis of a result of the determination.

Figure 44:
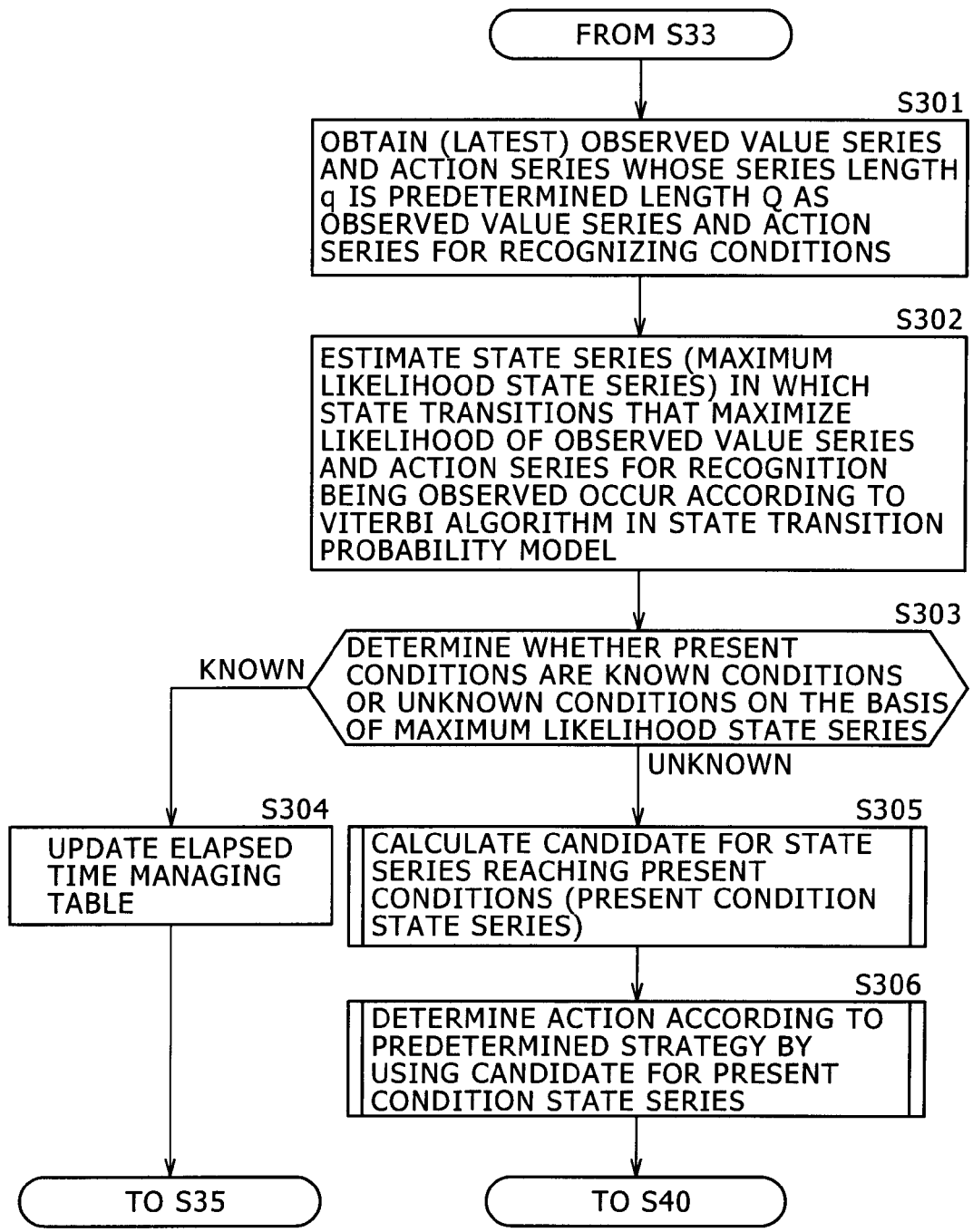
FIG. 44 is a flowchart of assistance in explaining a process in the recognition action mode.

FIG. 44 is a flowchart of assistance in explaining a process in such a recognition action mode.

In the recognition action mode in FIG. 44, the agent performs a similar process to that of steps S31 to S33 in FIG. 8.

Thereafter, the process proceeds to step S301, where the state recognizing section 23 (FIG. 4) of the agent reads out a latest observed value series whose series length (number of values forming the series) q is a predetermined length Q and an action series of actions performed when each observed value of the observed value series is observed as an observed value series and an action series for recognition which series are used to recognize the present conditions of the agent from the history storing section 14, and thereby obtains the observed value series and the action series for recognition.

Then, the process proceeds from step S301 to step S302, where the state recognizing section 23 observes the observed value series and the action series for recognition in the learned extended HMM stored in the model storing section 22, and obtains an optimum state probability $\delta_t(j)$, which is a maximum value of state probability of being in a state $S_j$ at time t, and an optimum path $\psi_t(j)$, which is a state series providing the optimum state probability $\delta_t(j)$, according to the above-described equations (10) and (11) based on the Viterbi algorithm.

Further, the state recognizing section 23 observes the observed value series and the action series for recognition, and obtains a maximum likelihood state series, which is a state series for arriving at the state $S_j$ which state series maximizes the optimum state probability $\delta_t(j)$ in equation (10) at time t, from the optimum path $\psi_t(j)$ in equation (11).

The process thereafter proceeds from step S302 to step S303, where the state recognizing section 23 determines on the basis of the maximum likelihood state series whether the present conditions of the agent are known conditions or unknown conditions.

In the following, the observed value series for recognition (or the observed value series and the action series for recognition) will be denoted as O, and the maximum likelihood state series in which the observed value series O and the action series for recognition are observed will be denoted as X. Incidentally, the number of states forming the maximum likelihood state series X is equal to the series length q of the observed value series O for recognition.

The time t at which the first observed value of the observed value series O for recognition is observed is set at one, for example. A state at time t (tth state from a start) of the maximum likelihood state series X will be denoted as $X_t$, and a state transition probability of a state transition from the state $X_t$ to a state $X_{t+1}$ at time t+1 will be denoted as $A(X_t, X_{t+1})$.

Further, a likelihood of the observed value series O for recognition being observed in the maximum likelihood state series X will be denoted as P(O|X).

In step S303, the state recognizing section 23 determines whether equation (28) and equation (29) are satisfied.

$$A(X_t, X_{t+1}) > \text{Thres}_{trans}(0 < t < q) \qquad (28)$$

$$P(O|X) > \text{Thres}_{obs} \qquad (29)$$

$\text{Thres}_{trans}$ in equation (28) is a threshold value for making a division as to whether a state transition from the state $X_t$ to the state $X_{t+1}$ can occur. $\text{Thres}_{obs}$ in equation (29) is a threshold value for making a division as to whether the observed value series O for recognition can be observed in the maximum likelihood state series X. For example, values that can properly make the above-described divisions are set as the threshold values $\text{Thres}_{trans}$ and $\text{Thres}_{obs}$ by simulation or the like.

When at least one of equation (28) and equation (29) is not satisfied, the state recognizing section 23 determines in step S303 that the present conditions of the agent are unknown conditions.

When both of equation (28) and equation (29) are satisfied, the state recognizing section 23 determines in step S303 that the present conditions of the agent are known conditions.

When it is determined in step S303 that the present conditions are known conditions, the state recognizing section 23 obtains the last state of the maximum likelihood state series X as a present state $S_t$ (estimates the last state of the maximum likelihood state series X to be a present state $S_t$). The process then proceeds to step S304.

In step S304, the state recognizing section 23 updates the elapsed time managing table stored in the elapsed time managing table storing section 32 (FIG. 4) on the basis of the present state $S_t$ as in step S34 in FIG. 8.

The agent thereafter performs a similar process to the process from step S35 on down in FIG. 8.

When it is determined in step S303 that the present conditions are unknown conditions, on the other hand, the process proceeds to step S305, where the state recognizing section 23 calculates one or more candidates for a present condition state series, which is a state series for the agent to reach the present conditions on the basis of the extended HMM stored in the model storing section 22.

Further, the state recognizing section 23 supplies the one or more candidates for the present condition state series to the action determining section 24 (FIG. 4). The process then proceeds from step S305 to step S306.

In step S306, the action determining section 24 determines an action to be performed next by the agent according to a predetermined strategy using the one or more candidates for the present condition state series from the state recognizing section 23.

The agent thereafter performs a similar process to the process from step S40 on down in FIG. 8.

As described above, when the present conditions are unknown conditions, the agent calculates one or more candidates for a present condition state series, and determines an action of the agent according to a predetermined strategy using the one or more candidates for the present condition state series.

That is, when the present conditions are unknown conditions, the agent obtains a state series leading to the present conditions in which state series a latest observed value series and a latest action series of a certain series length q are observed as a candidate for the present condition state series from state series that can be obtained from past experiences, that is, state series of state transitions occurring in the learned extended HMM (which state series will hereinafter be referred to also as experienced state series).

The agent then determines an action of the agent according to a predetermined strategy using (reusing) the present condition state series as experienced state series.

[Calculation of Candidate for Present Condition State Series]

Figure 45:
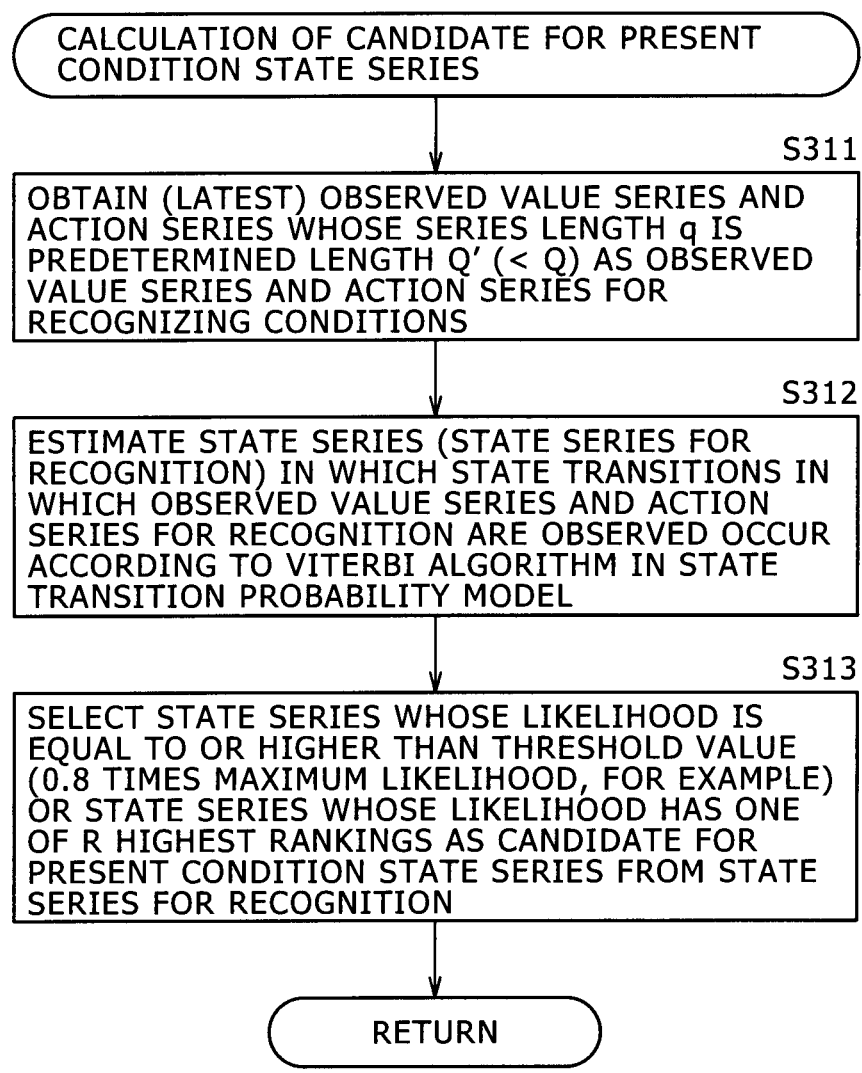
FIG. 45 is a flowchart of assistance in explaining a process of calculating a candidate for a present condition state series.

FIG. 45 is a flowchart of assistance in explaining the process of calculating a candidate for the present condition state series which process is performed by the state recognizing section 23 in FIG. 4 in step S305 in FIG. 44.

In step S311, the state recognizing section 23 reads out a latest observed value series whose series length q is a predetermined length Q' and an action series of actions performed when each observed value of the observed value series is observed (a latest action series of actions performed by the agent, whose series length q is a predetermined length Q', and an observed value series of observed values observed in the agent when the actions of the action series are performed) as an observed value series and an action series for recognition from the history storing section 14 (FIG. 4), and thereby obtains the observed value series and the action series for recognition.

In this case, the length Q' as series length q of the observed value series for recognition obtained in step S311 by the state recognizing section 23 is for example one, which is shorter than the length Q as series length q of the observed value series obtained in step S301 in FIG. 44.

That is, as described above, the agent obtains a state series in which an observed value series and an action series for recognition as a latest observed value series and a latest action series are observed as a candidate for the present condition state series from the experienced state series. When the series length q of the observed value series and the action series for recognition is too long, a state series in which an observed value series and an action series for recognition of such a long series length q are observed may not be found in the experienced state series (or there is only a likelihood approximately equal to zero of such a state series being found).

Accordingly, the state recognizing section 23 obtains an observed value series and an action series for recognition of a short series length q in step S311 so as to be able to obtain a state series in which the observed value series and the action series for recognition are observed from the experienced state series.

After step S311, the process proceeds to step S312, where the state recognizing section 23 observes the observed value series and the action series for recognition obtained in step S311 in the learned extended HMM stored in the model storing section 22, and obtains an optimum state probability $\delta_t(j)$, which is a maximum value of state probability of being in a state $S_j$ at time t, and an optimum path $\psi_t(j)$, which is a state series providing the optimum state probability $\delta_t(j)$, according to the above-described equations (10) and (11) based on the Viterbi algorithm.

That is, the state recognizing section 23 obtains the optimum path $\psi_t(j)$, which is a state series whose series length q is Q' in which state series the observed value series and the action series for recognition are observed, from the experienced state series.

The state series as optimum path $\psi_t(j)$ obtained (estimated) on the basis of the Viterbi algorithm will hereinafter be referred to also as a state series for recognition.

In step S312, the optimum state probability $\delta_t(j)$ and the state series for recognition (optimum path $\psi_t(j)$) are obtained for each of N states $S_j$ of the extended HMM.

After obtaining the state series for recognition in step S312, the process proceeds to step S313, where the state recognizing section 23 selects one or more state series for recognition as a candidate for the present condition state series from the state series for recognition obtained in step S312. The process then makes a return.

That is, in step S313, for example the state series for recognition whose likelihood, that is, optimum state probability $\delta_t(j)$ is equal to or higher than a threshold value (for example a value 0.8 times a maximum value of optimum state probability $\delta_t(j)$ (maximum likelihood)) is selected as a candidate for the present condition state series.

Alternatively, for example R (R is an integer of one or more) state series for recognition whose optimum state probabilities $\delta_t(j)$ are within R highest rankings are selected as candidates for the present condition state series.

Figure 46:
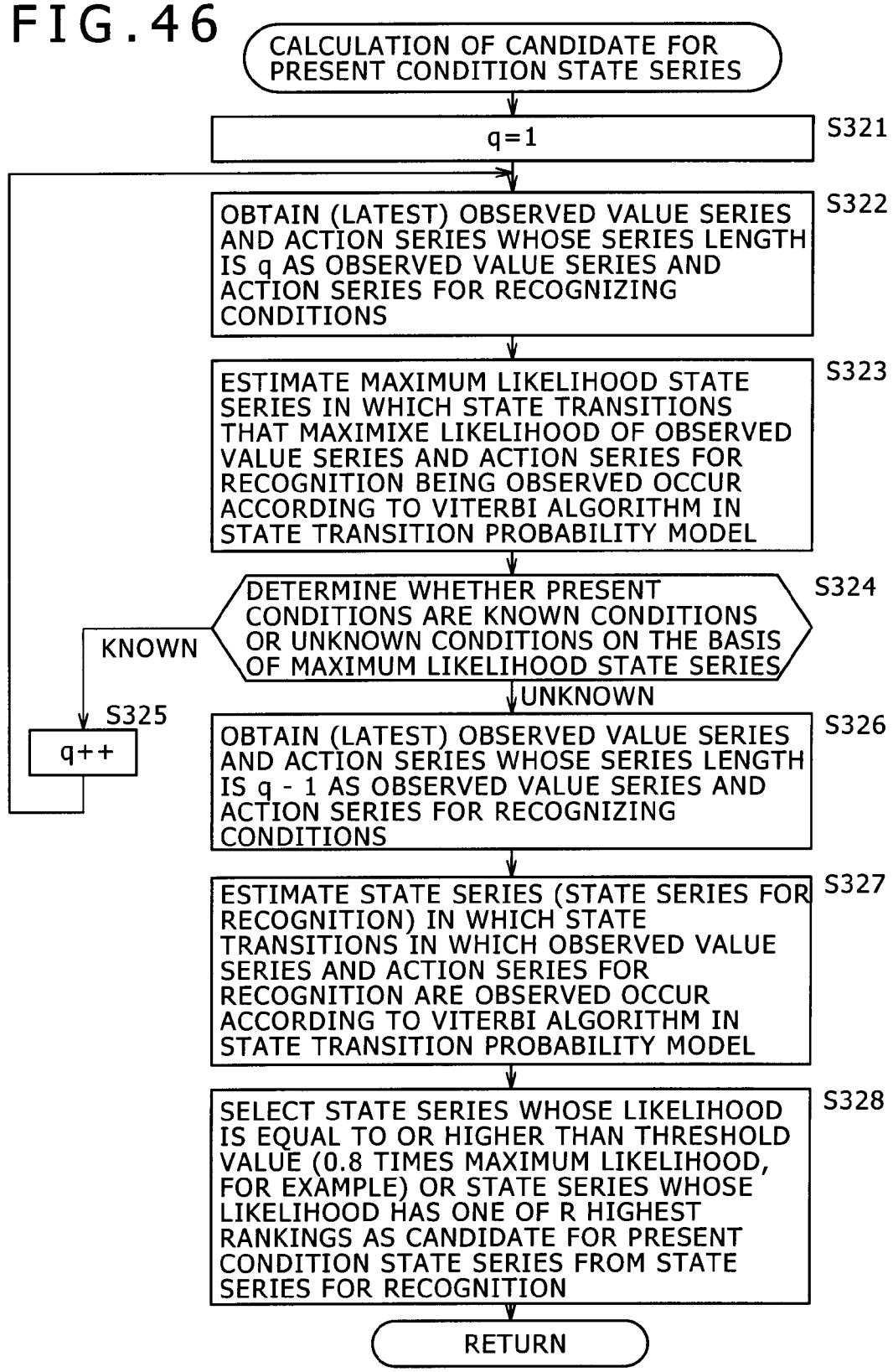
FIG. 46 is a flowchart of assistance in explaining a process of calculating a candidate for a present condition state series.

FIG. 46 is a flowchart of assistance in explaining another example of the process of calculating a candidate for the present condition state series which process is performed by the state recognizing section 23 in FIG. 4 in step S305 in FIG. 44.

In the process of calculating a candidate for the present condition state series in FIG. 45, the series length q of an observed value series and an action series for recognition is fixed at a short length Q', and a state series for recognition or, in turn, a candidate for the present condition state series, of the length Q' is obtained.

On the other hand, in the process of calculating a candidate for the present condition state series in FIG. 46, the agent adaptively (autonomously) adjusts the series length q of an observed value series and an action series for recognition. Thereby a state series having a longest series length q in which state series a structure more resembling the structure of the present position of the agent in the structure of the action environment obtained by the extended HMM, that is, an observed value series and an action series for recognition (a latest observed value series and a latest action series) are observed in the experienced state series is obtained as a candidate for the present condition state series.

In step S321 in the process of calculating a candidate for the present condition state series in FIG. 46, the state recognizing section 23 (FIG. 4) initializes the series length q to a minimum of one, for example. The process proceeds to step S322.

In step S322, the state recognizing section 23 reads out a latest observed value series whose series length is a length q and an action series of actions performed when each observed value of the observed value series is observed as an observed value series and an action series for recognition from the history storing section 14 (FIG. 4), and thereby obtains the observed value series and the action series for recognition. The process then proceeds to step S323.

In step S323, the state recognizing section 23 observes the observed value series and the action series for recognition having the series length q in the learned extended HMM stored in the model storing section 22, and obtains an optimum state probability $\delta_t(j)$, which is a maximum value of state probability of being in a state $S_j$ at time t, and an optimum path $\psi_t(j)$, which is a state series providing the optimum state probability $\delta_t(j)$, according to the above-described equations (10) and (11) based on the Viterbi algorithm.

Further, the state recognizing section 23 observes the observed value series and the action series for recognition, and obtains a maximum likelihood state series, which is a state series for arriving at the state $S_j$ which state series maximizes the optimum state probability $\delta_t(j)$ in equation (10) at time t, from the optimum path $\psi_t(j)$ in equation (11).

The process thereafter proceeds from step S323 to step S324, where the state recognizing section 23 determines on the basis of the maximum likelihood state series whether the present conditions of the agent are known conditions or unknown conditions, as in step S303 in FIG. 44.

When it is determined in step S324 that the present conditions are known conditions, that is, when a state series in which the observed value series and the action series for recognition (the latest observed value series and the latest action series) having the series length q are observed can be obtained from the experienced state series, the process proceeds to step S325, where the state recognizing section 23 increments the series length q by one.

The process then returns from step S325 to step S322 to repeat a similar process from step S322 on down.

When it is determined in step S324 that the present conditions are unknown conditions, that is, when a state series in which the observed value series and the action series for recognition (the latest observed value series and the latest action series) having the series length q are observed cannot be obtained from the experienced state series, the process proceeds to step S326, where the state recognizing section 23 in subsequent steps S326 to S328 obtains a state series having a longest series length in which state series the observed value series and the action series for recognition (the latest observed value series and the latest action series) are observed from the experienced state series as a candidate for the present condition state series.

That is, in steps S322 to S325, whether the present conditions of the agent are known conditions or unknown conditions is determined on the basis of the maximum likelihood state series in which the observed value series and the action series for recognition are observed while the series length q of the observed value series and the action series for recognition is incremented by one.

Thus, a maximum likelihood state series in which the observed value series and the action series for recognition having a series length q−1 obtained by decrementing the series length q immediately after it is determined in step S324 that the present conditions are unknown conditions by one are observed is present as a state series (one of state series) having a longest series length in which state series the observed value series and the action series for recognition are observed in the experienced state series.

Accordingly, in step S326, the state recognizing section 23 reads out a latest observed value series whose series length is the length q−1 and an action series of actions performed when each observed value of the observed value series is observed as an observed value series and an action series for recognition from the history storing section 14 (FIG. 4), and thereby obtains the observed value series and the action series for recognition. The process then proceeds to step S327.

In step S327, the state recognizing section 23 observes the observed value series and the action series for recognition obtained in step S326 and having the series length q−1 in the learned extended HMM stored in the model storing section 22, and obtains an optimum state probability $\delta_t(j)$, which is a maximum value of state probability of being in a state $S_j$ at time t, and an optimum path $\psi_t(j)$, which is a state series providing the optimum state probability $\delta_t(j)$, according to the above-described equations (10) and (11) based on the Viterbi algorithm.

That is, the state recognizing section 23 obtains an optimum path $\psi_t(j)$ (state series for recognition), which is a state series having the series length q−1 in which state series the observed value series and the action series for recognition are observed, from the state series of state transitions occurring in the learned extended HMM.

After obtaining the state series for recognition in step S327, the process proceeds to step S328, where the state recognizing section 23 selects one or more state series for recognition as a candidate for the present condition state series from the state series for recognition obtained in step S327, as in step S313 in FIG. 45. The process then makes a return.

As described above, by incrementing the series length q and obtaining an observed value series and an action series for recognition having a series length q−1 obtained by decrementing the series length q immediately after it is determined that the present conditions are unknown conditions by one, an appropriate candidate for the present condition state series (state series corresponding to a structure more resembling the structure of the present position of the agent in the structure of the action environment obtained by the extended HMM) can be obtained from the experienced state series.

That is, when the series length of the observed value series and the action series for recognition used to obtain a candidate for the present condition state series is fixed, an appropriate candidate for the present condition state series may not be obtained if the fixed series length is too short or too long.

Specifically, when the series length of the observed value series and the action series for recognition is too short, the experienced state series include many state series having a high likelihood of the observed value series and the action series for recognition having such a series length being observed, and thus a large number of state series for recognition having high likelihoods are obtained.

As a result, when a candidate for the present condition state series is selected from such a large number of state series for recognition having high likelihoods, a possibility of a state series that represents the present conditions more properly not being selected as a candidate for the present condition state series in the experienced state series may be increased.

On the other hand, when the series length of the observed value series and the action series for recognition is too long, the experienced state series may not include a state series having a high likelihood of the observed value series and the action series for recognition having such a series length that is too long being observed, and consequently a possibility of not being able to obtain a candidate for the present condition state series may be increased.

On the other hand, as described with reference to FIG. 46, the estimation of a maximum likelihood state series as a state series of state transitions having a highest likelihood of the observed value series and the action series for recognition being observed and the determination of whether the present conditions of the agent are known conditions obtained in the extended HMM or unknown conditions not obtained in the extended HMM on the basis of the maximum likelihood state series are repeated until it is determined that the present conditions of the agent are unknown conditions while the series length of the observed value series and the action series for recognition is incremented (increased). One or more state series for recognition as state series of state transitions in which an observed value series and an action series for recognition having a series length q−1 shorter by one sample than the series length q when it is determined that the present conditions of the agent are unknown conditions are observed are estimated. One or more candidates for the present condition state series are selected from the one or more state series for recognition. Thereby, a state series representing a structure more resembling the structure of the present position of the agent in the structure of the action environment obtained by the extended HMM can be obtained as a candidate for the present condition state series.

As a result, an action can be determined by making the most of the experienced state series.

[Determination of Action according to Strategy]

Figure 47:
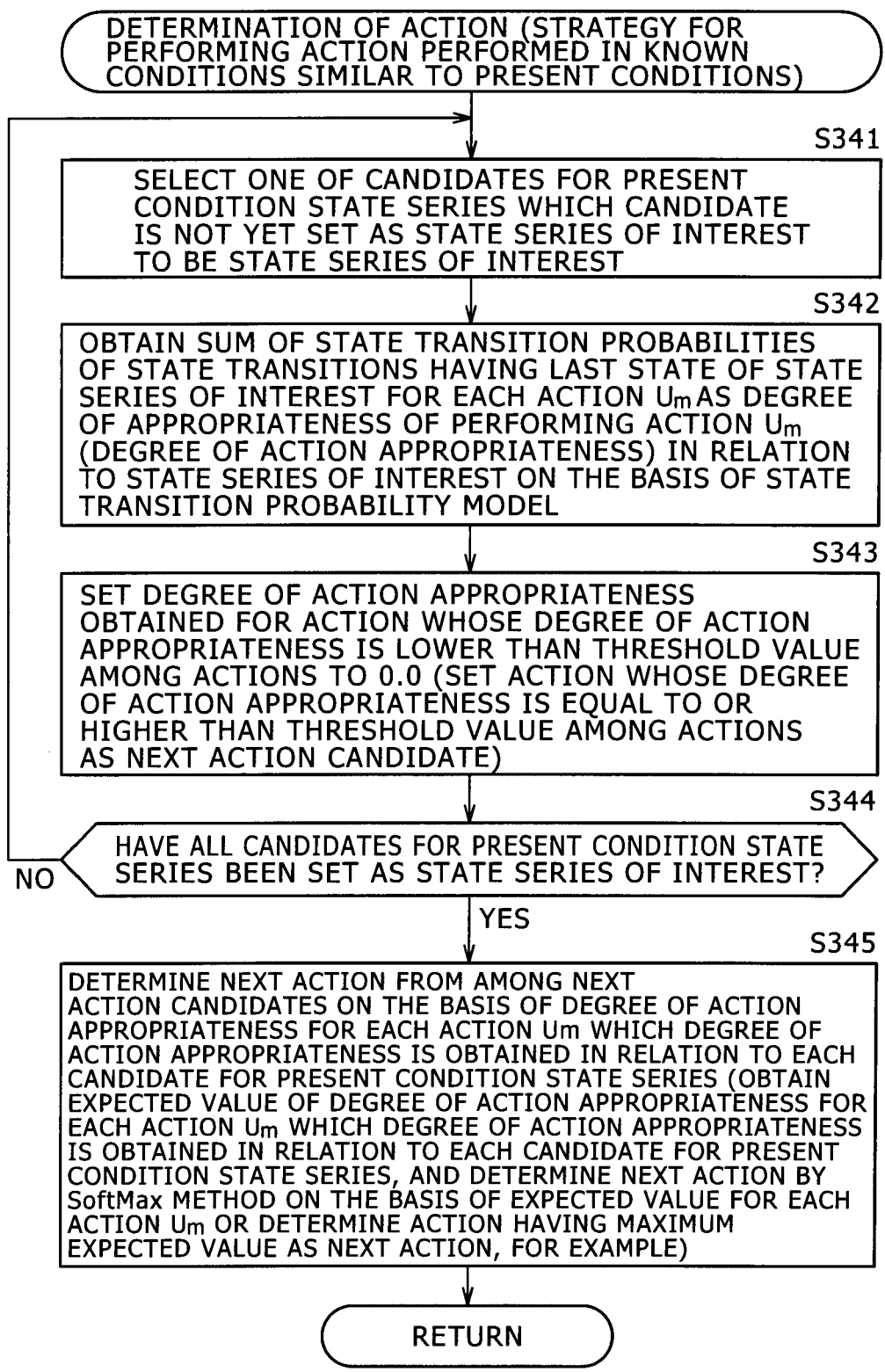
FIG. 47 is a flowchart of assistance in explaining a process of determining an action according to a first strategy.

FIG. 47 is a flowchart of assistance in explaining the process of determining an action according to a strategy, which process is performed by the action determining section 24 in FIG. 4 in step S306 in FIG. 44.

In FIG. 47, the action determining section 24 determines an action according to a first strategy for performing an action performed by the agent in known conditions resembling the present conditions of the agent among known conditions obtained in the extended HMM.

Specifically, in step S341, the action determining section 24 selects one candidate of one or more candidates for the present condition state series from the state recognizing section 23 (FIG. 4) which candidate is not yet set as a state series of interest to which to direct attention to be a state series of interest. The process then proceeds to step S342.

In step S342, the action determining section 24 obtains a sum of state transition probabilities of state transitions having a last state of the state series of interest as a transition source for each action $U_m$ as a degree of action appropriateness indicating appropriateness of performing the action $U_m$ (according to the first strategy) in relation to the state series of interest on the basis of the extended HMM stored in the model storing section 22.

Specifically, supposing that the last state is represented as $S_I$ (I is one of integers 1 to N), the action determining section 24 obtains a sum of state transition probabilities $a_{I,1}(U_m)$, $a_{I,2}(U_m)$, ..., $a_{I,N}(U_m)$ arranged in a j-axis direction (horizontal direction) in a state transition probability plane with respect to each action $U_m$ as a degree of action appropriateness.

The process then process from step S342 to step S343, where the action determining section 24 sets, to 0.0, the degree of action appropriateness obtained with respect to the action $U_m$ whose degree of action appropriateness is lower than a threshold value among M (kinds of) actions $U_1$ to $U_M$ whose degrees of action appropriateness have been obtained.

That is, by setting the degree of action appropriateness obtained with respect to the action $U_m$ whose degree of action appropriateness is lower than the threshold value to 0.0, the action determining section 24 excludes the action $U_m$ whose degree of action appropriateness is lower than the threshold value from candidates for a next action to be performed according to the first strategy in relation to the state series of interest, and consequently selects actions $U_m$ whose degree of action appropriateness is equal to or higher than the threshold value as candidates for a next action to be performed according to the first strategy.

After step S343, the process proceeds to step S344, where the action determining section 24 determines whether all the candidates for the present condition state series have been set as a state series of interest.

When it is determined in step S344 that not all the candidates for the present condition state series have been set as a state series of interest yet, the process returns to step S341. Then, in step S341, the action determining section 24 selects one candidate not yet set as a state series of interest to be a new state series of interest from the one or more candidates for the present condition state series from the state recognizing section 23. Thereafter a similar process is repeated.

When it is determined in step S344 that all the candidates for the present condition state series have been set as a state series of interest, the process proceeds to step S345, where the action determining section 24 determines a next action from the candidates for the next action on the basis of the degree of action appropriateness with respect to each action $U_m$ which degree of action appropriateness is obtained in relation to each of the one or more candidates for the present condition state series from the state recognizing section 23. The process then makes a return.

That is, the action determining section 24 for example determines that a candidate whose degree of action appropriateness is a maximum is the next action.

In addition, the action determining section 24 obtains an expected value (average value) of the degree of action appropriateness with respect to each action $U_m$, and determines the next action on the basis of the expected value.

Specifically, for example, with respect to each action $U_m$, the action determining section 24 obtains an expected value (average value) of the degree of action appropriateness with respect to the action $U_m$, which degree of action appropriateness is obtained in relation to each of the one or more candidates for the present condition state series.

The action determining section 24 then determines on the basis of the expected value with respect to each action $U_m$ that an action $U_m$ whose expected value is a maximum, for example, is the next action.

Alternatively, the action determining section 24 determines the next action by a SoftMax method, for example, on the basis of the expected value with respect to each action $U_m$.

Specifically, the action determining section 24 randomly generates an integer m in a range of the suffixes 1 to M of the M actions $U_1$ to $U_M$ with a probability corresponding to an expected value with respect to the action $U_m$ having the integer m as a suffix thereof, and determines that the action $U_m$ having the generated integer m as a suffix thereof is the next action.

As described above, when an action is determined according to the first strategy, the agent performs an action performed by the agent in known conditions resembling the present conditions of the agent.

Thus, according to the first strategy, when the agent is in unknown conditions, and it is desired that the agent perform an action similar to an action taken in known conditions, the agent can be made to perform the appropriate action.

The determination of an action according to such a first strategy can be made in not only a case where the agent is in unknown conditions but also a case of determining an action to be performed after the agent has reached an open end as described above, for example.

When the agent is in unknown conditions, and the agent is made to perform an action similar to an action taken in known conditions, the agent may wander in the action environment.

When the agent wanders in the action environment, the agent may return to a known place (area) (the present conditions become known conditions), or may explore an unknown place (the present conditions continue remaining unknown conditions).

Thus, when it is desired that the agent return to a known place, or that the agent explore an unknown place, it would be hard to say that an action such that the agent wanders in the action environment is appropriate as an action to be performed by the agent.

Accordingly, the action determining section 24 can determine a next action according to not only the first strategy but also a second strategy and a third strategy in the following.

Figure 48:
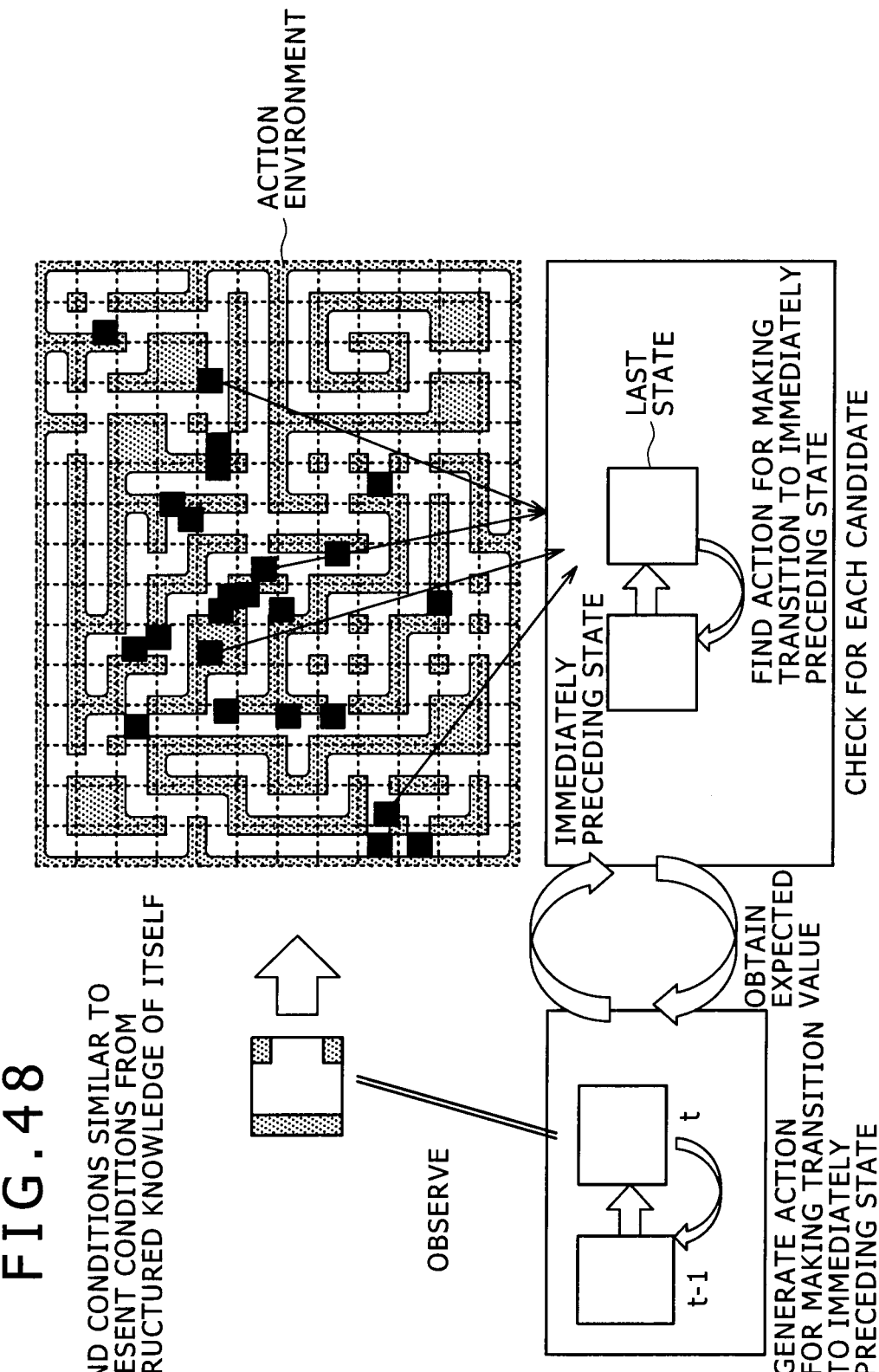
FIG. 48 is a diagram of assistance in explaining an outline of determining an action according to a second strategy.

FIG. 48 is a diagram of assistance in explaining an outline of determining an action according to the second strategy.

The second strategy is a strategy for increasing information enabling recognition of the (present) conditions of the agent. By determining an action according to the second strategy, an appropriate action can be determined as an action for the agent to return to a known place. As a result, the agent can return to the known place efficiently.

Specifically, in determining an action according to the second strategy, the action determining section 24 determines, as a next action, an action effecting a state transition from the last state $s_t$ of one or more candidates for the present condition state series from the state recognizing section 23 to an immediately preceding state $s_{t-1}$ as a state immediately preceding the last state $s_t$, as shown in FIG. 48, for example.

Figure 49:
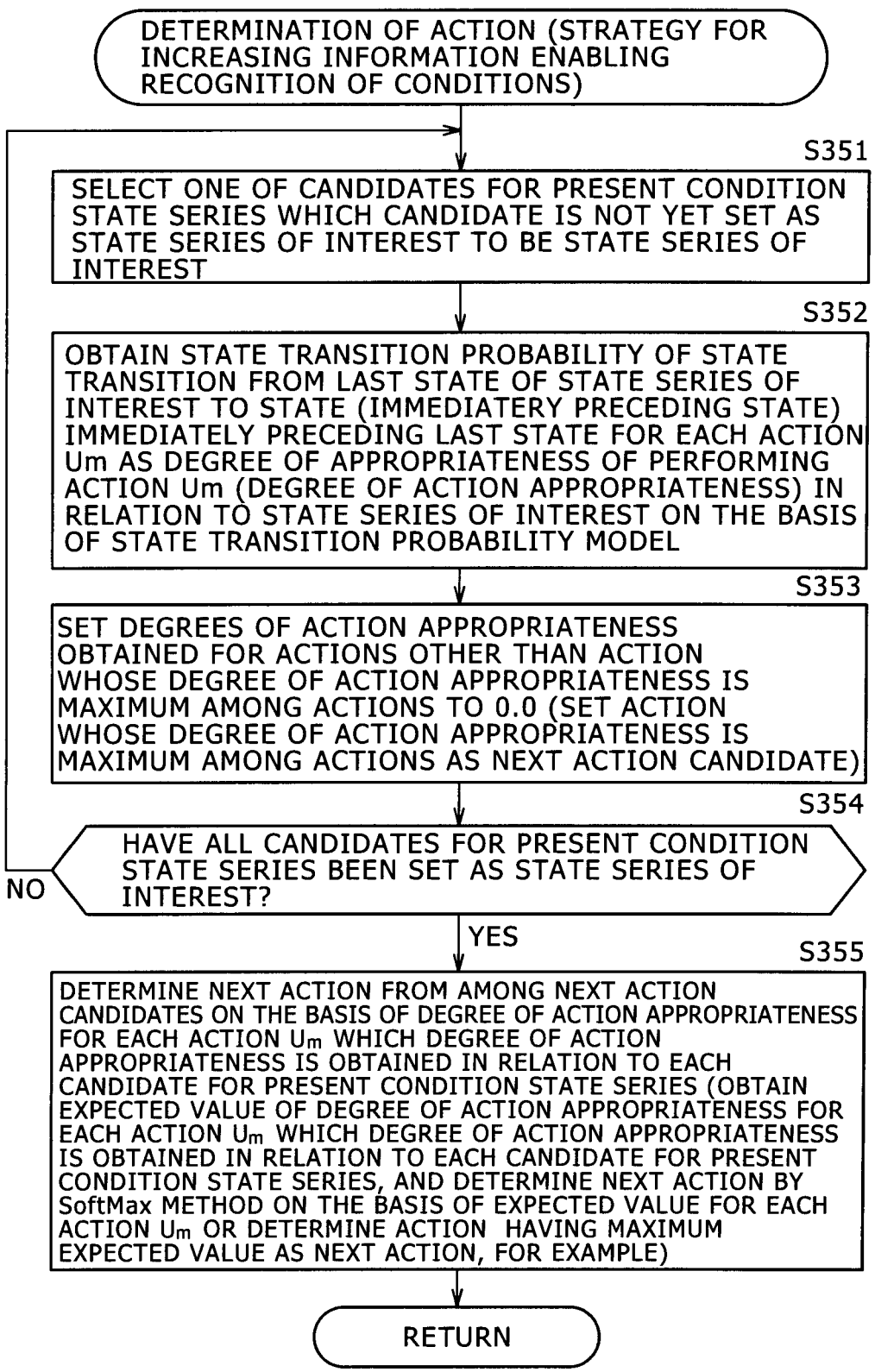
FIG. 49 is a flowchart of assistance in explaining a process of determining an action according to the second strategy.

FIG. 49 is a flowchart of assistance in explaining a process of determining an action according to the second strategy which process is performed by the action determining section 24 in FIG. 4 in step S306 in FIG. 44.

In step S351, the action determining section 24 selects one candidate of one or more candidates for the present condition state series from the state recognizing section 23 (FIG. 4) which candidate is not yet set as a state series of interest to which to direct attention to be a state series of interest. The process then proceeds to step S352.

In this case, when the series length of the candidates for the present condition state series from the state recognizing section 23 is one, and thus there is not an immediately preceding state immediately preceding the last states, the action determining section 24 refers to the extended HMM (state transition probabilities of the extended HMM) stored in the model storing section 22 before performing the process of step S351, and obtains a state from which a state transition can be made to the last state of each of the one or more candidates for the present condition state series from the state recognizing section 23 as a transition destination.

The action determining section 24 then treats a state series obtained by arranging the state from which a state transition can be made to the last state of each of the one or more candidates for the present condition state series from the state recognizing section 23 as a transition destination and the last state as a candidate for the present condition state series. The same is true for FIG. 51 to be described later.

In step S352, the action determining section 24 obtains a state transition probability of the state transition from the last state of the state series of interest to the immediately preceding state immediately preceding the last state for each action $U_m$ as a degree of action appropriateness indicating appropriateness of performing the action $U_m$ (according to the second strategy) in relation to the state series of interest on the basis of the extended HMM stored in the model storing section 22.

Specifically, the action determining section 24 obtains the state transition probability $a_{ij}(U_m)$ of the state transition from the last state $S_i$ to the immediately preceding state $S_j$ which state transition is made when the action $U_m$ is performed as a degree of action appropriateness with respect to the action $U_m$.

The process then process from step S352 to step S353, where the action determining section 24 sets degrees of action appropriateness obtained with respect to actions other than an action whose degree of action appropriateness is a maximum among M (kinds of) actions $U_1$ to $U_M$ to 0.0.

That is, by setting the degrees of action appropriateness obtained with respect to the actions other than the action whose degree of action appropriateness is a maximum to 0.0, the action determining section 24 consequently selects the action whose degree of action appropriateness is a maximum as a candidate for a next action to be performed according to the second strategy in relation to the state series of interest.

After step S353, the process proceeds to step S354, where the action determining section 24 determines whether all the candidates for the present condition state series have been set as a state series of interest.

When it is determined in step S354 that not all the candidates for the present condition state series have been set as a state series of interest yet, the process returns to step S351. Then, in step S351, the action determining section 24 selects one candidate not yet set as a state series of interest to be a new state series of interest from the one or more candidates for the present condition state series from the state recognizing section 23. Thereafter a similar process is repeated.

When it is determined in step S354 that all the candidates for the present condition state series have been set as a state series of interest, the process proceeds to step S355, where the action determining section 24 determines a next action from candidates for the next action on the basis of the degree of action appropriateness with respect to each action $U_m$ which degree of action appropriateness is obtained in relation to each of the one or more candidates for the present condition state series from the state recognizing section 23, as in step S345 in FIG. 47. The process then makes a return.

When actions are determined according to the second strategy as described above, the agent performs actions as of retracing a path taken by the agent. As a result, information (observed values) enabling recognition of the conditions of the agent is increased.

Thus, according to the second strategy, the agent can be made to perform an appropriate action when the agent is in unknown conditions and it is desired that the agent perform an action to return to a known place.

Figure 50:
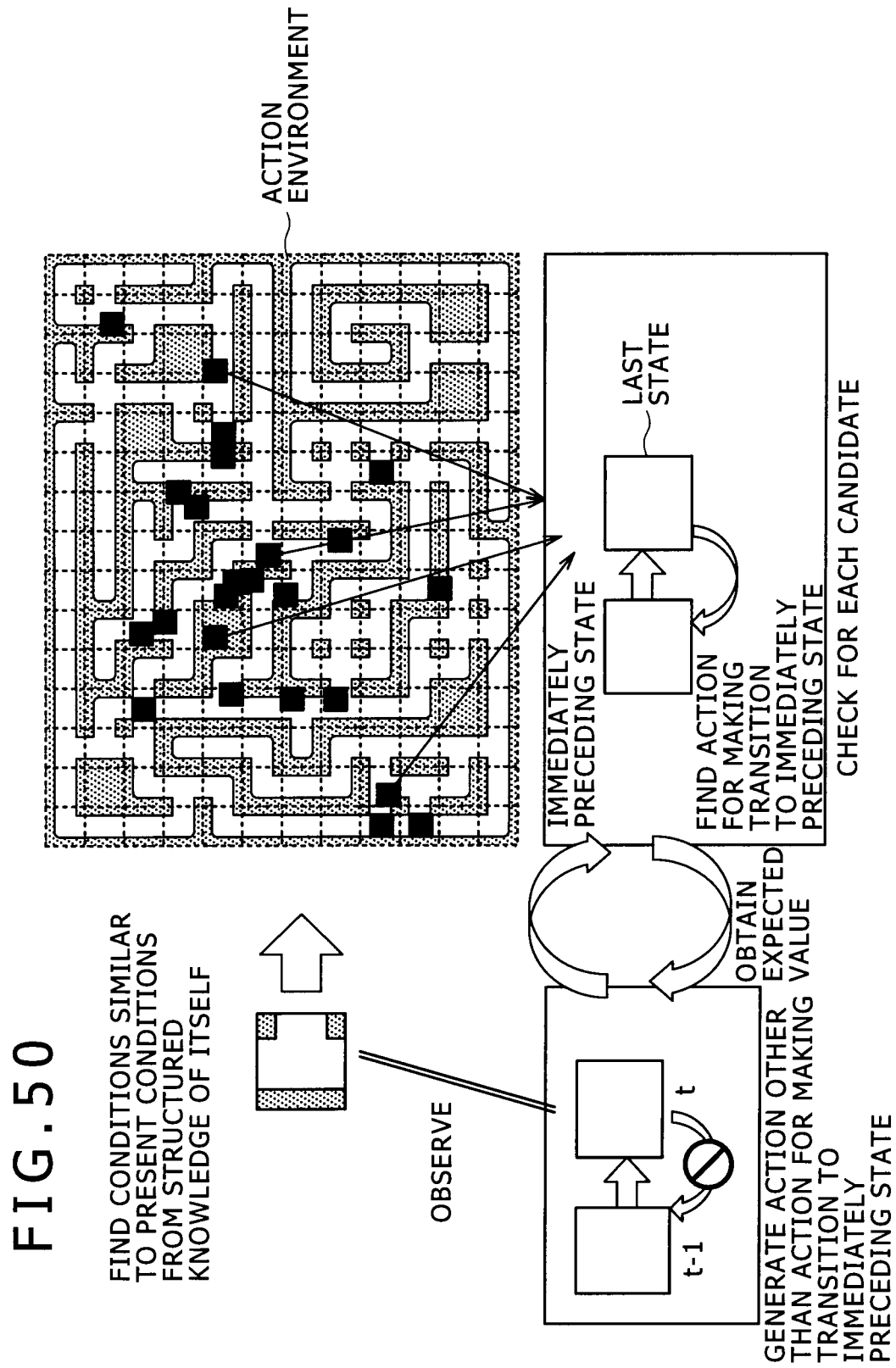
FIG. 50 is a diagram of assistance in explaining an outline of determining an action according to a third strategy.

FIG. 50 is a diagram of assistance in explaining an outline of determining an action according to the third strategy.

The third strategy is a strategy for increasing information (observed values) on unknown conditions not obtained in the extended HMM. By determining an action according to the third strategy, an appropriate action can be determined as an action for the agent to explore an unknown place. As a result, the agent can explore the unknown place efficiently.

Specifically, in determining an action according to the third strategy, the action determining section 24 determines, as a next action, an action effecting a state transition other than a state transition from the last state $s_t$ of one or more candidates for the present condition state series from the state recognizing section 23 to an immediately preceding state $s_{t-1}$ as a state immediately preceding the last state $s_t$, as shown in FIG. 50, for example.

Figure 51:
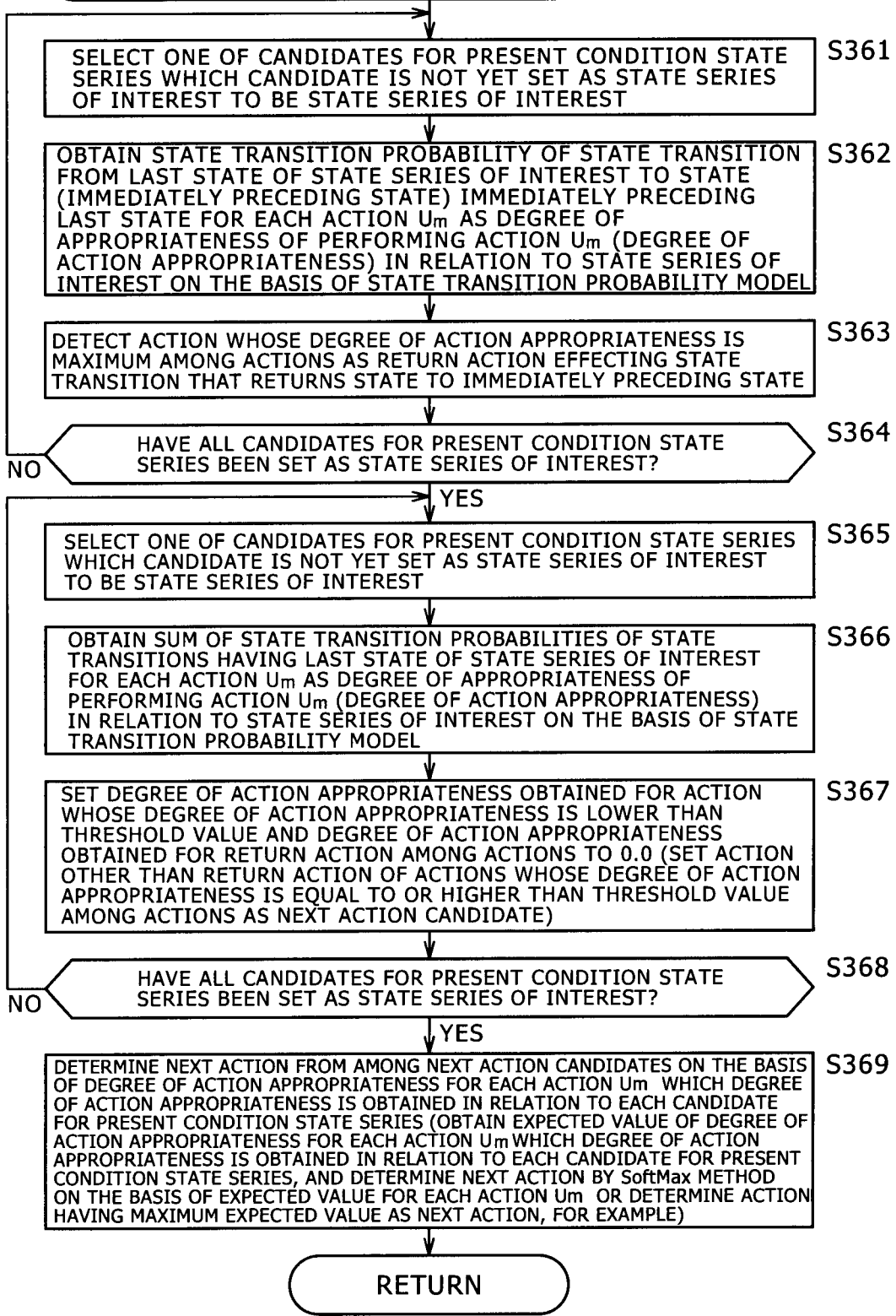
FIG. 51 is a flowchart of assistance in explaining a process of determining an action according to the third strategy.

FIG. 51 is a flowchart of assistance in explaining a process of determining an action according to the third strategy which process is performed by the action determining section 24 in FIG. 4 in step S306 in FIG. 44.

In step S361, the action determining section 24 selects one candidate of one or more candidates for the present condition state series from the state recognizing section 23 (FIG. 4) which candidate is not yet set as a state series of interest to which to direct attention to be a state series of interest. The process then proceeds to step S362.

In step S362, the action determining section 24 obtains a state transition probability of the state transition from the last state of the state series of interest to the immediately preceding state immediately preceding the last state for each action $U_m$ as a degree of action appropriateness indicating appropriateness of performing the action $U_m$ (according to the third strategy) in relation to the state series of interest on the basis of the extended HMM stored in the model storing section 22.

Specifically, the action determining section 24 obtains the state transition probability $a_{ij}(U_m)$ of the state transition from the last state $S_i$ to the immediately preceding state $S_j$ which state transition is made when the action $U_m$ is performed as a degree of action appropriateness with respect to the action $U_m$.

The process then process from step S362 to step S363, where the action determining section 24 detects an action whose degree of action appropriateness is a maximum among M (kinds of) actions $U_1$ to $U_M$ as an action effecting a state transition returning the state to the immediately preceding state (which action will hereinafter be referred to also as a return action) in relation to the state series of interest.

After step S363, the process proceeds to step S364, where the action determining section 24 determines whether all the candidates for the present condition state series have been set as a state series of interest.

When it is determined in step S364 that not all the candidates for the present condition state series have been set as a state series of interest yet, the process returns to step S361. Then, in step S361, the action determining section 24 selects one candidate not yet set as a state series of interest to be a new state series of interest from the one or more candidates for the present condition state series from the state recognizing section 23. Thereafter a similar process is repeated.

When it is determined in step S364 that all the candidates for the present condition state series have been set as a state series of interest, the action determining section 24 resets the selection of all the candidates for the present condition state series as a state series of interest. The process then proceeds to step S365.

In step S365, as in step S361, the action determining section 24 selects one candidate of the one or more candidates for the present condition state series from the state recognizing section 23 which candidate is not yet set as a state series of interest to which to direct attention to be a state series of interest. The process then proceeds to step S366.

In step S366, as in step S342 in FIG. 47, the action determining section 24 obtains a sum of state transition probabilities of state transitions having the last state of the state series of interest as a transition source for each action $U_m$ as a degree of action appropriateness indicating appropriateness of performing the action $U_m$ (according to the third strategy) in relation to the state series of interest on the basis of the extended HMM stored in the model storing section 22.

The process thereafter proceeds from step S366 to step S367, where the action determining section 24 sets, to 0.0, degrees of action appropriateness obtained with respect to actions $U_m$ whose degrees of action appropriateness are lower than a threshold value among the among M (kinds of) actions $U_1$ to $U_M$ whose degrees of action appropriateness have been obtained and the degree of action appropriateness obtained with respect to the return action.

That is, by setting the degrees of action appropriateness obtained with respect to the actions $U_m$ whose degrees of action appropriateness are lower than a threshold value to 0.0, the action determining section 24 consequently selects actions $U_m$ whose degrees of action appropriateness are equal to or higher than the threshold value as candidates for a next action to be performed according to the third strategy in relation to the state series of interest.

Further, by setting the degree of action appropriateness obtained with respect to the return action among the actions $U_m$ whose degrees of action appropriateness are equal to or higher than the threshold value which actions $U_m$ are selected in relation to the state series of interest to 0.0, the action determining section 24 consequently selects the other actions than the return action as candidates for the next action to be performed according to the third strategy in relation to the state series of interest.

After step S367, the process proceeds to step S368, where the action determining section 24 determines whether all the candidates for the present condition state series have been set as a state series of interest.

When it is determined in step S368 that not all the candidates for the present condition state series have been set as a state series of interest yet, the process returns to step S365. Then, in step S365, the action determining section 24 selects one candidate not yet set as a state series of interest to be a new state series of interest from the one or more candidates for the present condition state series from the state recognizing section 23. Thereafter a similar process is repeated.

When it is determined in step S368 that all the candidates for the present condition state series have been set as a state series of interest, the process proceeds to step S369, where the action determining section 24 determines a next action from the candidates for the next action on the basis of the degree of action appropriateness with respect to each action $U_m$ which degree of action appropriateness is obtained in relation to each of the one or more candidates for the present condition state series from the state recognizing section 23, as in step S345 in FIG. 47. The process then makes a return.

When actions are determined according to the third strategy as described above, the agent performs actions other than the return action, that is, actions of exploring an unknown place. As a result, information on unknown conditions not obtained in the extended HMM is increased.

Thus, according to the third strategy, the agent can be made to perform an appropriate action when the agent is in unknown conditions and it is desired that the agent explore an unknown place.

As described above, the agent calculates candidates for the present condition state series as a state series for the agent to reach the present conditions on the basis of the extended HMM, and determines an action to be performed next by the agent according to a predetermined strategy using the candidates for the present condition state series. The agent can thereby determine an action on the basis of the experience obtained in the extended HMM even when the agent is not supplied with the metric of the action to be performed, such for example as a reward function for calculating a reward for the agent.

Incidentally, as an action determining method for eliminating the obscurity of conditions, Japanese Patent Laid-Open No. 2008-186326, for example, describes a method of determining an action by one reward function.

The process in the recognition action mode in FIG. 44 is different from the action determining method of Japanese Patent Laid-Open No. 2008-186326, for example in that candidates for the present condition state series as a state series for the agent to reach the present conditions are calculated on the basis of the extended HMM, and an action is determined using the candidates for the present condition state series, in that a state series having a longest series length q in which state series an observed value series and an action series for recognition are observed in the state series already experienced by the agent can be obtained as a candidates for the present condition state series (FIG. 46), and in that a strategy followed at the time of action determination can be changed (selected from a plurality of strategies), as will be described later.

As described above, the second strategy increases information enabling recognition of the conditions of the agent, and the third strategy increases information on unknown conditions not obtained in the extended HMM. The second and third strategies are therefore strategies increasing some information.

The determination of an action according to the second and third strategies thus increasing some information can be made as follows in addition to the methods described with reference to FIGS. 48 to 51.

A probability $P_m(O)$ of an observed value O being observed when the agent performs an action $U_m$ at a certain time t is expressed by equation (30).

$$P_m(O) = \sum_{i=1}^{N} \sum_{j=1}^{N} \rho_i a_{ij}(U_m) b_j(O) \quad (30)$$

Incidentally, $\rho_i$ denotes a state probability of being in a state $S_i$ at time t.

Now supposing that an amount of information whose probability of occurrence is expressed by the probability $P_m(O)$ is represented as $I(P_m(O))$, the suffix m' of an action $U_{m'}$ when the action is determined according to a strategy that increases some information is expressed by equation (31).

$$m' = \mathrm{argmax}_m \{I(P_m(O))\} \quad (31)$$

$\mathrm{argmax}\{I(P_m(O))\}$ in equation (31) denotes the suffix m' that maximizes the amount of information $I(P_m(O))$ in braces among the suffixes m of actions $U_m$.

Now supposing that information enabling recognition of the conditions of the agent (which information will hereinafter be referred to also as recognition enabling information) is employed as information, to determine an action $U_{m'}$ according to equation (31) is to determine an action according to the second strategy that increases the recognition enabling information.

In addition, supposing that information on unknown conditions not obtained in the extended HMM (which information will hereinafter be referred to also as unknown condition information) is employed as information, to determine an action $U_{m'}$ according to equation (31) is to determine an action according to the third strategy that increases the unknown condition information.

Supposing that the entropy of information whose probability of occurrence is expressed by the probability $P_m(O)$ is represented as $H^o(P_m)$, equation (31) can be equivalently expressed by the following equation.

That is, the entropy $H^O(P_m)$ can be expressed by equation (32).

$$H^O(P_m) = \sum_{O=O_1}^{O_K} (-P_m(O) \times \log(P_m(O))) \qquad (32)$$

When the entropy $H^O(P_m)$ of equation (32) is large, probabilities $P_m(O)$ of respective observed values O being observed are uniform. Therefore, obscurity such that it is not known which observed value is observed, or in turn it is not known where the agent is increased, and a possibility of obtaining information unknown to the agent, or information on an unknown world, as it were, is increased.

Thus, because the unknown condition information is increased by making the entropy $H^O(P_m)$ large, equation (31) when an action is determined according to the third strategy increasing the unknown condition information can be equivalently expressed by equation (33) that maximizes the entropy $H^O(P_m)$.

$$m' = \underset{m}{\mathrm{argmax}}\{H^O(P_m)\} \qquad (33)$$

$\mathrm{argmax}\{H^O(P_m)\}$ in equation (33) denotes the suffix m' that maximizes the entropy $H^O(P_m)$ in braces among the suffixes m of actions $U_m$.

On the other hand, when the entropy $H^O(P_m)$ of equation (32) is small, the probabilities $P_m(O)$ of the respective observed values O being observed are high only at a specific observed value. Therefore, obscurity such that it is not known which observed value is observed, or in turn it is not known where the agent is eliminated, and the position of the agent is easily determined.

Thus, because the recognition enabling information is increased by making the entropy $H^O(P_m)$ small, equation (31) when an action is determined according to the second strategy increasing the recognition enabling information can be equivalently expressed by equation (34) that minimizes the entropy $H^O(P_m)$.

$$m' = \underset{m}{\mathrm{argmin}}\{H^O(P_m)\} \qquad (34)$$

$\mathrm{argmin}\{H^O(P_m)\}$ in equation (34) denotes the suffix m' that minimizes the entropy $H^O(P_m)$ in braces among the suffixes m of actions $U_m$.

Incidentally, in addition, on the basis of relation in magnitude between a maximum value of the probability $P_m(O)$ and a threshold value, for example, an action $U_m$ that maximizes the probability $P_m(O)$ can be determined as a next action.

To determine an action $U_m$ that maximizes the probability $P_m(O)$ as a next action when the maximum value of the probability $P_m(O)$ is larger than the threshold value (equal to or larger than the threshold value) is to determine an action so as to eliminate obscurity, that is, to determine an action according to the second strategy.

On the other hand, to determine an action $U_m$ that maximizes the probability $P_m(O)$ as a next action when the maximum value of the probability $P_m(O)$ is equal to or less than the threshold value (less than the threshold value) is to determine an action so as to increase obscurity, that is, to determine an action according to the third strategy.

In the above, an action is determined using the probability $P_m(O)$ of an observed value being observed when the agent performs an action $U_m$ at a certain time t. In addition, an action can be determined using a probability $P_{mj}$ in equation (35) of a state transition being made from a state $S_i$ to a state $S_j$ when the agent performs an action $U_m$ at a certain time t, for example.

$$P_{mj} = \sum_{i=1}^{N} \rho_i a_{ij}(U_m) \qquad (35)$$

Specifically, the suffix m' of an action $U_{m'}$ when the action is determined according to a strategy that increases an amount of information $I(P_{mj})$ whose probability of occurrence is represented by the probability $P_{mj}$ is expressed by equation (36).

$$m' = \underset{m}{\mathrm{argmax}}\{I(P_{mj})\} \qquad (36)$$

$\mathrm{argmax}\{I(P_{mj})\}$ in equation (36) denotes the suffix m' that maximizes the amount of information $I(P_{mj})$ in braces among the suffixes m of actions $U_m$.

Now supposing that recognition enabling information is employed as information, to determine an action $U_{m'}$ according to equation (36) is to determine an action according to the second strategy that increases the recognition enabling information.

In addition, supposing that unknown condition information is employed as information, to determine an action $U_{m'}$ according to equation (36) is to determine an action according to the third strategy that increases the unknown condition information.

Supposing that the entropy of information whose probability of occurrence is expressed by the probability $P_{mj}$ is represented as $H^j(P_m)$, equation (36) can be equivalently expressed by the following equation.

That is, the entropy $H^j(P_m)$ can be expressed by equation (37).

$$H^j(P_m) = \sum_{j=1}^{N} (-P_{mj} \times \log(P_{mj})) \qquad (37)$$

When the entropy $H^j(P_m)$ of equation (37) is large, probabilities $P_{mj}$ of respective state transitions being made from a state $S_i$ to a state $S_j$ are uniform. Therefore, obscurity such that it is not known which state transition is made, or in turn it is not known where the agent is increased, and a possibility of obtaining information on an unknown world unknown to the agent is increased.

Thus, because the unknown condition information is increased by making the entropy $H^j(P_m)$ large, equation (36) when an action is determined according to the third strategy increasing the unknown condition information can be equivalently expressed by equation (38) that maximizes the entropy $H^j(P_m)$.

$$m' = \underset{m}{\mathrm{argmax}}\{H^j(P_m)\} \qquad (38)$$

$\mathrm{argmax}\{H^j(P_m)\}$ in equation (38) denotes the suffix m' that maximizes the entropy $H^j(P_m)$ in braces among the suffixes m of actions $U_m$.

On the other hand, when the entropy $H^j(P_m)$ of equation (37) is small, the probabilities $P_{mj}$ of the respective state transitions being made from a state $S_i$ to a state $S_j$ are high only in a specific state transition. Therefore, obscurity such that it is not known which observed value is observed, or in turn it is not known where the agent is eliminated, and the position of the agent is easily determined.

Thus, because the recognition enabling information is increased by making the entropy $H^j(P_m)$ small, equation (36) when an action is determined according to the second strategy increasing the recognition enabling information can be equivalently expressed by equation (39) that minimizes the entropy $H^j(P_m)$.

$$m' = \underset{m}{\mathrm{argmin}}\{H^j(P_m)\} \tag{39}$$

$\mathrm{argmin}\{H^j(P_m)\}$ in equation (39) denotes the suffix m' that minimizes the entropy $H^j(P_m)$ in braces among the suffixes m of actions $U_m$.

Incidentally, in addition, on the basis of relation in magnitude between a maximum value of the probability $P_{mj}$ and a threshold value, for example, an action $U_m$ that maximizes the probability $P_{mj}$ can be determined as a next action.

To determine an action $U_m$ that maximizes the probability $P_{mj}$ as a next action when the maximum value of the probability $P_{mj}$ is larger than the threshold value (equal to or larger than the threshold value) is to determine an action so as to eliminate obscurity, that is, to determine an action according to the second strategy.

On the other hand, to determine an action $U_m$ that maximizes the probability $P_{mj}$ as a next action when the maximum value of the probability $P_{mj}$ is equal to or less than the threshold value (less than the threshold value) is to determine an action so as to increase obscurity, that is, to determine an action according to the third strategy.

In addition, such an action determination as to eliminate obscurity, that is, action determination according to the second strategy can be made using a-posteriori probability $P(X|O)$ of being in a state $S_X$ when an observed value O is observed.

That is, the a-posteriori probability $P(X|O)$ is expressed by equation (40).

$$P(X|O) = \frac{P(X,O)}{P(O)} = \frac{\sum_{i=1}^{N} \rho_i a_{ix}(U_m) b_X(O)}{\sum_{i=1}^{N}\sum_{j=1}^{N} \rho_i a_{ij}(U_m) b_j(O)} \tag{40}$$

Supposing that the entropy of the a-posteriori probability $P(X|O)$ is represented as $H(P(X|O))$, action determination according to the second strategy can be made by determining an action so as to decrease the entropy $H(P(X|O))$.

That is, action determination according to the second strategy can be made by determining an action $U_m$ according to equation (41).

$$m' = \underset{m}{\mathrm{argmin}}\left\{\sum_{O=O_1}^{O_K} P(O) H(P(X|O))\right\} \tag{41}$$

$\mathrm{argmin}\{\ \}$ in equation (41) denotes the suffix m' that minimizes a value in braces among the suffixes m of actions $U_m$.

$\Sigma P(O) H(P(X|O))$ in the braces of $\mathrm{argmin}\{\ \}$ in equation (41) is a sum total of products of the probability P(O) of an observed value O being observed and the entropy $H(P(X|O))$ of the a-posteriori probability $P(X|O)$ of being in a state $S_X$ when the observed value O is observed with the observed value O changed from an observed value $O_1$ to an observed value $O_K$, and represents the whole entropy of the observed values $O_1$ to $O_K$ being observed when an action $U_m$ is performed.

According to equation (41), an action that minimizes the entropy $\Sigma P(O) H(P(X|O))$, that is, an action that increases the possibility of the observed value O being determined uniquely is determined as a next action.

Hence, to determine an action according to equation (41) is to determine an action so as to eliminate obscurity, that is, to determine an action according to the second strategy.

In addition, such an action determination as to increase obscurity, that is, action determination according to the third strategy can be made so as to maximize an amount of decrease indicating an amount by which the entropy $H(P(X|O))$ of the a-posteriori probability $P(X|O)$ is decreased with respect to the entropy $H(P(X))$ of a-priori probability $P(X)$ of being in a state $S_X$, assuming that the amount of decrease is an amount of unknown condition information.

That is, the a-priori probability $P(X)$ is expressed by equation (42).

$$P(X) = \sum_{i=1}^{N} \rho_i a_{ix}(U_m) \tag{42}$$

An action $U_{m'}$ that maximizes the amount of decrease of the entropy $H(P(X|O))$ of the a-posteriori probability $P(X|O)$ with respect to the entropy $H(P(X))$ of the a-priori probability $P(X)$ of being in a state $S_X$ can be determined according to equation (43).

$$m' = \underset{m}{\mathrm{argmax}}\left\{\sum_{O=O_1}^{O_K} P(O)(H(P(X)) - H(P(X|O)))\right\} \tag{43}$$

$\mathrm{argmax}\{\ \}$ in equation (43) denotes the suffix m' that maximizes a value in braces among the suffixes m of actions $U_m$.

According to equation (43), a sum total $\Sigma P(O) (H(P(X))-H(P(X|O)))$ of multiplication values $P(O)(H(P(X))-H(P(X|O)))$ obtained by multiplying the probability P(O) of an observed value O being observed by a difference $H(P(X))-H(P(X|O))$ between the entropy $H(P(X))$ of the a-priori probability $P(X)$, which is a state probability of being in a state $S_X$ when the observed value O is not known, and the entropy $H(P(X|O))$ of the a-posteriori probability $P(X|O)$ of being in the state $S_X$ when an action $U_m$ is performed and the observed value O is observed with the observed value O changed from an observed value $O_1$ to an observed value $O_K$ is assumed to be an amount of unknown condition information increased by performing the action $U_m$. An action that maximizes the amount of unknown condition information is determined as a next action.

[Selection of Strategy]

The agent can determine an action according to the first to third strategies as described with reference to FIGS. 47 to 51. A strategy to be followed when an action is determined can be not only set in advance but also selected adaptively from the first to third strategies as a plurality of strategies.

Figure 52:
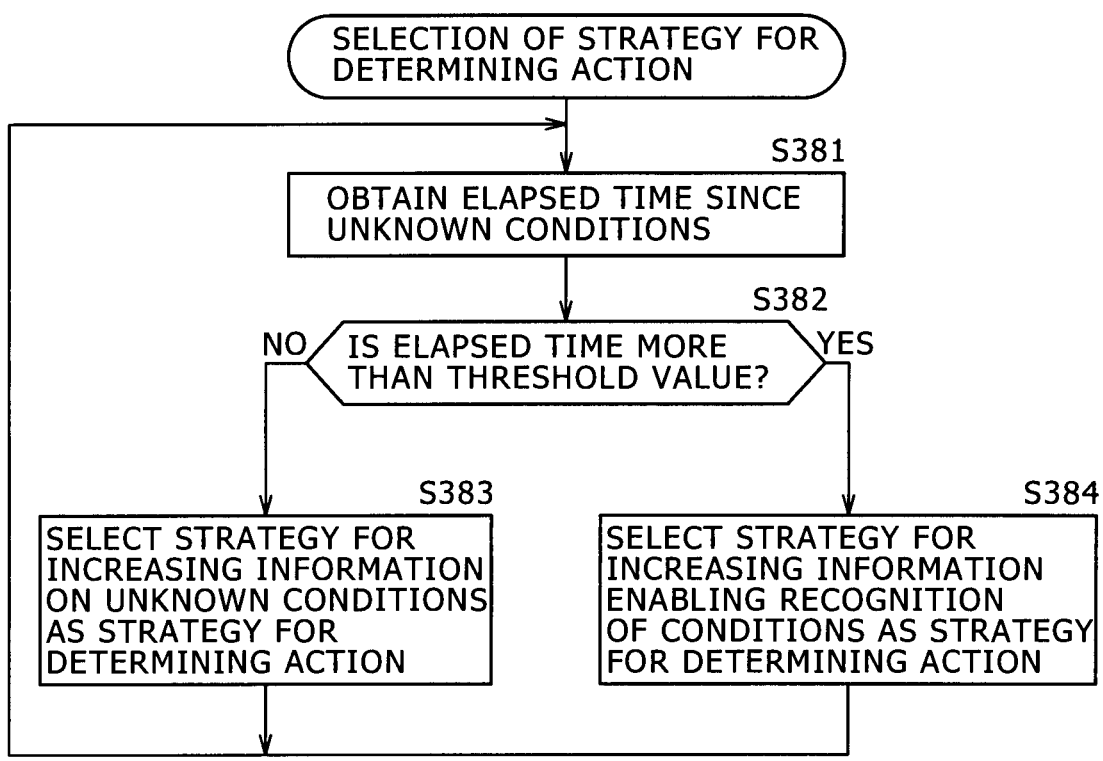
FIG. 52 is a flowchart of assistance in explaining a process of selecting a strategy to be followed when an action is determined from a plurality of strategies.

FIG. 52 is a flowchart of assistance in explaining a process of selecting a strategy to be followed when the agent determines an action from a plurality of strategies.

According to the second strategy, an action is determined so as to increase the recognition enabling information and eliminate obscurity, that is, so that the agent returns to a known place (area).

According to the third strategy, on the other hand, an action is determined so as to increase the unknown condition information and increase obscurity, that is, so that the agent explores an unknown place.

Incidentally, according to the first strategy, it is not known whether the agent returns to a known place or explores an unknown place, but an action performed by the agent in known conditions similar to the present conditions of the agent is performed.

In order to obtain the structure of the action environment widely, that is, to increase knowledge (known world) of the agent, as it were, it is necessary to determine actions such that the agent explores an unknown place.

On the other hand, for the agent to obtain the unknown place as known place, the agent needs to return from the unknown place to the known place, and learn the extended HMM (incremental learning) to connect the unknown place with the known place. Thus, for the agent to obtain the unknown place as known place, an action needs to be determined so that the agent returns to the known place.

By determining actions so that the agent explores an unknown place and determining actions so that the agent returns to a known place in a well-balanced manner, the entire structure of the action environment can be modeled in the extended HMM efficiently.

Accordingly, the agent can select a strategy to be followed when determining an action from the second and third strategies on the basis of an elapsed time since the conditions of the agent became unknown conditions, as shown in FIG. 52.

In step S381, the action determining section 24 (FIG. 4) obtains an elapsed time since unknown conditions (which elapsed time will hereinafter be referred to also as unknown condition elapsed time) on the basis of a result of recognition of present conditions in the state recognizing section 23. The process then proceeds to step S382.

In this case, the unknown condition elapsed time is the number of times that a result of recognition that the present conditions are unknown conditions is consecutively obtained in the state recognizing section 23. The unknown condition elapsed time is reset to zero when a result of recognition that the present conditions are known conditions is obtained. Thus, when the present conditions are not unknown conditions (when the present conditions are known conditions), the unknown condition elapsed time is zero.

In step S382, the action determining section 24 determines whether the unknown condition elapsed time is larger than a predetermined threshold value.

When it is determined in step S382 that the unknown condition elapsed time is not larger than the predetermined threshold value, that is, when not much time that the conditions of the agent are unknown conditions has passed, the process proceeds to step S383, where the action determining section 24 selects the third strategy for increasing the unknown condition information as a strategy to be followed when determining an action from the second and third strategies. The process then returns to step S381.

When it is determined in step S382 that the unknown condition elapsed time is larger than the predetermined threshold value, that is, when a considerable time that the conditions of the agent are unknown conditions has passed, the process proceeds to step S384, where the action determining section 24 selects the second strategy for increasing the recognition enabling information as a strategy to be followed when determining an action from the second and third strategies. The process then returns to step S381.

In FIG. 52, a strategy to be followed when an action is determined is selected on the basis of an elapsed time since the conditions of the agent became unknown conditions. In addition, a strategy to be followed when an action is determined can be selected on the basis of a ratio of the time of known conditions or the time of unknown conditions to a predetermined proximate time, for example.

Figure 53:
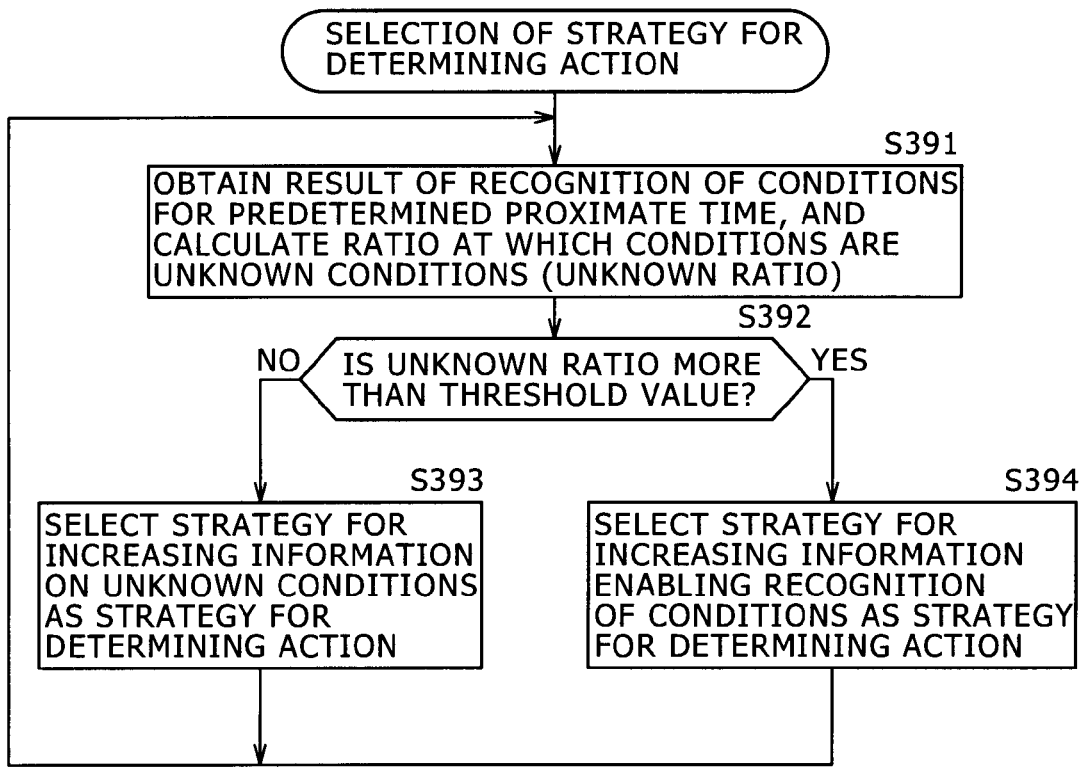
FIG. 53 is a flowchart of assistance in explaining a process of selecting a strategy to be followed when an action is determined from a plurality of strategies.

FIG. 53 is a flowchart of assistance in explaining a process of selecting a strategy to be followed when an action is determined on the basis of a ratio of the time of known conditions or the time of unknown conditions to a predetermined proximate time.

In step S391, the action determining section 24 (FIG. 4) obtains a result of recognition of conditions for a predetermined proximate time from the state recognizing section 23, and calculates a ratio at which the conditions are unknown conditions (which ratio will hereinafter be referred to also as an unknown ratio) from the result of the recognition. The process then proceeds to step S392.

In step S392, the action determining section 24 determines whether the unknown ratio is larger than a predetermined threshold value.

When it is determined in step S392 that the unknown ratio is not larger than the predetermined threshold value, that is, when the ratio at which the conditions of the agent are unknown conditions is not very high, the process proceeds to step S393, where the action determining section 24 selects the third strategy for increasing the unknown condition information as a strategy to be followed when determining an action from the second and third strategies. The process then returns to step S391.

When it is determined in step S392 that the unknown ratio is larger than the predetermined threshold value, that is, when the ratio at which the conditions of the agent are unknown conditions is rather high, the process proceeds to step S394, where the action determining section 24 selects the second strategy for increasing the recognition enabling information as a strategy to be followed when determining an action from the second and third strategies. The process then returns to step S391.

Incidentally, while a strategy is selected on the basis of the ratio at which the conditions are unknown conditions (unknown ratio) in a result of recognition of the conditions for a predetermined proximate time in FIG. 53, a strategy can be selected on the basis of a ratio at which the conditions are known conditions (which ratio will hereinafter be referred to also as a known ratio) in a result of recognition of the conditions for a predetermined proximate time.

In the case where strategy selection is made on the basis of the known ratio, the third strategy is selected as a strategy at the time of determining an action when the known ratio is higher than a threshold value, or the second strategy is selected as a strategy at the time of determining an action when the known ratio is not higher than the threshold value.

In addition, in step S383 in FIG. 52 and in step S393 in FIG. 53, the first strategy can be selected as a strategy at the time of determining an action in place of the third strategy at a ratio of one time to a number of times, for example.

By thus selecting the strategies, the entire structure of the action environment can be modeled in the extended HMM efficiently.

[Description of Computer to which Present Invention is Applied]

Next, the series of processes described above can be carried out not only by hardware but also by software. When the series of processes is to be carried out by software, a program constituting the software is installed onto a general-purpose personal computer or the like.

Figure 54:
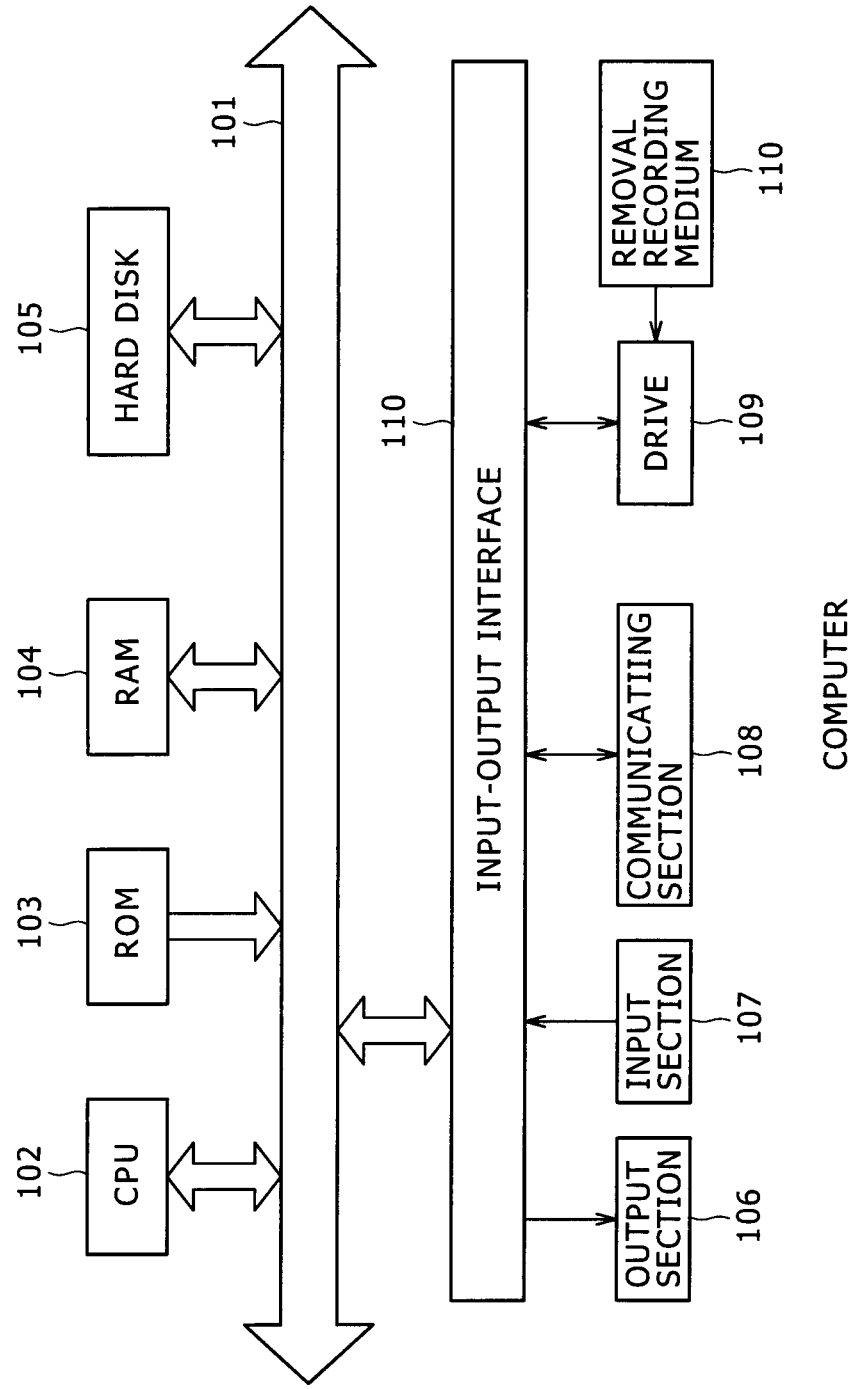
FIG. 54 is a block diagram showing an example of configuration of an embodiment of a computer to which the present invention is applied.

FIG. 54 shows an example of configuration of an embodiment of a computer onto which the program for performing the series of processes described above is installed.

The program can be recorded in advance on a hard disk 105 or a ROM 103 as a recording medium included in the computer.

Alternatively, the program can be stored (recorded) on a removable recording medium 111. Such a removable recording medium 111 can be provided as a so-called packaged software. In this case, the removable recording medium 111 includes for example a flexible disk, a CD-ROM (Compact Disk Read Only Memory), an MO (Magneto-Optical Disk), a DVD (Digital Versatile Disk), a magnetic disk, and a semiconductor memory.

In addition to being installed from the removable recording medium 111 as described above onto the computer, the program can be downloaded to the computer via a communication network or a broadcasting network and installed onto the built-in hard disk 105. Specifically, the program can be for example transferred from a download site to the computer by radio via an artificial satellite for digital satellite broadcasting or transferred to the computer by wire via networks such as a LAN (Local Area Network), the Internet, and the like.

The computer includes a CPU (Central Processing Unit) 102. The CPU 102 is connected with an input-output interface 110 via a bus 101.

When the CPU 102 is supplied with a command via the input-output interface 110 by an operation of an input section 107 by a user, for example, the CPU 102 executes the program stored in the ROM (Read Only Memory) 103 according to the command. Alternatively, the CPU 102 loads the program stored in the hard disk 105 into a RAM (Random Access Memory) 104, and then executes the program.

The CPU 102 thereby performs processes according to the above-described flowcharts or processes performed by the configurations of the above-described block diagrams. The CPU 102 then outputs a result of the processes from an output section 106, transmits the result from a communicating section 108, or records the result onto the hard disk 105 via the input-output interface 110, for example, as required.

Incidentally, the input section 107 is formed by a keyboard, a mouse, a microphone and the like. The output section 106 is formed by an LCD (Liquid Crystal Display), a speaker and the like.

In the present specification, processes performed by the computer according to the program do not necessarily need to be performed in time series in the order described as flowcharts. That is, processes performed by the computer according to the program also include processes performed in parallel or individually (for example parallel processing or processing based on an object).

In addition, the program may be processed by one computer (processor), or may be subjected to distributed processing by a plurality of computers. Further, the program may be transferred to a remote computer and executed by the remote computer.

It is to be noted that embodiments of the present invention are not limited to the foregoing embodiments, and that various changes can be made without departing from the spirit of the present invention.

The present application contains subject matter related to that disclosed in Japanese Priority Patent Application JP 2009-140064 filed in the Japan Patent Office on Jun. 11, 2009, the entire content of which is hereby incorporated by reference.

What is claimed is:

1. An information processing device comprising:
at least one processor; and
a storage device storing instructions that, when executed by the at least one processor, cause the information processing device to perform operations comprising:
  learning a state transition probability model defined by
    state transition probability for each action of a state making a state transition due to an action performed by an agent capable of performing action, and
    observation probability of a predetermined observed value being observed from said state, using an action performed by said agent and an observed value observed in said agent when said agent has performed the action.

2. The information processing device according to claim 1, wherein said instructions are configured to cause the information processing device to learn said state transition probability model under a one-state one-observed-value constraint under which one observed value is observed in one state of said state transition probability model.

3. The information processing device according to claim 2, wherein said instructions are configured to cause the information processing device to perform learning that satisfies said one-state one-observed-value constraint by repeating, until no dividing object state is detected,
detecting a state in which a plurality of observed values are observed in said state transition probability model after being learned as a dividing object state to be divided,
dividing said dividing object state into a plurality of states in each of which one of said plurality of observed values is observed, and
relearning said state transition probability model after said dividing object state is divided into said plurality of states.

4. The information processing device according to claim 3, wherein said instructions are configured to cause the information processing device to divide said dividing object state into a plurality of states after division by
assigning one of said plurality of observed values to a state after the division obtained by dividing said dividing object state,
setting an observation probability of the observed value assigned to said state after the division being observed in said state after the division to one, and setting observation probabilities of other observed values being observed in said state after the division to zero, and
setting state transition probability of state transition having said state after the division as a transition source to state transition probability of state transition having said dividing object state as a transition source, and setting state transition probability of state transition having said state after the division as a transition destination to a value obtained by correcting state transition probability of state transition having said dividing object state as a transition destination by an observation probability in said dividing object state of the observed value assigned to said state after the division.

5. The information processing device according to claim 2, wherein when there are a plurality of states as transition source states or transition destination states of state transition when a predetermined action is performed, and an identical observed value is observed in each of the plurality of states, said instructions are configured to cause the information processing device to merge said plurality of states into one state.

6. The information processing device according to claim 5, wherein said instructions are configured to cause the information processing device to merge a plurality of states as merging object states into a representative state by
detecting the plurality of states as said merging object states to be merged when the plurality of states are present as transition source states or transition destination states in said state transition probability model of state transition when a predetermined action is performed, and observed values having a maximum said observation probability, the observed value being observed in the plurality of respective states, coincide with each other,
setting observation probability of each observed value being observed in said representative state as said one state when the plurality of states as said merging object states are merged into said one state to an average value of observation probabilities of each observed value being observed in the plurality of respective states as said merging object states, and setting observation probability of each observed value being observed in said merging object state other than said representative state to zero,
setting state transition probability of state transition having said representative state as a transition source to an average value of state transition probabilities of state transition having the plurality of respective states as said merging object states as a transition source, and setting state transition probability of state transition having said representative state as a transition destination to a sum of state transition probabilities of state transition having the plurality of respective states as said merging object states as a transition destination, and
setting state transition probability of state transition having said merging object state other than said representative state as a transition source and state transition probability of state transition having said merging object state other than said representative state as a transition destination to zero.

7. The information processing device according to claim 6, wherein said instructions are configured to cause the information processing device to perform learning that satisfies said one-state one-observed-value constraint by repeating, until no merging object states are detected,
detecting a plurality of states as said merging object states from said state transition probability model after being learned,
merging the plurality of states as said merging object states into said representative state, and
relearning said state transition probability model after the merging.

8. The information processing device according to claim 2, wherein said state transition probability model is an extended HMM (Hidden Markov Model) obtained by extending state transition probability of an HMM to state transition probability for each action performed by said agent, and
said instructions are configured to cause the information processing device to perform learning of said extended HMM to estimate said state transition probability with respect to each action and said observation probability according to a Baum-Welch re-estimation method.

9. An information processing method of an information processing device, said information processing method comprising a step of:
learning, by at least one processor, a state transition probability model defined by
state transition probability for each action of a state making a state transition due to an action performed by an agent capable of performing action, and
observation probability of a predetermined observed value being observed from said state, using an action performed by said agent and an observed value observed in said agent when said agent has performed the action.

10. A program embodied on a non-transitory computer-readable medium comprising instructions that, when executed by at least one processor, cause a computer to perform operations comprising:
learning a state transition probability model defined by
state transition probability for each action of a state making a state transition due to an action performed by an agent capable of performing action, and
observation probability of a predetermined observed value being observed from said state, using an action performed by said agent and an observed value observed in said agent when said agent has performed the action.

11. An information processing device comprising:
at least one processor;
a storage device storing instructions that, when executed by the at least one processor, cause the information processing device perform operations, said instructions comprising:
state recognizing instructions for recognizing present conditions of an agent capable of performing action using an action performed by said agent and an observed value observed in said agent when said agent has performed the action on the basis of a state transition probability model obtained by learning said state transition probability model defined by
state transition probability for each action of a state making a state transition due to an action performed by said agent, and
observation probability of a predetermined observed value being observed from said state,
instructions for using an action performed by said agent and an observed value observed in said agent when said agent has performed the action, and obtaining a present state as a state of said state transition probability model, the state of said state transition probability model corresponding to the present conditions;
goal determining instructions for determining one of states of said state transition probability model as a goal state set as a goal; and
action determining instructions for calculating an action plan as an action series that maximizes likelihood of state transition from said present state to said goal state on the basis of said state transition probability model, and determining an action to be performed next by said agent according to the action plan.

12. The information processing device according to claim 11,
- wherein said state recognizing instructions are further configured to cause the information processing device to update an inhibitor for inhibiting state transition so as to inhibit state transition between an immediately preceding state immediately preceding said present state and a state other than said present state with respect to an action performed by said agent at a time of a state transition from said immediately preceding state to said present state, and
- said action determining instructions are further configured to cause the information processing device to correct said state transition probability of said state transition probability model using said inhibitor, and calculates said action plan on the basis of said state transition probability after correction.

13. The information processing device according to claim 12, wherein said state recognizing instructions are further configured to cause the information processing device to update said inhibitor so as to relax the inhibition of the state transition with passage of time.

14. The information processing device according to claim 11,
- wherein said instructions further comprises open end detecting instructions for detecting an open end as another state having a state transition not yet performed among state transitions that can be made with a state in which a predetermined observed value is observed as a transition source, a same observed value as the predetermined observed value being observed in said other state, and
- wherein said goal determining instructions are further configured to cause the information processing device to determine said open end as said goal state.

15. The information processing device according to claim 14, wherein said open end detecting instructions are further configured to cause the information processing device to
- obtain action probability as probability of said agent performing each action when each observed value is observed, using said state transition probability and said observation probability,
- calculate action probability based on said observation probability as probability of said agent performing each action in each state in which each observed value is observed, by multiplying said action probability by said observation probability,
- calculate action probability based on said state transition probability as probability of said agent performing each action in each state, by adding together, with respect to each state, said state transition probabilities of state transitions having the state as a transition source in each action, and
- detect a state in which a difference between said action probability based on said observation probability and said action probability based on said state transition probability is equal to or larger than a predetermined threshold value as said open end.

16. The information processing device according to claim 11, wherein said instructions further comprises:
- branch structure detecting instructions for detecting a state of branch structure as a state from which state transition can be made to different states when one action is performed on the basis of said state transition probability, and
- wherein said goal determining instructions are further configured to cause the information processing device to determine said state of branch structure as said goal state.

17. An information processing method of an information processing device, said information processing method comprising the steps of:
- recognizing, by at least one processor, present conditions of an agent capable of performing action using an action performed by said agent and an observed value observed in said agent when said agent has performed the action on the basis of a state transition probability model obtained by learning said state transition probability model defined by
  - state transition probability for each action of a state making a state transition due to an action performed by said agent, and
  - observation probability of a predetermined observed value being observed from said state, using an action performed by said agent and an observed value observed in said agent when said agent has performed the action, and obtaining a present state as a state of said state transition probability model, the state of said state transition probability model corresponding to the present conditions;
- determining one of states of said state transition probability model as a goal state set as a goal; and
- calculating an action plan as an action series that maximizes likelihood of state transition from said present state to said goal state on the basis of said state transition probability model, and determining an action to be performed next by said agent according to the action plan.

18. A program embodied on a non-transitory computer-readable medium comprising instructions that, when executed by at least one processor, cause a computer to perform operations comprising:
- recognizing present conditions of an agent capable of performing action using an action performed by said agent and an observed value observed in said agent when said agent has performed the action on the basis of a state transition probability model obtained by learning said state transition probability model defined by
  - state transition probability for each action of a state making a state transition due to an action performed by said agent, and
  - observation probability of a predetermined observed value being observed from said state, using an action performed by said agent and an observed value observed in said agent when said agent has performed the action, and obtaining a present state as a state of said state transition probability model, the state of said state transition probability model corresponding to the present conditions;
- determining one of states of said state transition probability model as a goal state set as a goal; and
- calculating an action plan as an action series that maximizes likelihood of state transition from said present state to said goal state on the basis of said state transition probability model, and determining an action to be performed next by said agent according to the action plan.

19. An information processing device comprising:
- at least one processor;
- a storage device storing learning instructions that, when executed by the at least one processor, cause the information processing device to learn a state transition probability model defined by state transition probability for each action of a state making a state transition due to an action performed by an agent capable of performing action, and observation probability of a predetermined observed value being observed from said state, using an action performed by said agent and an observed value observed in said agent when said agent has performed the action.

20. An information processing device comprising:

at least one processor;

a storage device storing instructions that, when executed by the at least one processor, cause the information processing device to perform operations, said instructions comprising:

state recognizing instructions configured to recognize present conditions of an agent capable of performing action using an action performed by said agent and an observed value observed in said agent when said agent has performed the action on the basis of a state transition probability model obtained by learning said state transition probability model defined by state transition probability for each action of a state making a state transition due to an action performed by said agent, and observation probability of a predetermined observed value being observed from said state, using an action performed by said agent and an observed value observed in said agent when said agent has performed the action, and obtaining a present state as a state of said state transition probability model, the state of said state transition probability model corresponding to the present conditions;

goal determining instructions configured to determine one of states of said state transition probability model as a goal state set as a goal; and action determining instructions configured to calculate an action plan as an action series that maximizes likelihood of state transition from said present state to said goal state on the basis of said state transition probability model, and determine an action to be performed next by said agent according to the action plan.

* * * * *